US008499082B2

(12) United States Patent
Roach et al.

(10) Patent No.: US 8,499,082 B2
(45) Date of Patent: Jul. 30, 2013

(54) METHODS, SYSTEMS, AND COMPUTER READABLE MEDIA FOR PROVIDING SERVICES IN A TELECOMMUNICATIONS NETWORK USING INTEROPERABILITY SPECIFICATION/SESSION INITIATION PROTOCOL (IOS/SIP) ADAPTER

(75) Inventors: Adam B. Roach, Dallas, TX (US); Ajay P. Deo, Lewisville, TX (US)

(73) Assignee: Tekelec, Inc., Morrisville, NC (US)

( * ) Notice: Subject to any disclaimer, the term of this patent is extended or adjusted under 35 U.S.C. 154(b) by 599 days.

(21) Appl. No.: 12/206,677

(22) Filed: Sep. 8, 2008

(65) Prior Publication Data
US 2009/0070469 A1   Mar. 12, 2009

Related U.S. Application Data

(60) Provisional application No. 60/967,669, filed on Sep. 6, 2007.

(51) Int. Cl.
G06F 15/16 (2006.01)
H04M 3/42 (2006.01)
H04L 12/16 (2006.01)

(52) U.S. Cl.
USPC ........ 709/227; 709/230; 455/414.1; 455/415; 455/416; 455/417; 370/259; 370/260; 370/261

(58) Field of Classification Search
USPC ........................................ 709/227
See application file for complete search history.

(56) References Cited

U.S. PATENT DOCUMENTS

| | | | |
|---|---|---|---|
| 6,470,010 B1 | 10/2002 | Szviatovszki et al. | |
| 6,735,621 B1 | 5/2004 | Yoakum et al. | |
| 6,795,444 B1 | 9/2004 | Vo et al. | |
| 6,870,827 B1 | 3/2005 | Voit et al. | |
| 6,871,070 B2 | 3/2005 | Ejzak | |
| 7,085,260 B2 | 8/2006 | Karaul et al. | |

(Continued)

FOREIGN PATENT DOCUMENTS

| | | |
|---|---|---|
| EP | 1 217 816 A1 | 6/2002 |
| GB | 2419774 A | 5/2006 |

(Continued)

OTHER PUBLICATIONS

SDP: Session Description Protocol, RFC 2327, Apr. 1998.*

(Continued)

Primary Examiner — Emmanuel L Moise
Assistant Examiner — Robert Shaw
(74) Attorney, Agent, or Firm — Jenkins, Wilson, Taylor & Hunt, P.A.

(57) ABSTRACT

The subject matter described herein includes methods, systems, and computer readable media for providing services in a telecommunications network using an IOS/SIP adapter. According to one aspect of the subject matter described herein, a method for providing supplementary services to IMS devices and non-IMS devices using common IMS network components is provided. The method includes providing an interoperability specification/session initiation protocol (IOS/SIP) adapter configured to communicate with a base station subsystem and an IMS network. The method further includes, at the IOS/SIP adapter, receiving, from the base station subsystem a request for providing a supplementary service to a non-IMS device in communication with the base station subsystem. In response to the request, the method includes sending a message to an IMS node in the IMS network that provides the supplementary service to the non-IMS device and to IMS devices.

27 Claims, 33 Drawing Sheets

U.S. PATENT DOCUMENTS

| | | | |
|---|---|---|---|
| 7,164,913 B1* | 1/2007 | Dantu et al. | 455/436 |
| 7,173,925 B1* | 2/2007 | Dantu et al. | 370/352 |
| 7,181,537 B2 | 2/2007 | Costa-Requena et al. | |
| 7,283,506 B2 | 10/2007 | Mayer et al. | |
| 7,480,915 B2 | 1/2009 | Costa Requena et al. | |
| 7,751,359 B1* | 7/2010 | Bienn et al. | 370/328 |
| 7,836,190 B2* | 11/2010 | Väänänen et al. | 709/227 |
| 8,045,983 B2 | 10/2011 | Bantukul | |
| 8,295,457 B2 | 10/2012 | Rokosky | |
| 2002/0012433 A1 | 1/2002 | Haverinen et al. | |
| 2002/0048359 A1 | 4/2002 | Tuunanen | |
| 2002/0110104 A1* | 8/2002 | Surdila et al. | 370/338 |
| 2002/0126656 A1* | 9/2002 | Park | 370/352 |
| 2002/0176404 A1* | 11/2002 | Girard | 370/352 |
| 2003/0026245 A1* | 2/2003 | Ejzak | 370/352 |
| 2003/0026289 A1* | 2/2003 | Mukherjee et al. | 370/466 |
| 2003/0027569 A1* | 2/2003 | Ejzak | 455/432 |
| 2003/0069934 A1 | 4/2003 | Garcia-Martin et al. | |
| 2003/0095569 A1* | 5/2003 | Wengrovitz et al. | 370/467 |
| 2003/0130864 A1* | 7/2003 | Ho et al. | 705/1 |
| 2003/0169768 A1* | 9/2003 | Bienn et al. | 370/469 |
| 2004/0068574 A1 | 4/2004 | Costa Requena et al. | |
| 2004/0103157 A1* | 5/2004 | Requena et al. | 709/206 |
| 2004/0153667 A1 | 8/2004 | Kastelewicz et al. | |
| 2004/0190498 A1 | 9/2004 | Kallio et al. | |
| 2004/0190689 A1* | 9/2004 | Benitez Pelaez et al. | 379/88.13 |
| 2004/0198352 A1 | 10/2004 | Aitken et al. | |
| 2005/0002407 A1 | 1/2005 | Shaheen et al. | |
| 2005/0078642 A1 | 4/2005 | Mayer et al. | |
| 2005/0090259 A1* | 4/2005 | Jain et al. | 455/439 |
| 2005/0152275 A1* | 7/2005 | Laurila et al. | 370/241 |
| 2005/0202819 A1 | 9/2005 | Blicker | |
| 2006/0068762 A1* | 3/2006 | Baldwin et al. | 455/412.1 |
| 2006/0114885 A1* | 6/2006 | Baek et al. | 370/352 |
| 2006/0120355 A1* | 6/2006 | Zreiq et al. | 370/352 |
| 2006/0174009 A1 | 8/2006 | Martiquet et al. | |
| 2006/0206504 A1 | 9/2006 | Cai et al. | |
| 2006/0211448 A1* | 9/2006 | Reiss et al. | 455/553.1 |
| 2006/0227728 A1* | 10/2006 | Baumann | 370/260 |
| 2006/0256774 A1* | 11/2006 | Rigaldies et al. | 370/352 |
| 2007/0100981 A1 | 5/2007 | Adamczyk et al. | |
| 2007/0206613 A1* | 9/2007 | Silver et al. | 370/401 |
| 2007/0211695 A1* | 9/2007 | Shi et al. | 370/352 |
| 2007/0243870 A1 | 10/2007 | Bantukul | |
| 2007/0254648 A1 | 11/2007 | Zhang et al. | |
| 2007/0263608 A1* | 11/2007 | Han et al. | 370/356 |
| 2007/0280447 A1* | 12/2007 | Cai et al. | 379/114.03 |
| 2007/0282911 A1 | 12/2007 | Bantukul et al. | |
| 2007/0297376 A1* | 12/2007 | Gass | 370/338 |
| 2008/0008122 A1* | 1/2008 | Yoon | 370/328 |
| 2008/0090570 A1* | 4/2008 | Deshpande et al. | 455/436 |
| 2008/0304462 A1* | 12/2008 | Burgess et al. | 370/342 |
| 2008/0318551 A1* | 12/2008 | Palamara et al. | 455/411 |

FOREIGN PATENT DOCUMENTS

| | | | |
|---|---|---|---|
| WO | WO 2005/027459 A1 | | 3/2005 |
| WO | WO 2006/012381 A1 | | 2/2006 |
| WO | WO-2006/131598 A1 | * | 12/2006 |
| WO | WO-2007/024169 A1 | * | 3/2007 |
| WO | WO 2007/071269 A1 | | 6/2007 |
| WO | WO 2007/120875 A2 | | 10/2007 |
| WO | WO 2007/120876 A2 | | 10/2007 |

OTHER PUBLICATIONS

Handley et al—SDP: Session Description Protocol, RFC 2327, Apr. 1998.*

Zenner et al., Emerging Uses of SIP in Service Provider Networks, Bell Labs Technical Journal 8(1), 2003, pp. 43-63.*

Dianda et al. SIP Services Architecture, Bell Labs Technical Journal 7(1), 2002, pp. 3-23.*

Final Official Action for U.S. Appl. No. 11/787,216 (Jan. 4, 2012).

Extended European Search Report for European Application No. 08829296.6 (Dec. 30, 2011).

Second Office Action for Chinese Patent Application No. 200780021779.3 (Dec. 23, 2011).

Notification of Transmittal of the International Search Report and the Written Opinion of the International Searching Authority, or the Declaration for International Application No. PCT/US2008/075638 (Mar. 6, 2009).

First Office Action for Chinese Patent Application No. 200880114938.9 (Apr. 20, 2012).

Extended European Search Report for European Application No. 07755501.9 (Mar. 23, 2012).

Extended European Search Report for European Application No. 07755503.5 (Mar. 19, 2012).

Second Office Action for Chinese Patent Application No. 200780021709.8 (Mar. 1, 2012).

"Telecommunications and Internet converged Services and Protocols for Advanced Networking (TISPAN); IP Multimedia Subsystem (IMS); Functional architecture," ETSI ES 282 007, V1.1.1 (Mar. 2006).

Notice of Allowance and Fee(s) Due for U.S. Appl. No. 11/787,199 (Jun. 9, 2011).

Non-Final Official Action for U.S. Appl. No. 11/787,216 (Jun. 7, 2011).

First Office Action for Chinese Patent Application No. 200780021709.8 (Apr. 19, 2011).

First Office Action for Chinese Patent Application No. 200780021779.3 (Jan. 25, 2011).

Communication of European publication No. and information on the application of Article 67(3) EPC for European Application No. 08829296.6 (May 27, 2010).

Third Office Action for Chinese Patent Application No. 200780021779.3 (Jun. 15, 2012).

Interview Summary for U.S. Appl. No. 11/787,216 (Jul. 12, 2010).

Final Official Action for U.S. Appl. No. 11/787,216 (Mar. 18, 2010).

Final Official Action for U.S. Appl. No. 11/787,199 (Dec. 11, 2009).

Interview Summary for U.S. Appl. No. 11/787,216 (Nov. 30, 2009).

Interview Summary for U.S. Appl. No. 11/787,199 (Oct. 5, 2009).

Official Action for U.S. Appl. No. 11/787,216 (Jul. 8, 2009).

Official Action for U.S. Appl. No. 11/787,199 (Jun. 12, 2009).

Official Action for U.S. Appl. No. 11/787,199 (Jan. 29, 2009).

Communication of European Publication No. and Information on the Application of Article 67(3) EPC for European Patent No. 2011347 (Dec. 10, 2008).

Communication of European Publication No. and Information on the Application of Article 67(3) EPC for European Patent No. 2011346 (Dec. 10, 2008).

"IP Multimedia Subsystem," http://en.wikipedia.org/wiki/IP_Multimedia_Subsystem, pp. 1-14 (Downloaded from the Internet Nov. 11, 2008).

Notification of Transmittal of the International Search Report and the Written Opinion of the International Searching Authority, or the Declaration for International Application No. PCT/US07/09252 (Sep. 22, 2008).

Notification of Transmittal of the International Search Report and the Written Opinion of the International Searching Authority, or the Declaration for International Application No. PCT/US07/09254 (Sep. 15, 2008).

Official Action for U.S. Appl. No. 11/787,199 (Jun. 11, 2008).

Xie et al., "Enhancements to RTP Payload Formats for EVRC Family Codecs," RFC 4788 (Jan. 2007).

"3rd Generation Partnership Project; Technical Specification Group Core Network; Numbering, addressing and identification (Release 5)," 3GPP TS 23.003, V5.11.0, pp. 1-39 (Jun. 2006).

Email re: [Sipping] MIME media types for SCCP and TCAP Objects (Mar. 23, 2005).

Worster et al., "Encapsulating MPLS in IP or Generic Routing Encapsulation (GRE)," RFC 4023, pp. 1-14 (Mar. 2005).

Peterson, "A Privacy Mechanism for the Session Initiation Protocol (SIP)," RFC 3323, pp. 1-21 (Nov. 2002).

Sidebottom et al., "Signaling System 7 (SS7) Message Transfer Part 3 (MTP3)—User Adaptation Layer (M3UA)," RFC 3332, pp. 1-113 (Sep. 2002).

Faynberg et al., "Service in the Public Switched Telephone Network/ Intelligent Network (PSTN/IN) Requesting Internet Service (SPIRITS) Protocol Requirments," Lucent Technologies, RFC 3298, pp. 1-17 (Aug. 2002).

Digitial Cellular Telecommunications System (Phase 2+); Universal Mobile Telecommunications System (UMTS); Signalling Flows for the IP Multimedia Call Control Based on SIP and SDP; Stage 3 (3GPP TS 24.228 Version 5.1.0 Release 5), pp. 1-346 (Jun. 2002).

Roach, "Session Initiation Protocol (SIP)-Specific Event Notification," dynamicsoft, RFC 3265, pp. 1-38 (Jun. 2002).

Rosenberg et al., "SIP: Session Initiation Protocol," RFC 3261, pp. 1-252 (Jun. 2002).

"AIN/SIP Interworking," SR-5208, Telcordia Document (Dec. 20, 2001).

"Selected AIN Triggers in a SIP Environment," SR-5219, Telcordia Document (Dec. 18, 2001).

Notice of Allowance and Fee(s) Due for U.S. Appl. No. 11/787,216 (Aug. 30, 2012).

Third Office Action for Chinese Patent Application No. 200780021709.8 (Aug. 1, 2012).

"3rd Generation Partnership Project; Technical Specification Group Core Network and Terminals; Numbering, addressing and identification (Release 8)," Global System for Mobile Communications, 3GPP TS 23.003, V8.1.0, pp. 1-60 (Jun. 2008).

"Tatara Systems Collaborates with AirWalk on SIP-Based CDMA Femtocell Solution," Tatara Systems, pp. 1-2 (Mar. 31, 2008).

Camarillo et al., "Subscriptions to Request-Contained Resource Lists in the Session Initiation Protocol (SIP)," SIPPING Working Group, pp. 1-10 (Jan. 26, 2007).

Roach et al., "A Session Initiation Protocol (SIP) Event Notification Extension for Resource Lists," Network Working Group, pp. 1-37 (Aug. 2006).

"Interoperability Specification (IOS) for CDMA 2000 Access Network Interfaces—Part 4 (A1, A2, and A5 Interfaces)," 3rd Generation Partnership Project 2, 3GPP2 A.S0014-0, Version 1.0, pp. 1-339 (Nov. 16, 2001).

"EdgePoint™," AirWalk Communications, Inc., pp. 1-2 (Publication Date Unknown).

"OneRAN™ Series," AirWalk Communications, Inc., pp. 1-2 (Publication Date Unknown).

"Short Message Service," 3rd Generation Partnership Project 2, 3GPP2 C.S0015-0, pp. 1-52 (Publication Date Unknown).

"Cellular Radiotelecommunications Intersystem Operations," 3rd Generation Partnership Project 2, 3GPP2 N.S0005-0, Version 1.0, pp. 1-1492 (Publication Date Unknown).

* cited by examiner

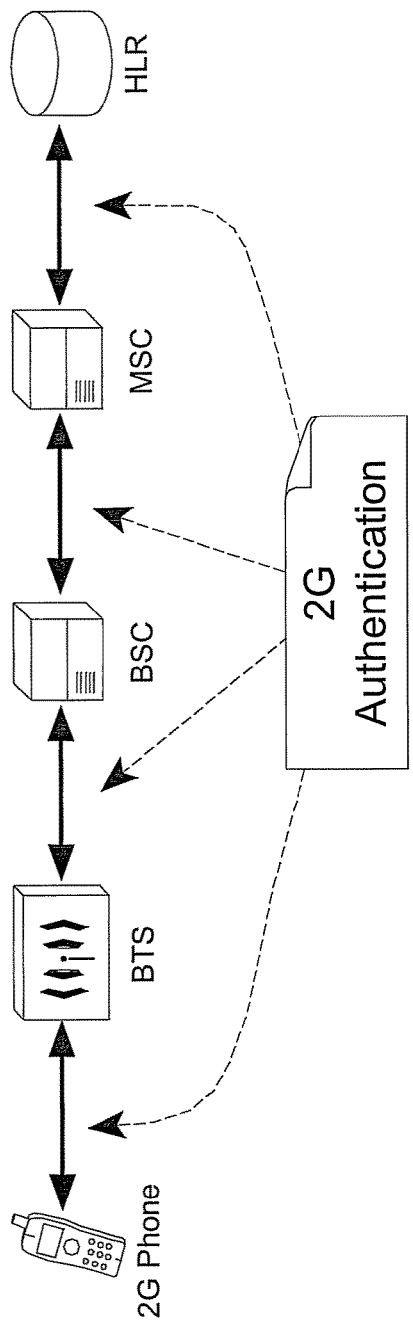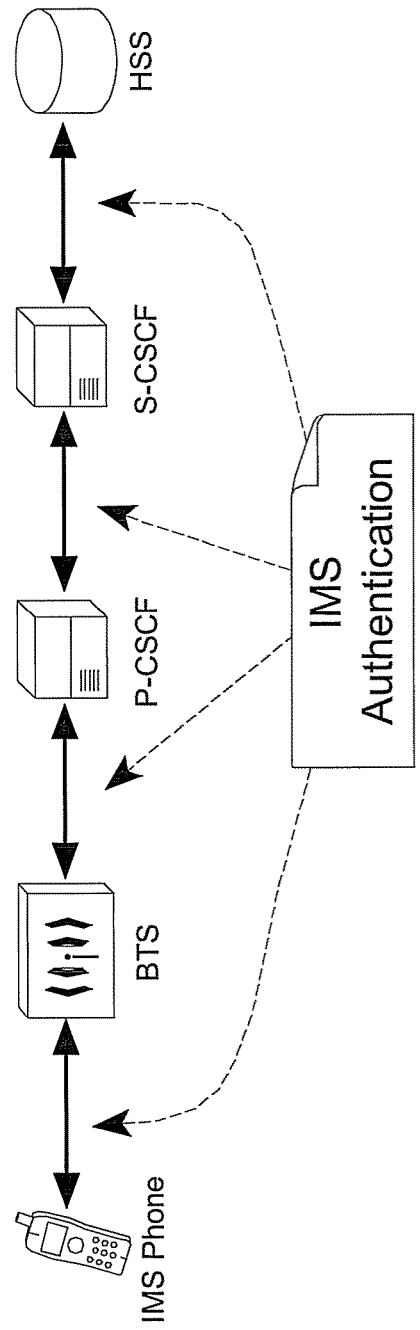
FIG. 16A
FIG. 16B

METHODS, SYSTEMS, AND COMPUTER READABLE MEDIA FOR PROVIDING SERVICES IN A TELECOMMUNICATIONS NETWORK USING INTEROPERABILITY SPECIFICATION/SESSION INITIATION PROTOCOL (IOS/SIP) ADAPTER

RELATED APPLICATIONS

This application claims the benefit of U.S. Provisional Patent Application Ser. No. 60/967,669, filed Sep. 6, 2007; the disclosure of which is incorporated herein by reference in its entirety.

TECHNICAL FIELD

The subject matter described herein relates to providing services in a telecommunications network. More particularly, the subject matter described herein relates to methods, systems, and computer readable media for providing services in a telecommunications network using interoperability specification/session initiation protocol (IOS/SIP) adapter.

BACKGROUND

In telecommunications network, SIP is one of many signaling protocols used to establish communication sessions between users and to provide supplementary services to the users. SIP is defined in IETF RFC 3261. One particular type of network that uses SIP is IP Multi-media Subsystem (IMS) Networks. IMS is defined by the Third Generation Partnership Project (3GPP) as a mobile network infrastructure that enables the convergence of data, speech, and mobile network technology over an IP based infrastructure. IMS bridges the gap between existing traditional telecommunications technology and internet technology, allowing network off-roaders to offer standardized, re-useable platforms that provide services using IP connected elements. The key IMS components that are used to provide telecommunications sessions and supplementary services are the Call Session Control Function (CSCF) and Home Subscriber Server (HSS). The CSCF is a proxy, which aides in set-up and management of sessions and forwards messages between IMS networks. The HSS holds all of the key subscriber information and enables users to locate and communicate with other users.

In telecommunications networks, subscribers are migrating from non-IMS devices to IMS devices. For example, a given network operator may have subscribers that use non-IMS terminals, such as CDMA terminals, and IMS terminals to communicate. In order for the network operator to support both non-IMS and IMS terminals, the network operator would either be required to have two parallel sets of network equipment that provide services to the IMS and non-IMS subscribers or to convert messaging between IMS and non-IMS protocols. One conventional method for supporting non-IMS or SIP subscribers is to provide a convergence server that receives tunneled IOS signaling from non-IMS terminals where the convergence server provides supplementary services to the non-IMS devices and to provide a separate set of IMS nodes that provide IMS signaling. This conventional solution is illustrated in FIG. 1. Referring to FIG. 1, when legacy terminal 100 seeks to access the IMS for a supplementary service, such as three-way calling, legacy terminal 100 first communicates with a femto cell node 102, which tunnels IMS signaling through the core IMS network 104 to a convergence server 106. Convergence server 106 communicates with terminal 100 using IOS signaling to provide the supplementary service. If the same network operator also has IMS terminals for which the operator decides to provide service, a separate set of IMS nodes must be used to provide that service. For example, in FIG. 1, if IMS terminal 108 seeks to access a supplementary service, terminal 108 contacts one of IMS application servers 110 and 112 via macro cell 114 and IMS core 104 using IMS signaling.

The solution illustrated in FIG. 1 is undesirable because same services are duplicated on convergence server 106 and IMS application servers 110 and 112. When the network operator moves to a pure IMS network, convergence over 106 becomes unnecessary and therefore a wasteful capital expense. In addition, when providing a standard service, such as voice calls, to legacy subscribers, the messages that are tunneled to convergence server 106 do not provide sufficient information to set-up the call, resulting in unnecessary signaling.

Another problem associated with IMS networks is the ability to identify non-IMS subscribers or devices to the IMS network. For example, in IMS networks, subscribers and devices are identified using SIP uniform resource identifiers (URIs). An example of a typical SIP URI is (phone number)@(IP address) or (operator domain). In contrast, legacy terminals use one or a combination of international mobile station identify (IMSI), mobile directory number (MDN) and equipment serial number (ESN) to identify subscriber terminals or devices. These legacy terminal identifiers cannot be used within the IMS core. However, these legacy identifiers must still be usable by legacy devices to identify themselves in non-IMS networks. Accordingly, there exists a need for a forwards and backwards compatible solution for identifying legacy devices to the IMS network.

Yet another problem associated with IMS networks involves excessive messaging associated with registration subscriptions. When an IMS terminal registers with an IMS network, the IMS terminal sends a register message to the IMS network. The IMS terminal also sends a subscribe message to the IMS network to subscribe to the status of the subscriber's registration. The IMS network maintains on a subscriber-by-subscriber basis, a registration subscription. When the subscriber subscription times out, the network sends a notify message to the subscriber notifying the subscriber that the subscriber is required to re-register. Requiring a network node, such as a femto cell node, to send subscribe messages for each subscriber registration can result in a significant amount of messaging between the femto cell node and the IMS network. Such messaging and the processing of such messaging can burden the network and the femto cell node.

Accordingly, in light of these difficulties, there exists a need for methods, systems, and computer readable media for providing services in a telecommunications network using an IOS/SIP adapter.

SUMMARY

The subject matter described herein includes methods, systems, and computer readable media for providing services in a telecommunications network using an IOS/SIP adapter. According to one aspect of the subject matter described herein, a method for providing supplementary services to IMS devices and non-IMS devices using common IMS network components is provided. The method includes providing an interoperability specification/session initiation protocol (IOS/SIP) adapter configured to communicate with a base station subsystem and an IMS network. The method further includes, at the IOS/SIP adapter, receiving, from the base station subsystem a request for providing a supplementary service to a non-IMS device in communication with the base station subsystem. In response to the request, the method includes sending a message to an IMS node in the IMS network that provides the supplementary service to the non-IMS device and to IMS devices.

According to another aspect, the subject matter described herein includes a method for registering a non-IMS device with the IMS network. The method includes providing an IOS/SIP adapter configured to communicate with a base station subsystem and an IMS network. The method further includes, at the IOS/SIP adapter, associating a temporary IMS identifier with a non-IMS identifier for a non-IMS device for identifying the non-IMS device to IMS network, and formulating and sending an IMS registration message to the IMS network, where the message includes the temporary IMS identifier.

According to another aspect, a method for call set-up using an IOS/SIP adapter is provided. The method includes, at an IOS/SIP adapter, receiving an IOS call set-up message in response to a call originating from a non-IMS device. At the IOS/SIP adapter, in response to the IOS call set-up message, the method includes formulating an IMS message for setting up the call in an IMS network, where the IMS messaging includes information for setting up the call, including at least the calling party identifier. The method further includes sending the IMS message to the IMS network.

According to another aspect, the subject matter described herein includes a method for aggregating subscriptions of non IP multimedia subsystem (non-IMS) devices to state information maintained by the IMS network. The method includes providing an IOS/SIP adapter configured to communicate with the base station subsystem and an IMS network. The method further includes, at the IOS/SIP adapter, receiving subscription requests for subscribing to registration status information for plural non-IMS terminals, and generating a resource list containing virtual subscriptions for the non-IMS terminals. The method further includes providing the resource list to the IMS network.

According to another aspect of the subject matter described herein, a method for invoking a supplementary service providing by an IMS network from an IOS network is provided. The method includes receiving, from a base station subsystem, an IOS message associated with a request for supplementary service. The method includes translating the IOS message to a SIP message for furthering the providing of the supplementary service. The method further includes transmitting the SIP message to an IMS node.

According to another aspect of the subject matter described herein, a method for effecting short message service (SMS) transactions using an interoperability standard/session initiation protocol (IOS/SIP) adapter is provided. The method includes receiving, from a base station subsystem, an IOS message associated with an SMS transaction. The method further includes translating the IOS message into a SIP message associated with the SMS transaction. The method further includes transmitting the SIP message to an IMS node that facilitates SMS transactions for IMS and non-IMS devices.

According to another aspect of the subject matter described herein, an IOS/SIP adapter is provided. The IOS/SIP adapter includes an IOS network interface module configured to communicate with a base station subsystem in communication with a non IP multimedia subsystem (non-IMS) device. The IOS/SIP adapter further includes a SIP network interface module configured to communicate with an IMS network. The IOS/SIP adapter further includes an IOS/SIP converter for converting between SIP and IOS, wherein, when the IOS network interface module receives a request from the base station subsystem in communication with the non-IMS device for a supplementary service, the IOS/SIP converter module formulates a message for invoking the supplementary service, and the SIP module sends the message to an IMS node in the IMS network that provides the supplementary service to the non-IMS device and to IMS devices.

According to another aspect, the subject matter described herein includes a computer readable medium having stored thereon computer executable instructions that when executed by the processor of a computer perform steps. The steps include receiving an IOS message associated with one of: call setup, an SMS message transaction, and providing of a supplementary service. The steps further include translating the IOS message to a SIP message associated with the one of: call setup, the SMS message transaction, and the providing of the supplementary service. The steps further include forwarding the SIP message to an IMS node in the IMS network that facilitates the one of: call setup, SMS message transactions, and the providing of the supplementary service for non-IMS devices and IMS devices.

The subject matter described herein for providing services in a telecommunications network using an IOS/SIP adapter can be implemented using a computer readable medium having stored thereon computer executable instructions that when executed by the processor of a computer perform steps. Exemplary computer readable media suitable for implementing subject matter described herein include chip memory devices, disk memory devices, programmable logic devices, and application specific integrated circuits. In addition, computer readable medium that implements the subject matter described herein may be located on the single device or computing platform or may be distributed across multiple devices and/or computing platforms.

BRIEF DESCRIPTION OF THE DRAWINGS

Preferred embodiments of the subject matter described herein will now be explained with reference to the accompanying drawings of which:

FIGS. 16A-16C illustrate exemplary steps associated with 2G-IMS identity synthesis using an IOS/SIP adapter according to an embodiment of the subject matter described herein;

DETAILED DESCRIPTION

Figure 1:
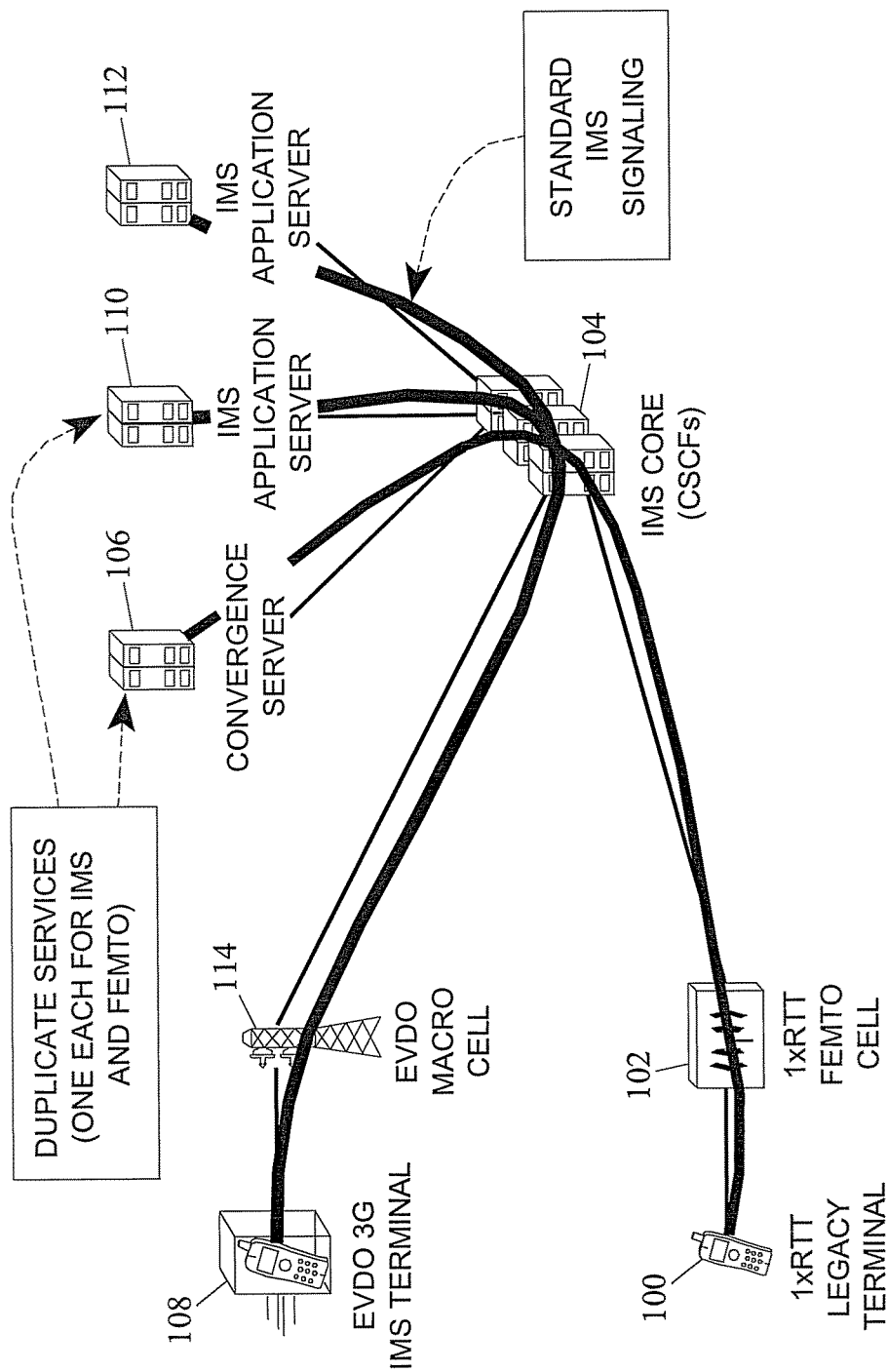
FIG. 1 is a network diagram illustrating a hybrid IMS deployment using convergence server.
Figure 2:
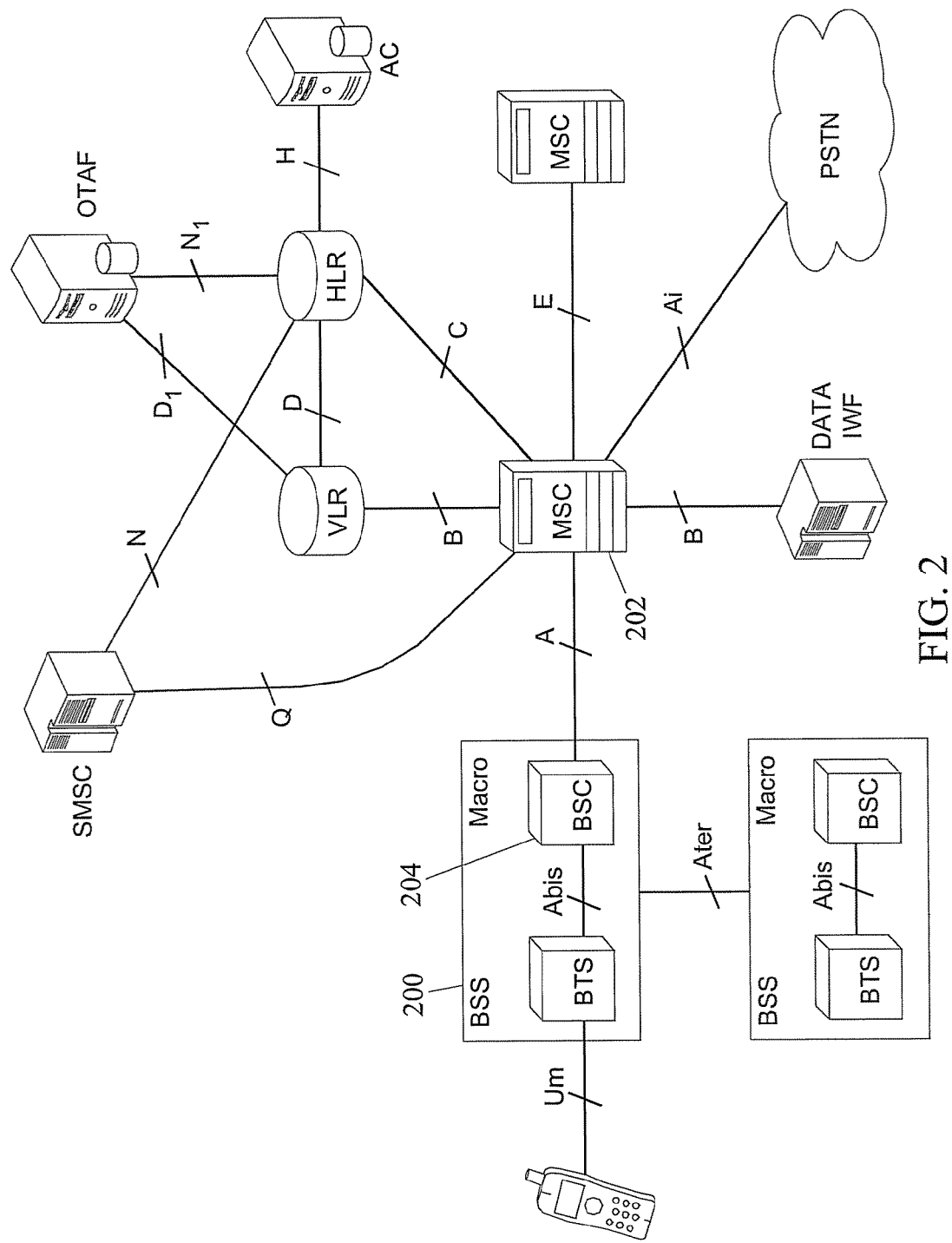
FIG. 2 is a network diagram illustrating a conventional CDMA network.

The subject matter described herein includes methods, systems, and computer readable media for providing services in a telecommunications network using an IOS/SIP adapter. FIG. 2 is a network diagram illustrating a traditional CDMA network and the associated interfaces in the network. Of particular interest to the subject matter described herein is the A-interface between base station subsystem (BSS) 200 and mobile switching center (MSC) 202. More particularly, the A-interface is used to communicate between base station controller (BSC) 204 of BSS 200 and MSC 202. The signaling protocol used on the A interface is commonly referred to as IOS. The IOS protocol and specification for the interface is described in 3GPP2, "Interoperability Specification (IOS) for CDMA 2000 Access Network Specifications-Part 4 (A1, A2, and A5 interfaces)," revision 0 (3G IOSV4.2) (Nov. 16, 2001), the disclosure of which is incorporated herein referenced in its entirety.

Some traditional network deployments rely on a number of macro cell transceivers to provide radio coverage. These macro cells communicate back to an MSC, such as MSC 202 illustrated in FIG. 2, which coordinates mobile phone location and call processing. In high density locations, these macro cells can be supplemented by smaller micro cells, which are designed to provide coverage over small areas that would not otherwise be covered by the cell phone network. This general concept of making smaller cells to supplement network coverage can be extended to even smaller packages, such as pico cells and femto cells. An IOS/SIP adapter according to embodiments of the subject matter described herein may be utilized with traditional macro cell transceivers, micro cell transceivers, pico cell transceivers, and femto cell transceivers, or any other division of a cell in a radio communications network.

Figure 3:
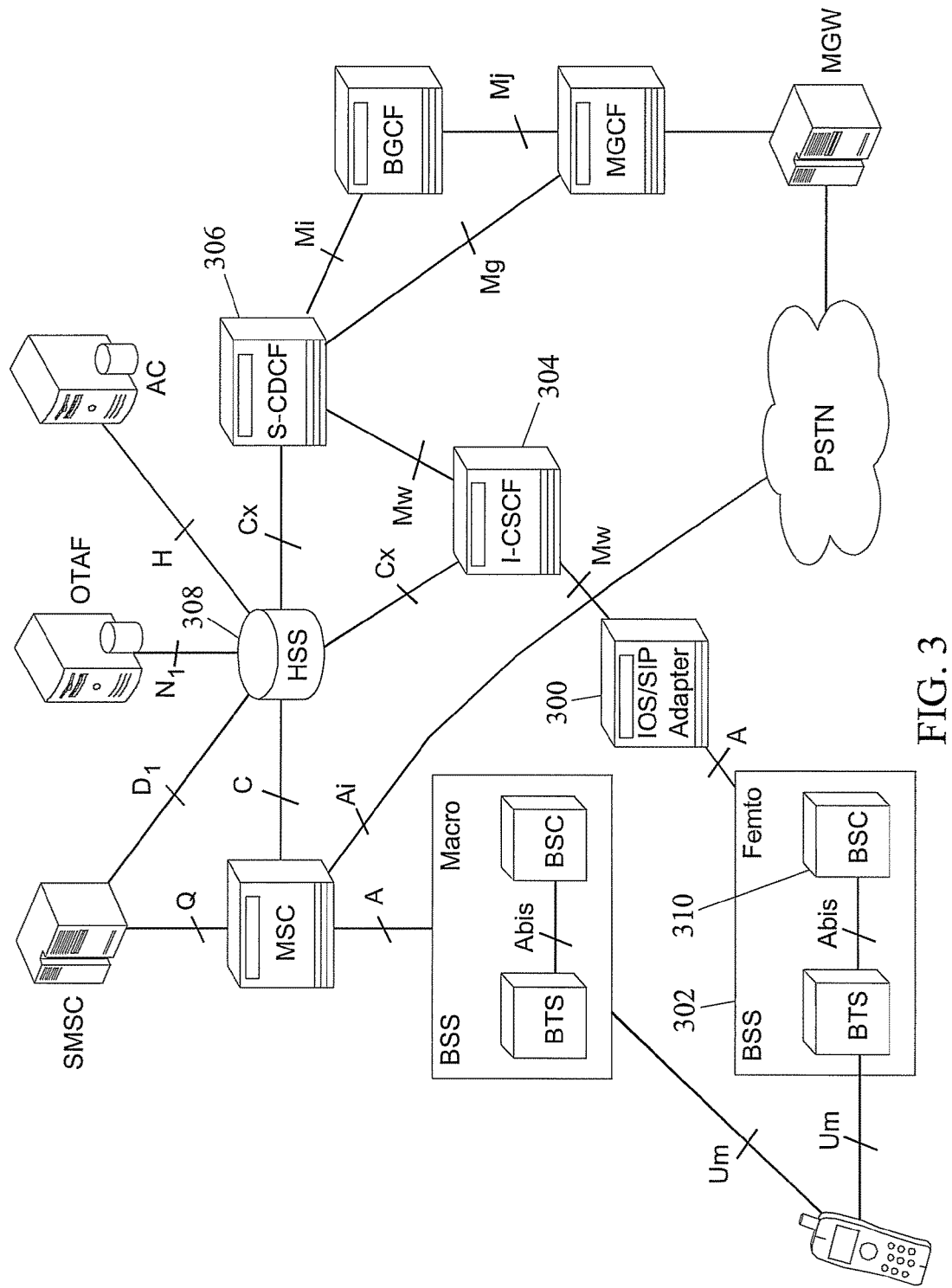
FIG. 3 is a network diagram illustrating an IMS deployment using an IOS/SIP adapter according to an embodiment of the subject matter described herein.

FIG. 3 is a network diagram illustrating an exemplary femto cell deployment of an IOS/SIP adapter according to an embodiment of the subject matter described herein. Referring to FIG. 3, IOS/SIP adapter 300 is located on the A-interface between a femto cell base station subsystem 302 and an interrogating call session control function (I-CSCF 304). In the example illustrated in FIG. 3, IOS/SIP adapter 300 converts between the IOS protocol used by femto cell base station subsystem 302 to the SIP protocol used by the IMS network and vice versa. By performing such conversion, the network operator can deploy an IMS network without replacing all of the operator's subscriber terminals. That is, CDMA terminals can access IMS network services provided by IMS network nodes. Importantly, the network operator can use the same IMS nodes, such as I-CSCF 304, S-CSCF 306, and home subscriber server (HSS) 304 to provide services, such as supplementary services (defined below) to subscribers that use IMS compatible terminals and to subscribers that have non-IMS-compatible terminals. Examples of message flows for various supplemental services that can be provided using IOS/SIP adapter 300 will be described in detail below. The implementation illustrated in FIG. 3 can be contrasted with implementations that require a convergence server where the IMS network simply tunnels IOS packets to the convergence server and the convergence server provides the services.

From the perspective of the networks that IOS/SIP adapter 300 is bridging, IOS/SIP adapter 300 appears as an MSC from the perspective of base station controller 310 and as a proxy-CSCF (P-CSCF) in a roamed-to network from the perspective of I-CSCF 304.

Figure 4:
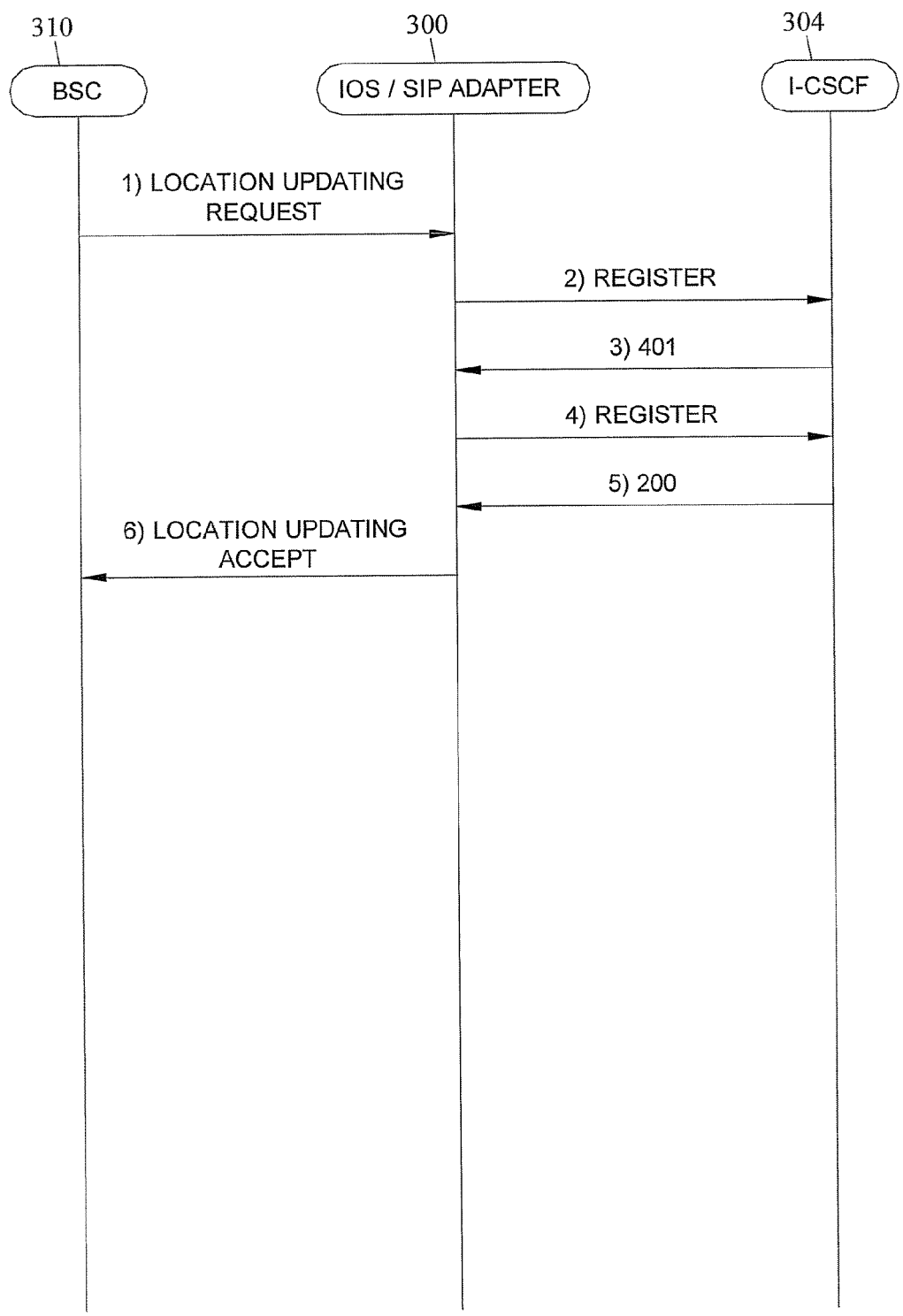
FIG. 4 is a message flow diagram illustrating exemplary messaging associated with registration of a non-IMS terminal using an IOS/SIP adapter according to an embodiment of the subject matter described herein.

One service that IOS/SIP adapter 300 provides to non-IMS terminals is registration service. FIG. 4 is a message flow diagram illustrating exemplary messages that may be exchanged between network nodes when registering a non-IMS terminal using IOS/SIP adapter 300. Referring to FIG. 4, in line 1 of the message flow diagram, IOS/SIP adapter 300 receives a location updating request message from BSC 310. Exemplary parameters of the location updating request message are shown below in Table 1.

Location Updating Request

TABLE 1

| Location Updating Request Parameter Mapping | |
|---|---|
| IOS Parameter | Use |
| Protocol Discriminator | Should be 0x05 (Mobility Management) |
| Message Type | Should always be 0x08 |
| IMSI | Used to generate user ID for "To" and "From" header fields, per 3GPP 23.003 procedures. (described below) |
| Classmark Information Type 2 | If "mobile term" bit is 0, suppress SIP registration. |
| Registration Type | If "Zone-Based" or "Distance Based," force SIP re-registration. If "Power-Down," tear down SIP registration. All other types correspond to normal |

TABLE 1-continued

Location Updating Request Parameter Mapping

| IOS Parameter | Use |
| --- | --- |
| | registration - start new registration if none present; refresh IOS-side timers otherwise. |
| ESN | Used to calculate user credentials, if ESN-based credential generation is configured; otherwise, discarded. |
| Slot Cycle Index | Ignored |
| Authentication Response Parameter (AUTHR) | Ignored |
| Authentication Confirmation Parameter (RANDC) | Ignored |
| Authentication Parameter Count | Ignored |
| Authentication Challenge Parameter (RAND) | Ignored |
| Authentication Event | Ignored |
| User Zone ID | Ignored |
| IS-2000 Mobile Capabilities | Cache geoloc mechanism for later coding into E911 calls |
| Protocol Revision | If present, stored for use in corresponding "Location Updating Accept" or "Location Updating Reject" message. |

In line 2 of the message flow diagram, based on the parameters in the location updating request message, IOS/SIP adapter 300 generates a SIP register message and forwards the message through I-CSCF 304.

In line 3 of the message flow diagram, the network challenges the register message with a 401 or alternatively 407.

In line 4 of the message flow diagram, if the equipment's serial number (ESN) field is present in the location updating request message and IOS/SIP adapter 300 is configured to synthesize credentials (as will be described in more detail below), then IOS/SIP adapter 300 synthesizes the credentials as a hash of the IMSI, the ESN, and a systems wide secret as will be described in more detail below. Otherwise, the system uses provision credentials. Assuming that credentials can be synthesized or retrieved, IOS/SIP adapter 300 creates a response to the 401 or 407 challenge and resends the register request.

In line 5 of the message flow diagram, I-CSCF 304 responds to the register request with a SIP 200 OK message.

In line 6 of the message flow diagram, IOS/SIP adapter 300 sends a location updating accept message to the BSC 310.

Figure 5:
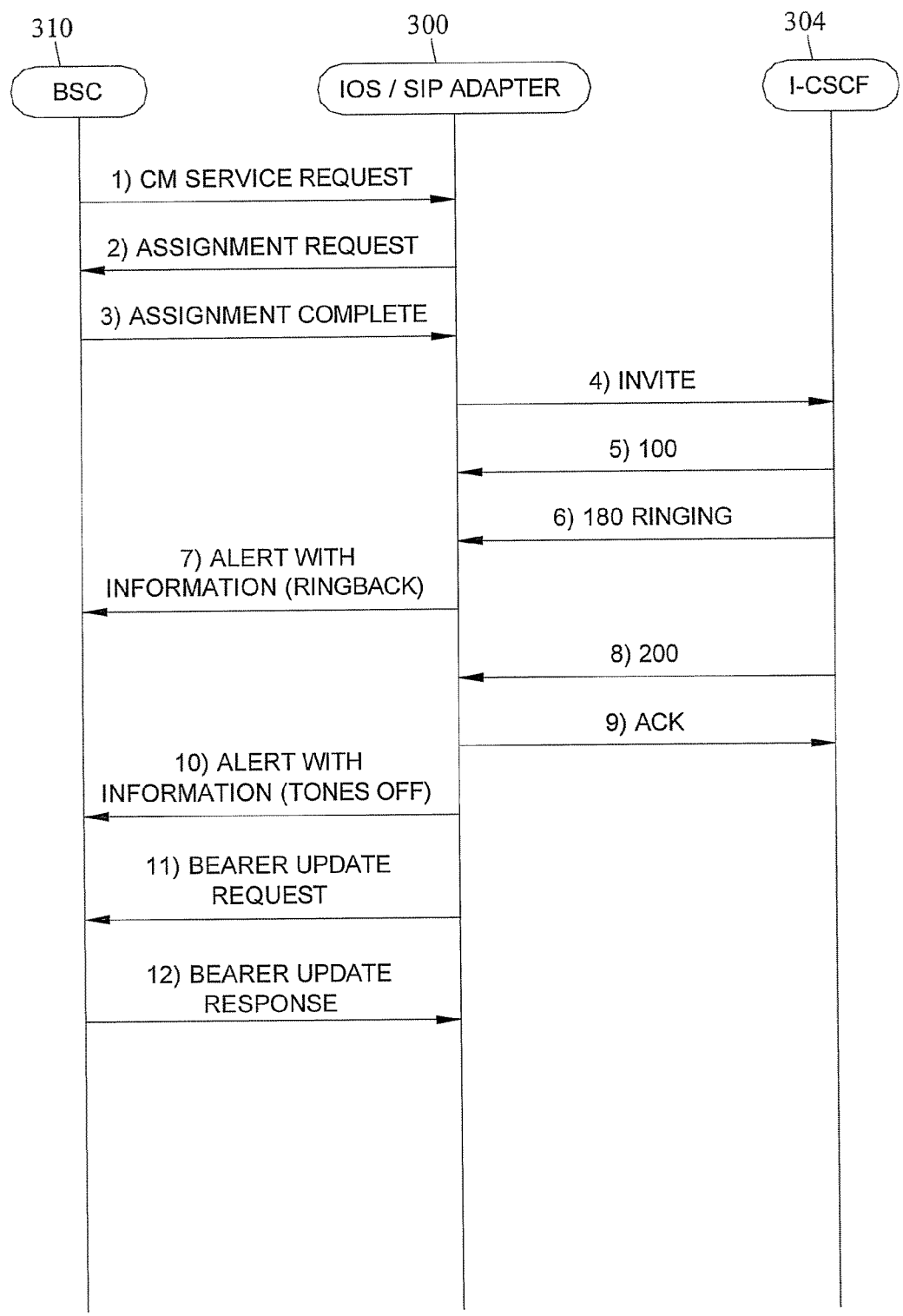
FIG. 5 is a message flow diagram illustrating mobile originated call origination using an IOS/SIP adapter according to an embodiment of the subject matter described herein.

Another service that may be provided to non-IMS terminals using IOS/SIP adapter 300 is call origination service. FIG. 5 is a message flow diagram illustrating exemplary messages that may be exchanged using IOS/SIP adapter 300 for the mobile originating leg of a call. Referring to FIG. 5, in line 1 of the message flow diagram, IOS/SIP adapter 300 receives an IOS connection management (CM) service request message from BSC 310. The CM service request message is sent in response to a mobile terminals' originating access attempt that is received by BSC 310.

In line 2 of the message flow diagram, in response to the CM service request message, IOS/SIP adapter 300 sends an assignment request message to BSC 310. According to the IOS protocol, the assignment request message is sent from the MSC to the base station to request assignment of radio resources. Thus, in line 2, IOS/SIP adapter 300 appears as an MSC to BSC 310.

In line 3 of the message flow diagram, BSC 310 sends an assignment complete message to IOS/SIP adapter 300. The assignment complete message is a BSMAP message that indicates that the requested assignment of radio resources has been completed correctly. The sending of the assignment complete message also indicates to IOS/SIP adapter 300 that IOS/SIP adapter 300 will be responsible for providing in-band treatment of the call, if required.

In line 4 of the message flow diagram, IOS/SIP adapter 300 sends a SIP INVITE message to I-CSCF 304. Unlike convergence server implementations, the SIP INVITE message contains information needed to complete the call, including at least the called and calling party numbers.

In line 5 of the message flow diagram, I-CSCF 304 sends a SIP 100 message to IOS/SIP adapter 300.

In line 6 of the message flow diagram, I-CSCF 304 sends a SIP 180 ringing message to IOS/SIP adapter 300.

In line 7 of the message flow diagram, in response to the ringing message, IOS/SIP adapter 300 sends an alert message to BSC 310 instructing BSC 310 to play a ring-back tone to the originating mobile terminal.

In line 8 of the message flow diagram, when the called subscriber answers, I-CSCF 304 sends a 200 OK message to IOS/SIP adapter 300.

In line 9 of the message flow diagram, IOS/SIP adapter 300 acknowledges the 200 OK message.

In line 10 of the message flow diagram, IOS/SIP adapter sends an alert with information message to BSC 310 indicating to BSC 310 to cease playing the ring-back tone.

In line 11 of the message flow diagram, IOS/SIP adapter 300 sends a bearer update request message to BSC 310.

In line 12 of the message flow diagram, BSC 310 sends a bearer update response message to IOS/SIP adapter 300.

Figure 6:
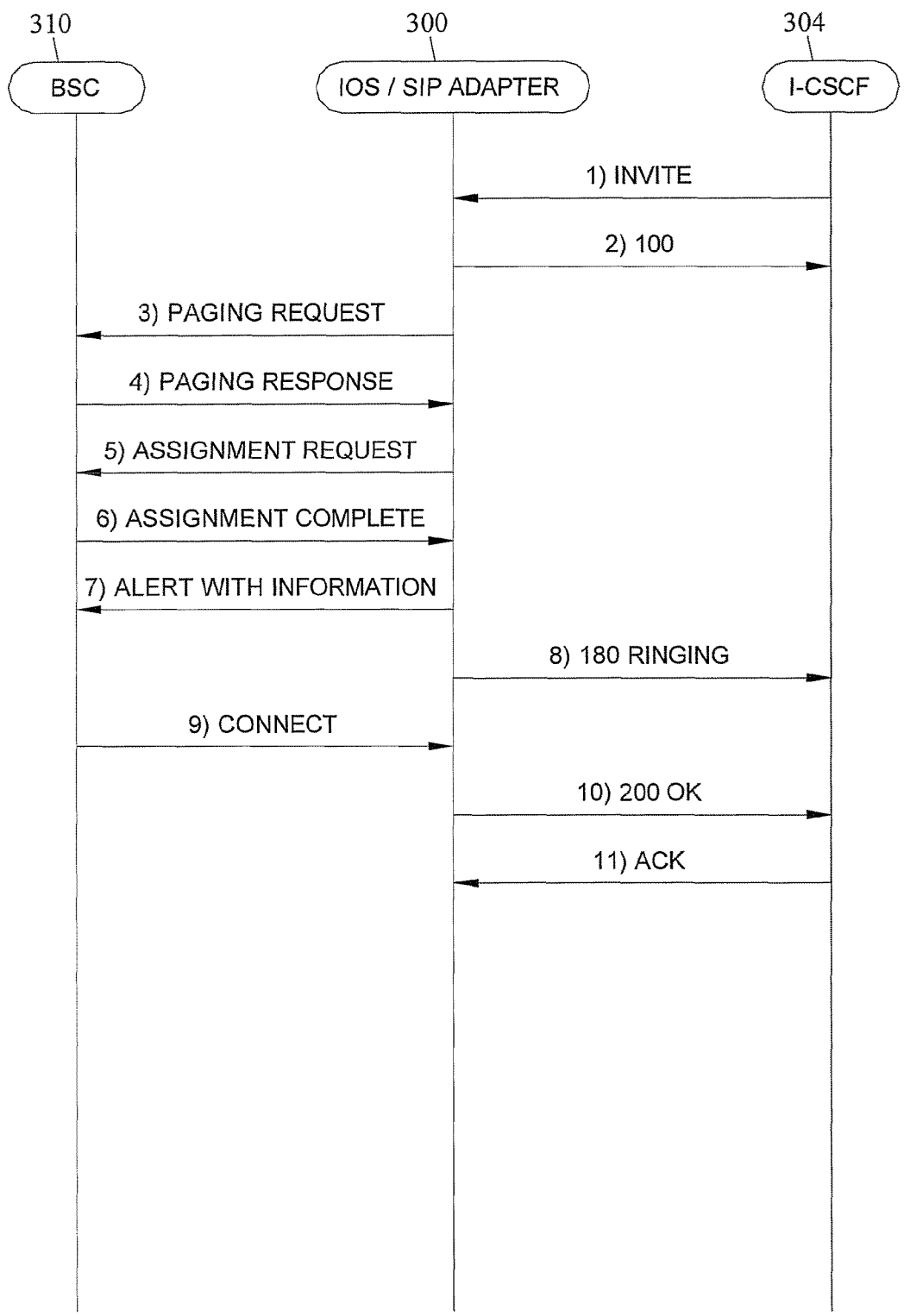
FIG. 6 is a message flow diagram illustrating network originated call origination using an IOS/SIP adapter according to an embodiment of the subject matter described herein.

In addition to setting up mobile originated call legs to non-IMS terminals, IOS/SIP adapter 300 may also facilitate the establishment of network originated call legs from IMS with non-IMS terminals to non-IMS terminals. FIG. 6 is a message flow diagram illustrating exemplary messaging that may be implemented using an IOS/SIP adapter for a network originating call leg according to an embodiment of the subject described herein. Referring to FIG. 6, in line 1, IOS/SIP adapter 300 receives an INVITE message from I-CSCF 304. The INVITE message may include parameters for initiating a session with the mobile terminal. In line 2, IOS/SIP adapter 300 sends a 100 message to I-CSCF 304 to acknowledge receipt of the INVITE message. In line 3, IOS/SIP 300 sends a paging request message to BSC 310. The paging request message is a BSMAP message that is sent from the MSC to the base station to initiate a mobile terminated call set-up scenario. In line 5 of the message flow diagram, BSC 310 sends a paging response message to IOS/SIP adapter 300.

In line 5 of the message flow diagram, IOS/SIP adapter 300 sends an assignment request message to BSC 310 to request the assignment of radio resources for the call. In line 6, IOS/SIP adapter 300 receives an assignment complete message indicating that the resources have been established. In line 7 of the message flow diagram, IOS/SIP adapter 300 sends an alert with information message to BSC 310 to alert the mobile terminal of an incoming call. In line 8 of the message flow diagram, IOS/SIP adapter 300 sends a ringing message to I-CSCF 304 indicating that the called mobile terminal is being alerted to the call.

Once the called mobile terminal accepts the call, in line 9 of the message flow diagram, BSC 310 sends a connect message to IOS/SIP adapter 300. In line 10 of the message flow diagram, IOS/SIP adapter 300 sends a 200 OK message in response to the original INVITE message indicating that the session has been established. In line 11 of the message flow diagram, I-CSCF 304 acknowledges the 200 OK message.

Yet another service that may be provided to a non-IMS terminal using IOS/SIP adapter 300 is call clearing service.

Figure 7A:
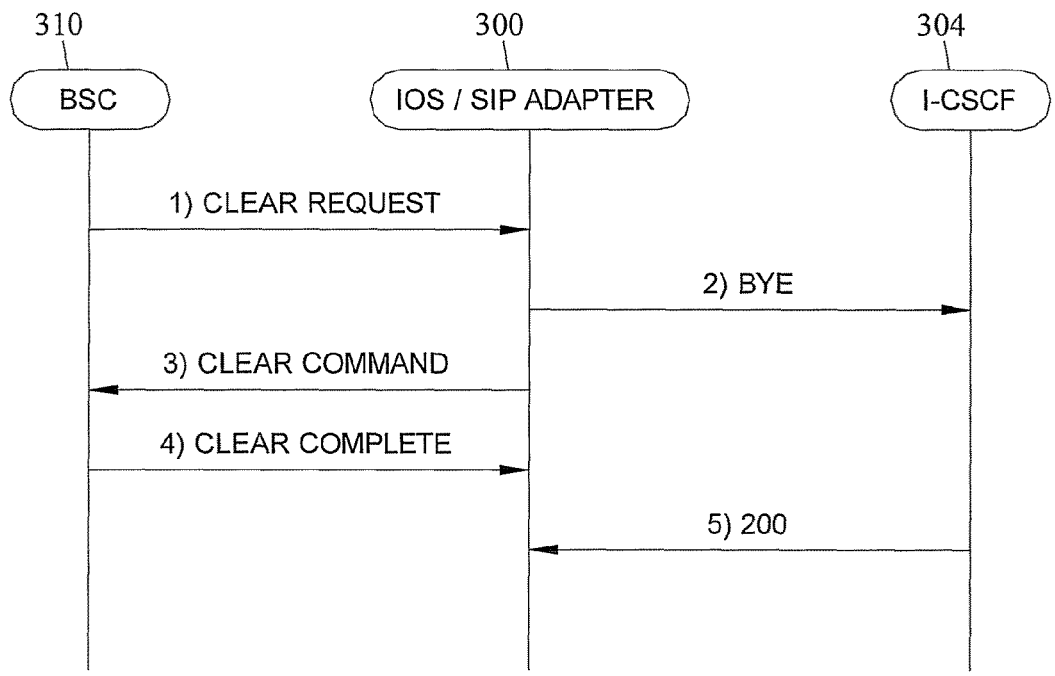
FIGS. 7A and 7B are message flow diagrams illustrating exemplary message flows associated with mobile originated and network originated call clearing using IOS/SIP adapter according to an embodiment of the subject matter described herein.
Figure 7B:
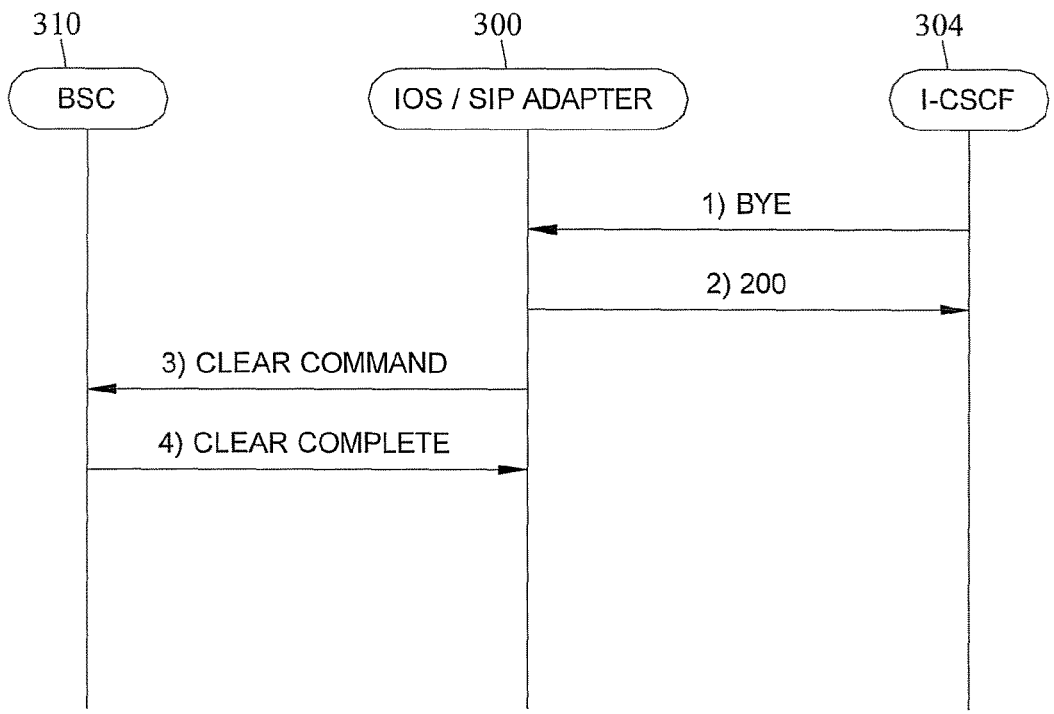

FIGS. 7A and 7B illustrate exemplary messages that are exchanged between entities using IOS/SIP adapter 300 in clearing mobile originated and network originated call legs. Referring to FIG. 7A, in line 1 of the message flow diagram, IOS/SIP adapter 300 receives a clear request message from BSC 310. The clear request message may be sent in response to the mobile terminal in communication with BSC 310 releasing the call. In line 2 of the message flow diagram, IOS/SIP adapter 300 formulates a by-message and sends the by-message to I-CSCF 304.

In line 3 of the message flow diagram, IOS/SIP adapter 300 sends a clear command to BSC 310. The clear command sent in response to the clear request and instructs BSC 310 to release resources associated with the call. In line 4 of the message flow diagram, BSC 310 sends a clear complete message to IOS/SIP adapter 300 indicating that the resources have been freed. In line 5 of the message flow diagram, I-CSCF sends a 200 OK message confirming that the resources for the call have been released by the other end of the session or call.

The messages illustrated FIG. 7B are the same as those illustrated in 7A except that termination is originated from the mobile terminal that is not connected to BSC 310 and the mobile terminating leg of the call is cleared. A description of these messages will not be repeated as they have already been discussed with regard to FIG. 7A.

Figure 8A:
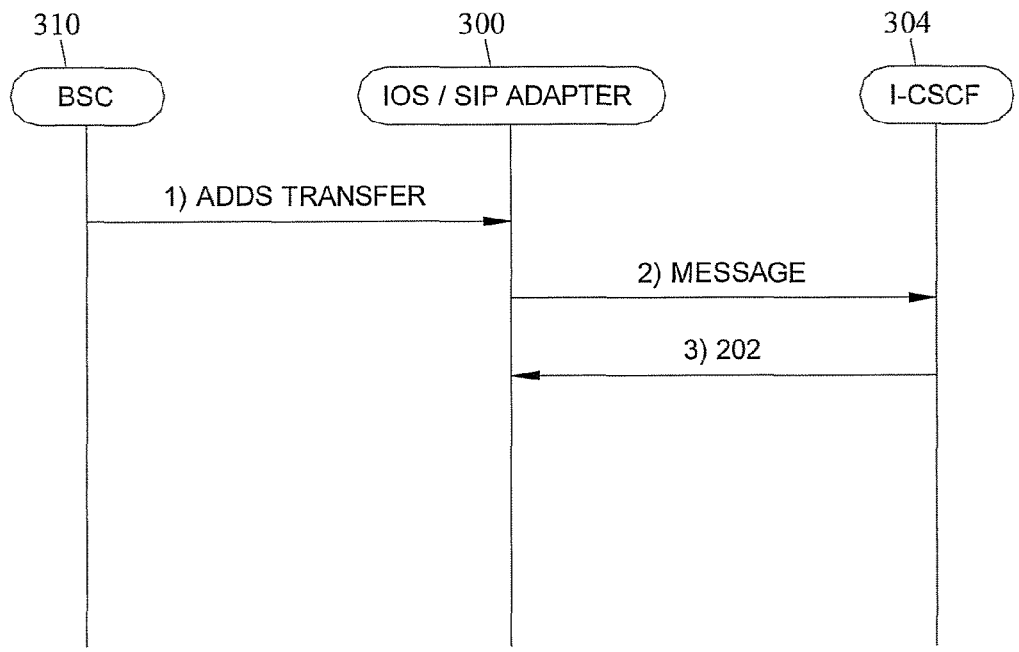
FIGS. 8A and 8B illustrated exemplary message flows associated with mobile originated SMS using an IOS/SIP adapter according to an embodiment of the subject matter described herein.
Figure 8B:
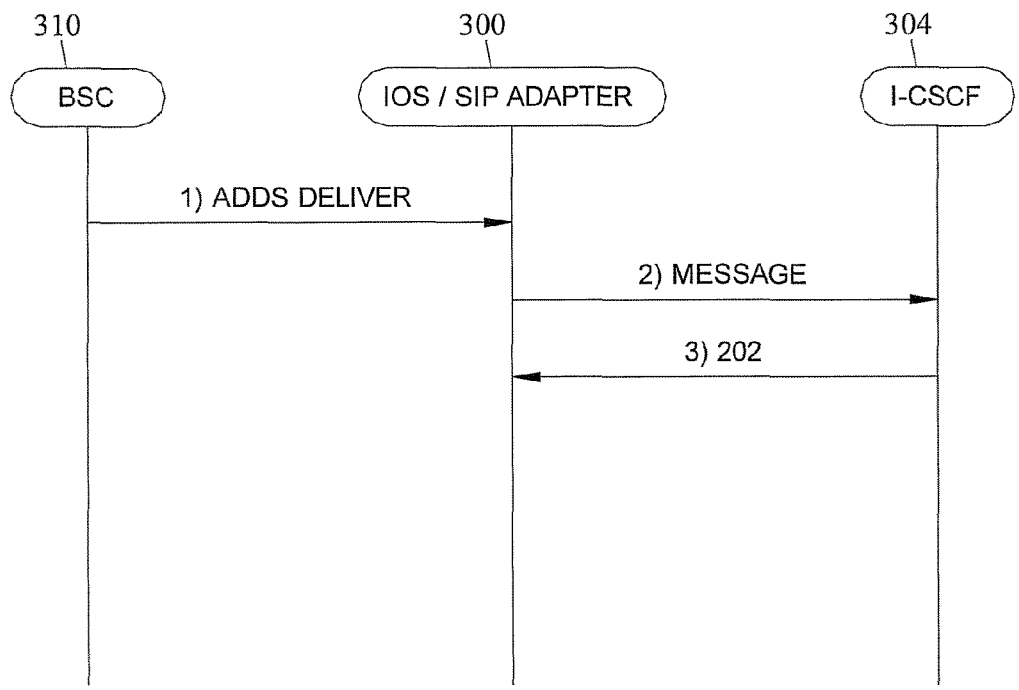

Yet another service that may be provided to non-IMS terminals using IOS/SIP adapter 300 is short message service (SMS) service. FIGS. 8A and 8B illustrate exemplary messaging associated with providing short message service to a non-IMS terminal using IOS/SIP adapter 300 according to an embodiment of the subject matter described herein. Referring to FIG. 8A, in line 1 of the message flow diagram, IOS/SIP adapter 300 receives an application data deliver service (ADDS) transfer message from BSC 310. The ADDS transfer message is a BSMAP message sent from the mobile station to the MSC to deliver an application data message. For short message service, the ADDS transfer message is used to transfer short messages from the BS to the MSC. The BSC sends to the ADDS transfer message containing the mobile's authentication parameters and the ADDS user card element with the data burst type fields set to short data burst. For short data burst applications, the BSC shall not include the SDP data in the ADDS user part element. The data shall be buffered at the BS. The ADDS transfer ACK message is used to transport the results of the authentication to the BSC.

In response to the ADDS transfer message, IOS/SIP adapter 300 formulates and sends a SIP MESSAGE message to I-CSCF 304. The SIP MESSAGE message includes the SMS content. In line 3 of the message flow diagram, I-CSCF 304 responds with SIP 202 message indicating that the SIP MESSAGE message has been received.

In the message flow diagram of FIG. 8B, exemplary messages associated with a mobile originated SMS transfer where the receiving terminal is active is illustrated. Referring to FIG. 8B, in line 1, IOS/SIP adapter 300 receives an ADDS deliver message from BSC 310. The ADDS deliver message is a detailed message sent from the MSC to the BS or from the BS to the MSC for transferring an application data exchanged over the traffic channel. In the case of OTASP, this message is sent from the MSC to the BS or from the BS to the MSC to encapsulate and transfer the OTASP data on a traffic channel. In line 2 of the message flow diagram, in response to the ADDS deliver message, IOS/SIP adapter 300 formulates and sends a SIP MESSAGE message including the SMS content to I-CSCF 304. In line 3 of the message flow diagram, I-CSCF 304 acknowledges receipt of the message MESSAGE by sending a 202 message to IOS/SIP adapter 300.

Figure 8C:
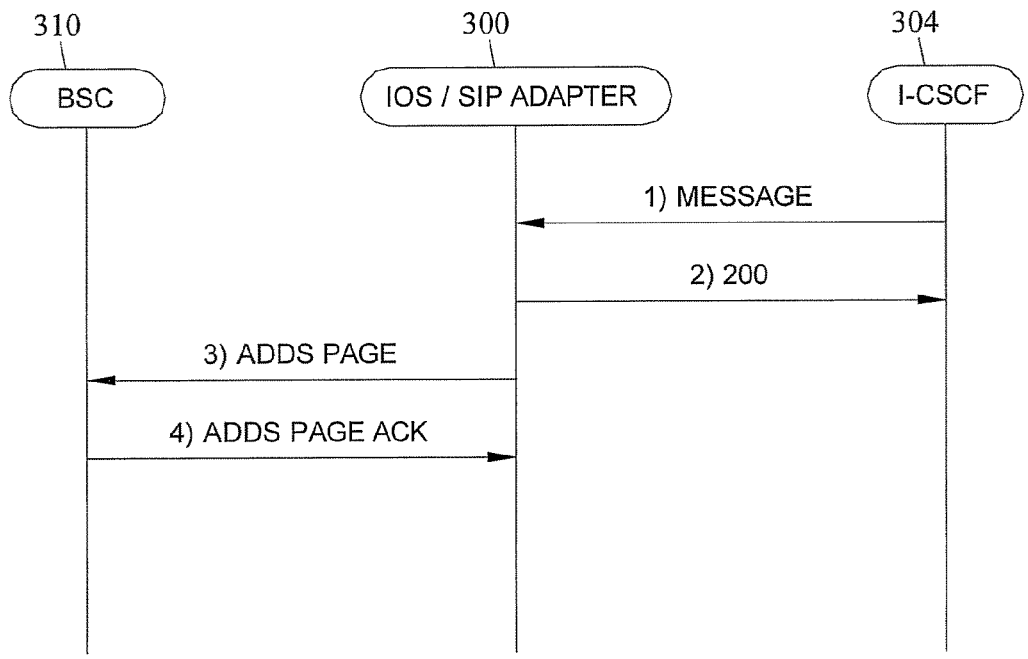
FIGS. 8C and 8D illustrate exemplary messaging associated with SMS retrieval using an IOS/SIP adapter according to an embodiment of the subject matter described herein.
Figure 8D:
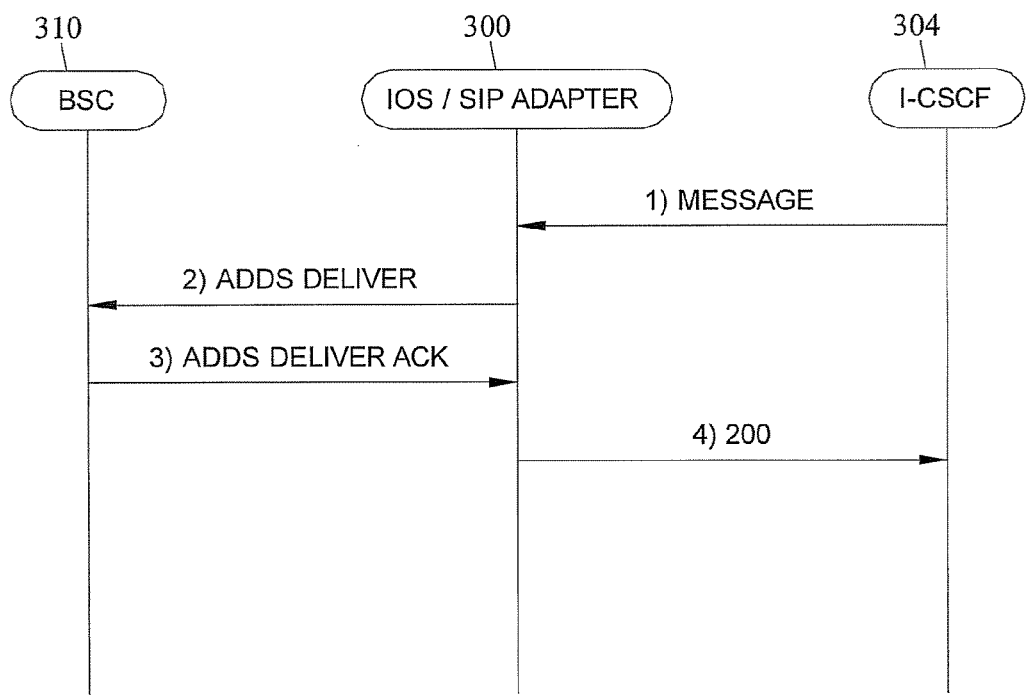

FIGS. 8C and 8D illustrate exemplary messages exchanged using IOS/SIP adapter 300 for mobile originated SMS were delivery receipt is requested. Referring to FIG. 8C, a network originate SMS transaction is received by IOS/SIP adapter 300 in line 1 where IOS/SIP adapter 300 receives a SIP MESSAGE message including data content. In line 2, IOS/SIP adapter 300 formulates a 200 message acknowledging receipt of the MESSAGE message. In line 3 of the message flow diagram, IOS/SIP adapter sends an ADDS page message to BSC 310. The ADDS page message is a BSMAP message sent from the MSC to the BS to transport an application data message. For the purpose of short message service, the ADDS page message is used to transport the short message from the MSC to the BS to be delivered on the paging channel. In line 4 of the message flow diagram, BSC 310 sends an ADDS page act message to IOS/SIP adapter 300 indicating that the message content was delivered.

FIG. 8D illustrates exemplary messaging associated with network originated SMS where delivery receipt is requested and the terminal is active. The messaging in FIG. 8D is the same as that illustrated in FIG. 8A except the SMS message is sent over the data or traffic channel, rather than the paging channel using the ADDS deliver message.

Figure 9A:
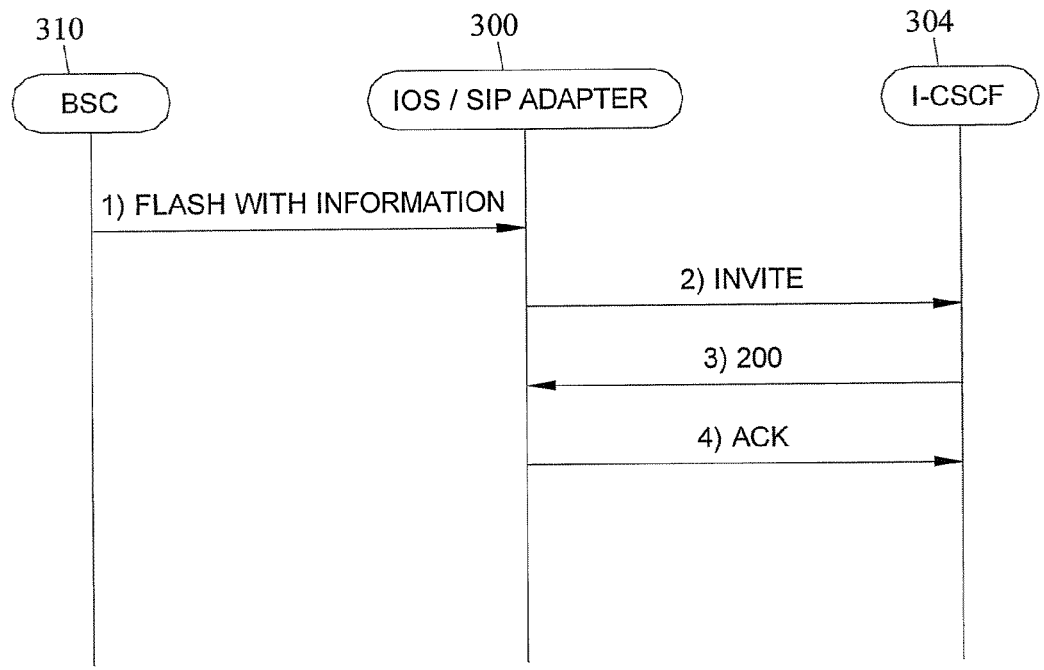
FIGS. 9A and 9B illustrated exemplary message flows associated with call hold and retrieval using an IOS/SIP adapter according to an embodiment of the subject matter described herein.
Figure 9B:
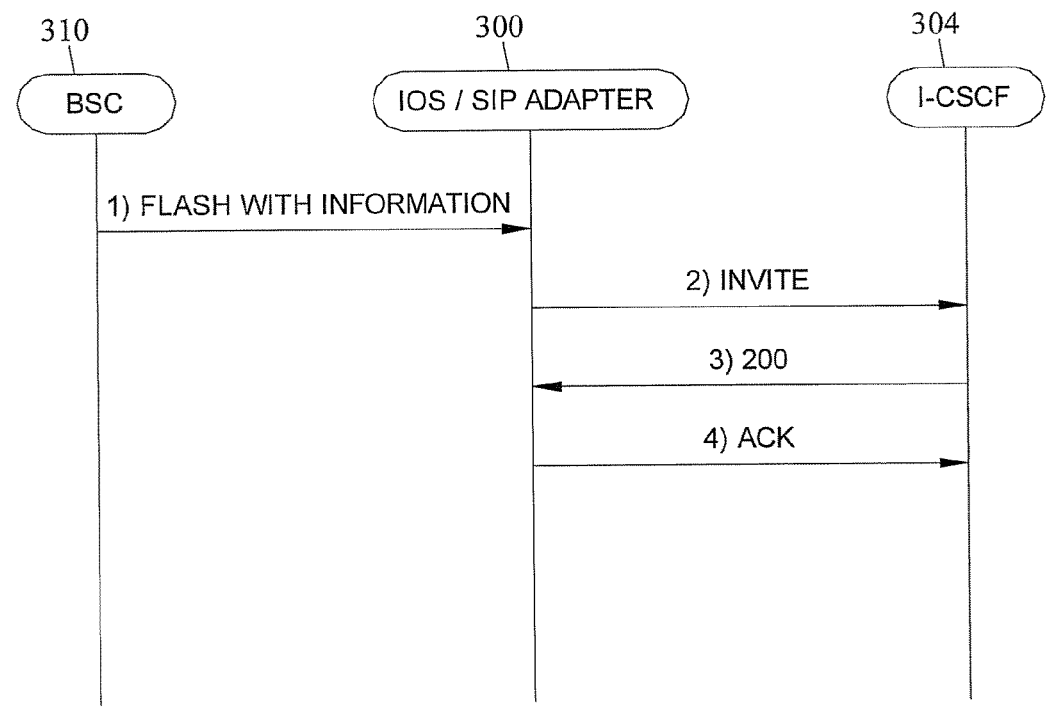

As stated above, one advantage of using IOS/SIP adapter 300 is that the same IMS network elements can be used to provide supplementary services to non-IMS terminals and IMS terminals. One example of the supplementary service is call hold service. FIGS. 9A and 9B are message flow diagrams illustrating exemplary messaging that may be exchanged using IOS/SIP adapter 300 in providing call hold service according to an embodiment of the subject matter described herein. Referring to FIG. 9A, in line 1, IOS/SIP adapter 300 receives a flash with information message from BSC 310. The flash with information message is used to convey supplementary service information received from the MS. In this case, the supplementary service information would include a call hold indication.

In line 2 of the message flow diagram, in response to the flash with information message, IOS/SIP adapter 300 sends a SIP INVITE message to I-CSCF 304, where the INVITE message contains parameters associated with call hold activation. Examples of such parameters will be described in detail below in the Parameter Handling section.

In line 3 of the message flow diagram, I-CSCF 304 sends a 200 OK message to IOS/SIP adapter 300. In line 4 of the message flow diagram, IOS/SIP adapter 300 acknowledges the 200 OK.

FIG. 9B illustrates exemplary messaging associated with IOS/SIP adapter 300 in retrieving a call from hold. Referring to FIG. 9B, in line 1 of the message flow diagram, BSC 310 sends a flash with information message to IOS/SIP adapter 300. The flash with information message contains parameters associated with retrieving the held call. In response to the flash with information message, in line 2 of the message flow diagram, IOS/SIP adapter 300 sends an INVITE message I-CSCF 304. The INVITE message includes parameters for retrieving the held call. In line 3 of the message flow diagram, I-CSCF 304 sends a 200 OK message to IOS/SIP adapter 300. In line 4 of the message flow diagram, IOS/SIP adapter 300 sends an acknowledge message to the 200 OK message.

Yet another example of a supplementary service that may be provided by IMS network to non-IMS terminals IOS/SIP adapter 300 is call waiting service. FIGS. 10A-10D illustrate exemplary messaging that may be exchanged using IOS/SIP adapter 300 in providing call waiting service to non-IMS terminals. If a call is terminated while another call is held, the procedures towards the BSC remain the same as normal call clearing. The held call is then immediately offered to the terminal using normal call set-up procedures.

Figure 10A:
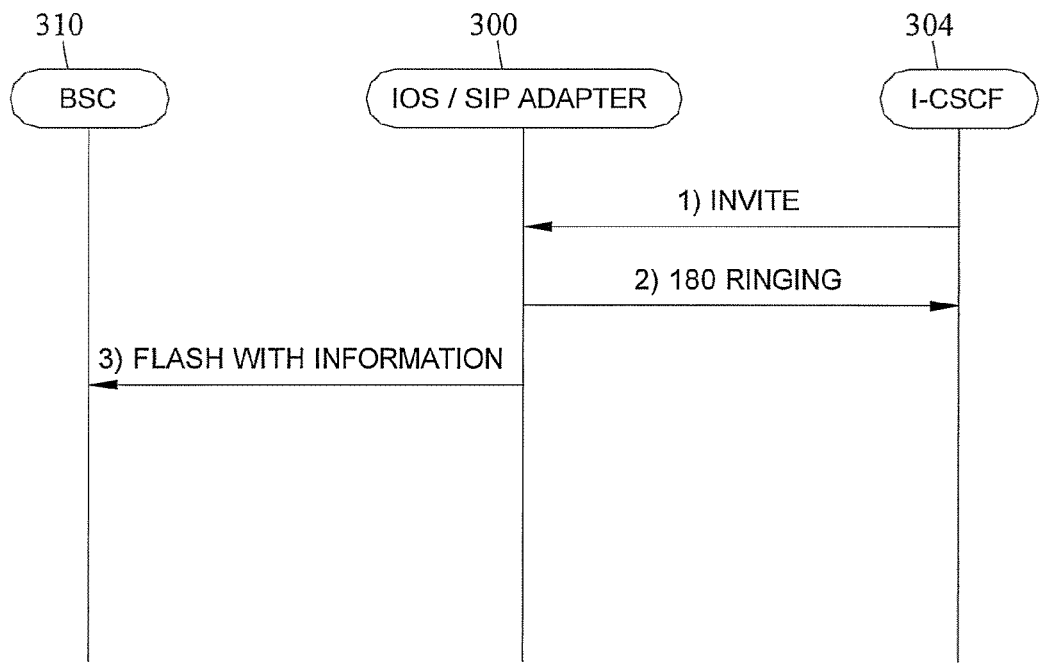
FIGS. 10A-10D illustrate exemplary message flows associated with call waiting using an IOS/SIP adapter according to an embodiment of the subject matter described herein.
Figure 10B:
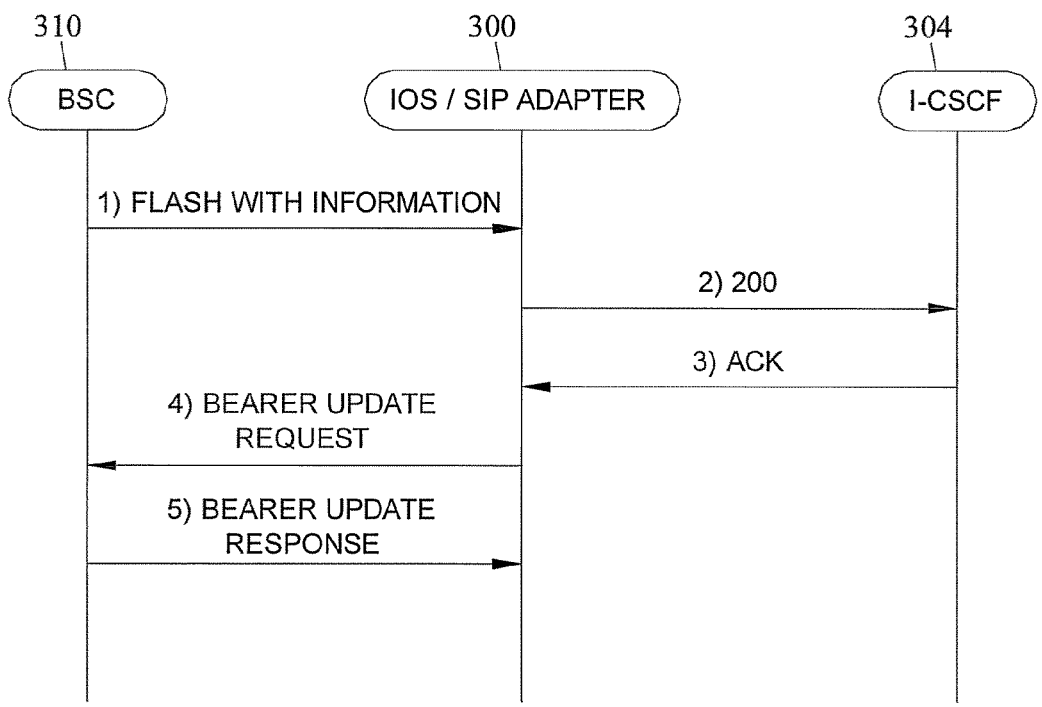

FIG. 10A illustrates exemplary messaging associated with an incoming call while a mobile terminal is participating in a voice call. Referring to FIG. 10A, in line 1 of the message flow diagram, IOS/SIP adapter 300 receives an INVITE message from I-CSCF 304 signifying an incoming call. In line 2 of the message flow diagram, in response to the INVITE message, IOS/SIP adapter 300 sends a 180 ringing message to I-CSCF 304 indicating that the called terminal is being alerted to the incoming call. In line 3 of the message flow diagram, IOS/SIP adapter 300 sends a flash with information message to BSC 310 instructing BSC 310 to alert the terminal of the incoming call. FIG. 10B illustrates exemplary messaging associated with IOS/SIP adapter 300 for accepting an incoming call while participating in another call. Referring to FIG. 10B, in line 1 of the message flow diagram, BSC 310 sends a flash with information message to IOS/SIP adapter 300 indicating that the mobile terminal has accepted the waiting call. In line 2 of the message flow diagram, IOS/SIP adapter 300 sends a 200 OK message in response to the original INVITE message for the waiting call (See line 1 in FIG. 10A). In line 3 of the message flow diagram, I-CSCF 304 sends an ACK message acknowledging the 200 OK message. In line 4 of the message flow diagram, IOS/SIP adapter 300 sends a bearer update request message 310 to connect the mobile terminal to the bearer channel for the waiting call. In line 5 of the message flow diagram, BSC 310 sends a bearer update response message to IOS/SIP adapter 300 confirming the updating of the bearer channel to connect the waiting call to the mobile terminal.

Figure 10C:
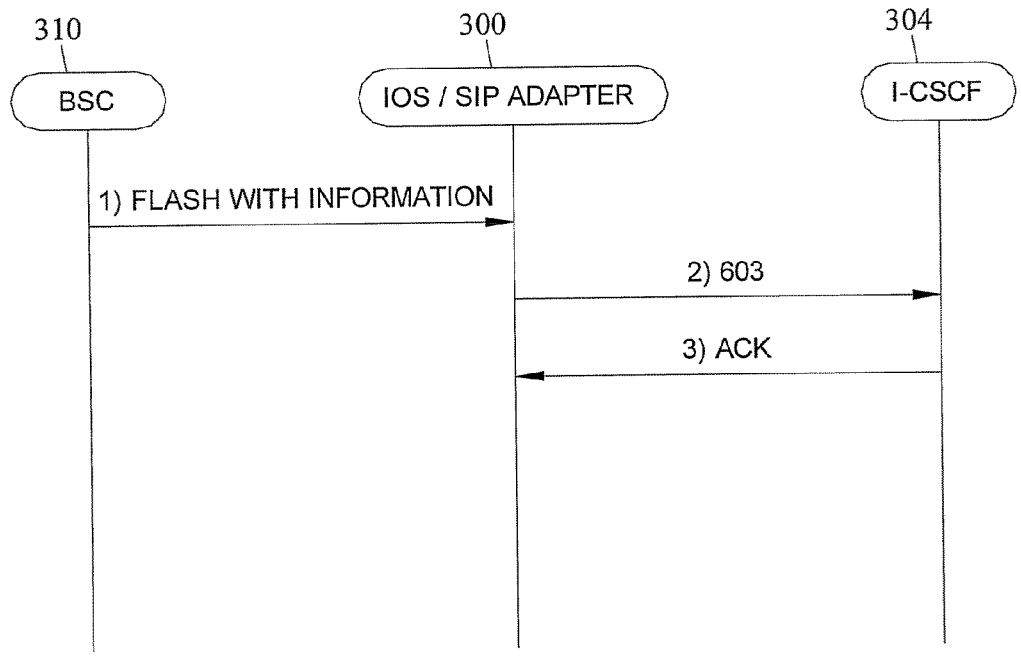

FIG. 10C illustrates exemplary messages associated with rejecting an incoming call while participating in a call using IOS/SIP adapter 300 according to an embodiment of the subject matter described herein. Referring to FIG. 10C, it is assumed that the messaging in FIG. 10A of inviting the mobile terminal to join in the call while the mobile terminal is participating in a call has occurred. In line 1 of the message flow diagram, BSC 310 sends a flash with information message to IOS/SIP adapter 300 indicating that the mobile terminal has rejected the waiting call. In line 2 of the message flow diagram, IOS/SIP adapter 300 sends a SIP-project message to I-CSCF 304. In line 3 of the message flow diagram, IOS/SIP adapter 300 acknowledges the SIP 603 reject message.

Figure 10D:
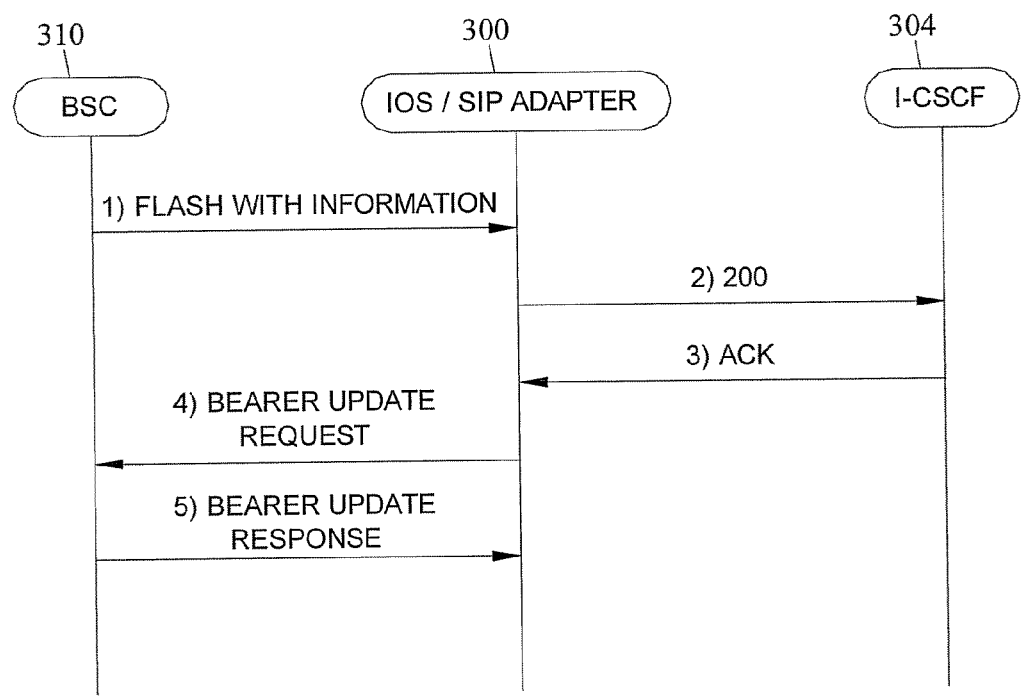

FIG. 10D illustrates exemplary messaging associated with IOS/SIP adapter 300 in switching between an active and a waiting call. The messaging in FIG. 10D is the same as that in FIG. 10B. Hence, the description of the individual messages will not be repeated. However, it should be noted that the messaging may be used to switch alternatingly between the active and waiting calls. Back to the original active call in an alternating manner.

Figure 11A:
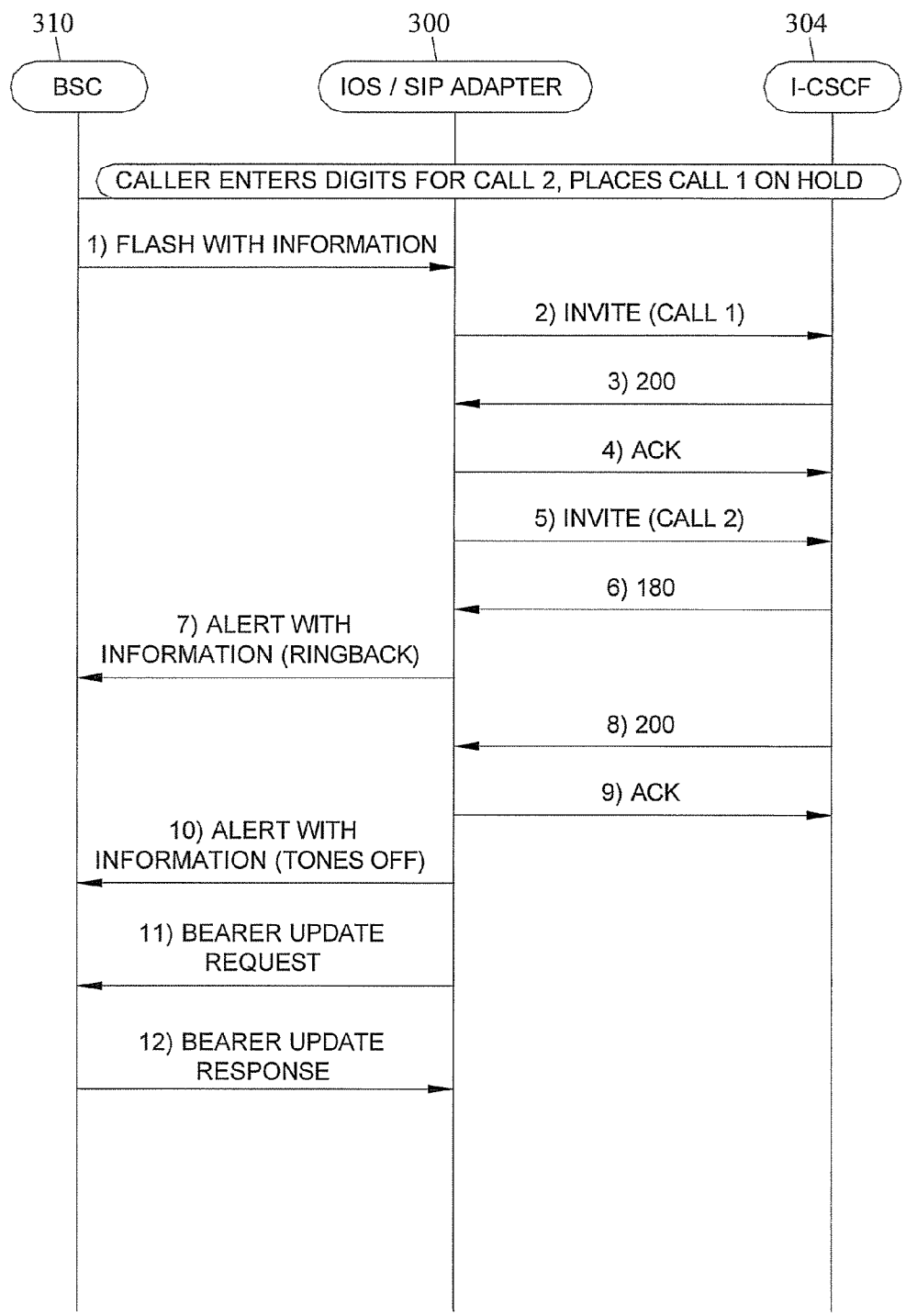
FIGS. 11A-11F illustrate exemplary message flows associated with three-way calling using an IOS/SIP adapter according to an embodiment of the subject matter described herein.

Yet another example of a supplementary service that may be provided to non-IMS terminals using IOS/SIP adapter 300 is three-way calling service. FIGS. 11A-11F illustrate exemplary messages that may be exchanged using IOS/SIP adapter 300 in providing three-way calling service. Referring to FIG. 11A, it is assumed that a caller is participating in one call and seeks to add another call by placing the first call on hold. Referring to FIG. 11A, in line 1, BSC 310 sends a flash with information message to IOS/SIP adapter 300 requesting that IOS/SIP adapter 300 place the original call on hold and initiate a new call with digits provided in the flash with information message. In line 2 of the message flow diagram, IOS/SIP adapter 300 sends an INVITE message to I-CSCF 304 to place the first call on hold.

In line 3 of the message flow diagram, I-CSCF 304 sends a 200 OK message to IOS/SIP adapter 300 indicating that the call has been placed on hold. In line 4 of the message flow diagram, IOS/SIP adapter 300 sends an acknowledge message to I-CSCF 304.

In line 5 of the message flow diagram, IOS/SIP adapter 300 sends an INVITE message to I-CSCF 304 to invite the second call party to the call. In line 6 of the message flow diagram, I-CSCF 304 sends a SIP 180 message to IOS/SIP adapter 300. In line 7 of the message flow diagram, IOS/SIP adapter 300 sends an alert with information message to BSC 310 requesting that BSC 310 play a ring back tone to the initiating terminal.

In line 8 of the message flow diagram, I-CSCF 304 sends a 200 OK message in response to the INVITE message for call 2 indicating that the caller has answered. In line 9 of the message flow diagram, IOS/SIP adapter 300 sends an acknowledge message in response to the 200 OK message.

In line 10 of the message flow diagram, IOS/SIP adapter 300 sends an alert with information message to BSC 310. In line 11 of the message flow diagram, IOS/SIP adapter 300 sends a bearer update request message indicating to BSC 310 to update the bearer channel to connect to the second call. In line 12 of the message flow diagram, BSC 310 responds with a bearer response message indicating that the call has been connected. Thus, at the conclusion of the message flow in FIG. 11A, the first call is on hold and the second is active.

Figure 11B:
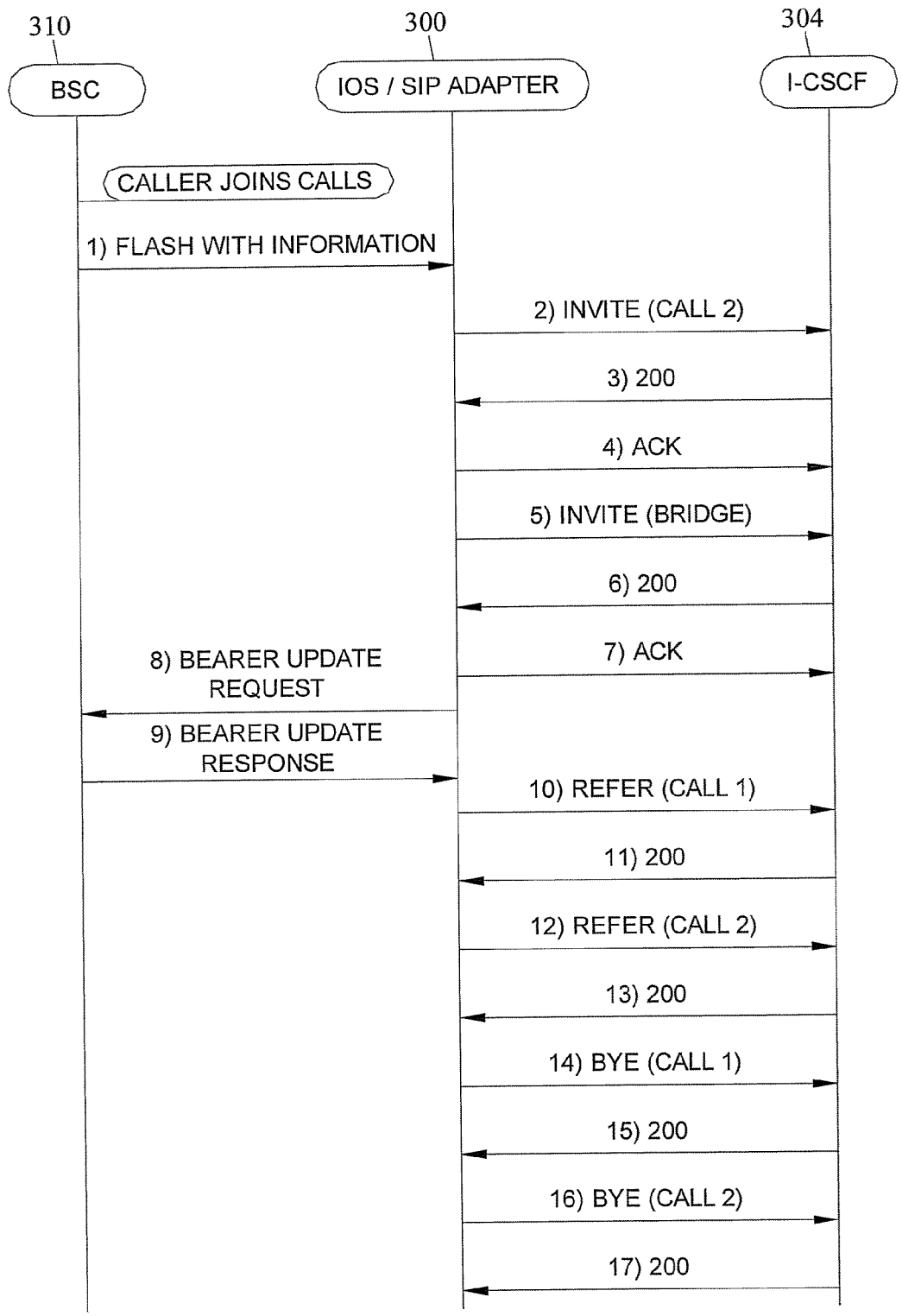

FIG. 11B illustrates exemplary messaging associated with IOS/SIP adapter 300 in joining the active and held calls. Referring to FIG. 11B, in line 1 of the message flow diagram, BSC 310 sends a flash with information message to IOS/SIP adapter 300 indicating that the terminal wishes to join the two calls. In line 2 of the message flow diagram, IOS/SIP adapter 300 sends an INVITE message to I-CSCF 304 to take the second call off hold. In line 3 of the message flow diagram, I-CSCF 304 sends a 200 OK message to IOS/SIP adapter 300. In line 4 of the message flow diagram, IOS/SIP adapter 300 sends an acknowledge message to I-CSCF 304.

In line 5 of the message flow diagram, IOS/SIP adapter 300 sends an INVITE message to I-CSCF 304 requesting a bridge to bridge the first and second calls. In line 6 of the message flow diagram, I-CSCF 304 sends a 200 OK message to IOS/SIP adapter 300. In line 7 of the message flow diagram, IOS/SIP adapter 300 sends an acknowledge message to I-CSCF 304.

In line 8 of the message flow diagram, IOS/SIP adapter 300 sends a bearer update request message to BSC 310 to request that the first and second calls be connected to the bridge. In line 9 of the message flow diagram, BSC 310 sends a bearer update response message indicating that on the side, the two calls have been connected to the bridge.

In line 10 of the message flow diagram, IOS/SIP adapter 300 sends a referral message to I-CSCF 304. In line 11 of the message flow diagram, I-CSCF 304 sends a 200 OK message in response to the referral message. In line 12 message flow diagram, IOS/SIP adapter 300 sends a refer message for the second call to I-CSCF 304. In line 13 of the message flow diagram, I-CSCF 304 sends a 200 OK message in response to the second refer message. Thus, after line 13 of the message flow diagram, both calls are connected to each other.

In line 8 of the message flow diagram, IOS/SIP adapter sends a BYE message for the first call to I-CSCF 304 to free resources allocated to the first call that are now allocated to the bridge. In line 15 of the message flow diagram, I-CSCF 304 sends a 200 OK message in response to the BYE message. In line 16 of the message flow diagram, IOS/SIP adapter 300 sends a BYE message for the second call to free resources associate with the second call to the I-CSCF 304. In line 17 of the message flow diagram, I-CSCF 304 sends a 200 OK message acknowledging the BYE message.

Figure 11C:
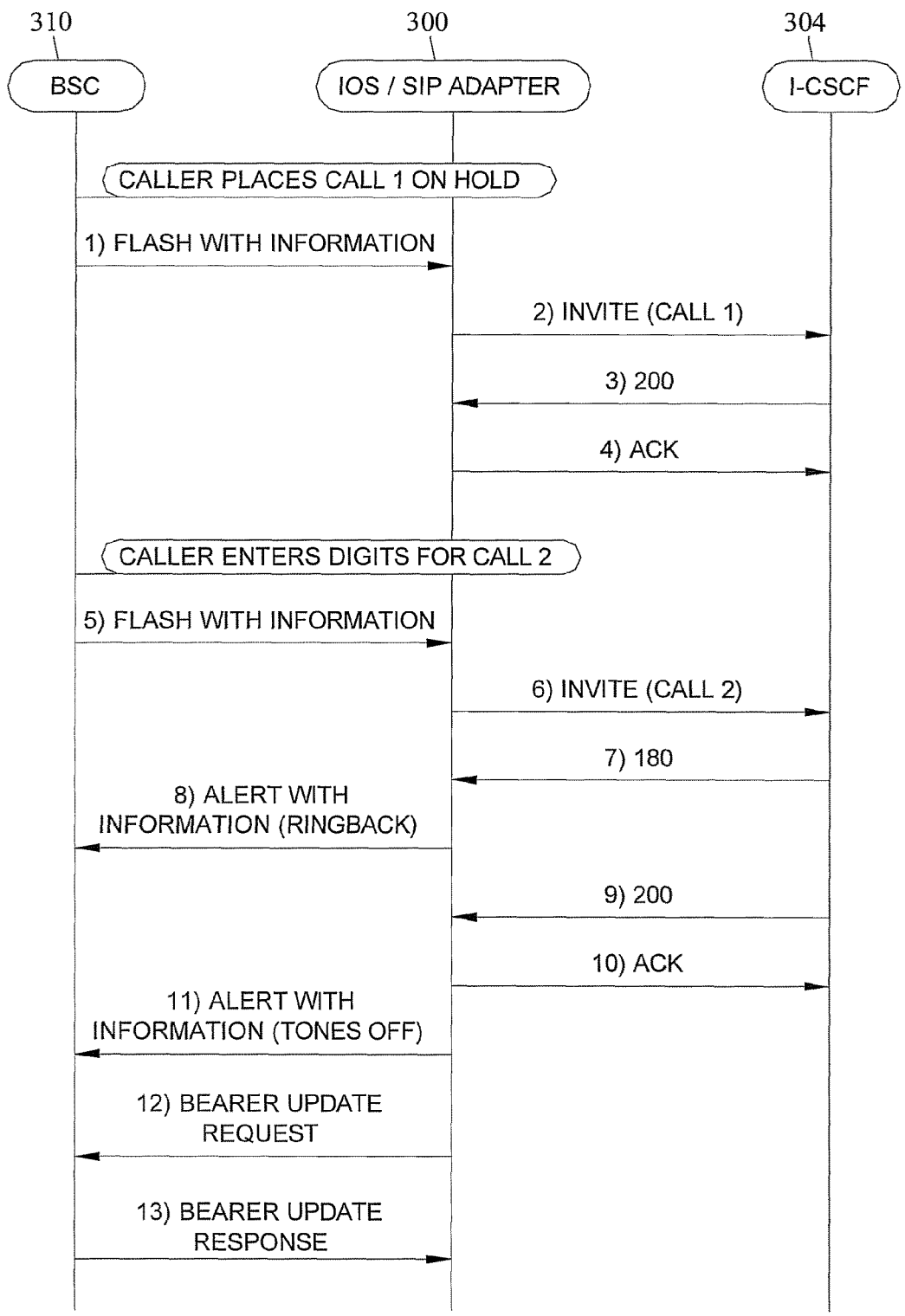
Figure 11D:
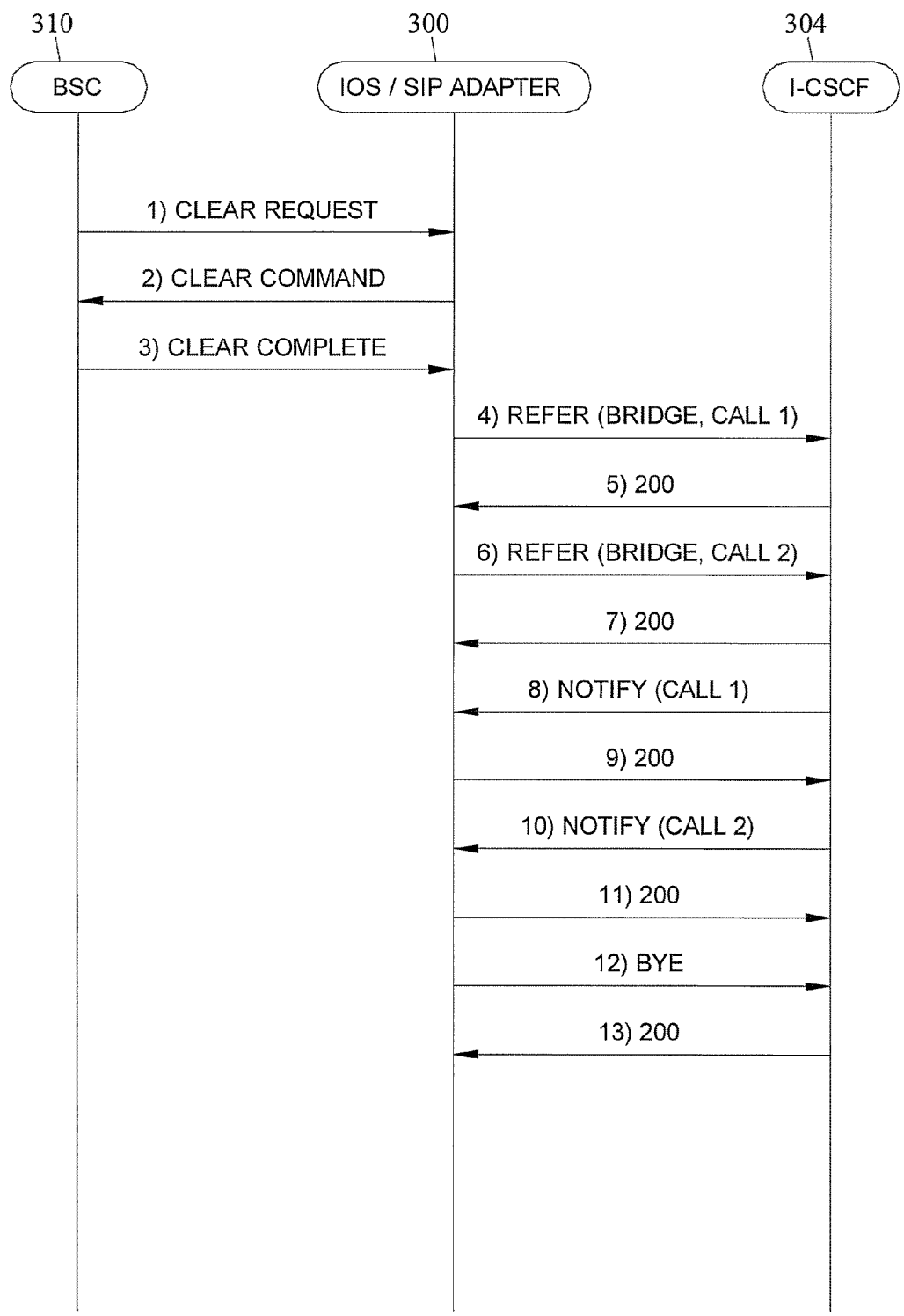
Figure 11E:
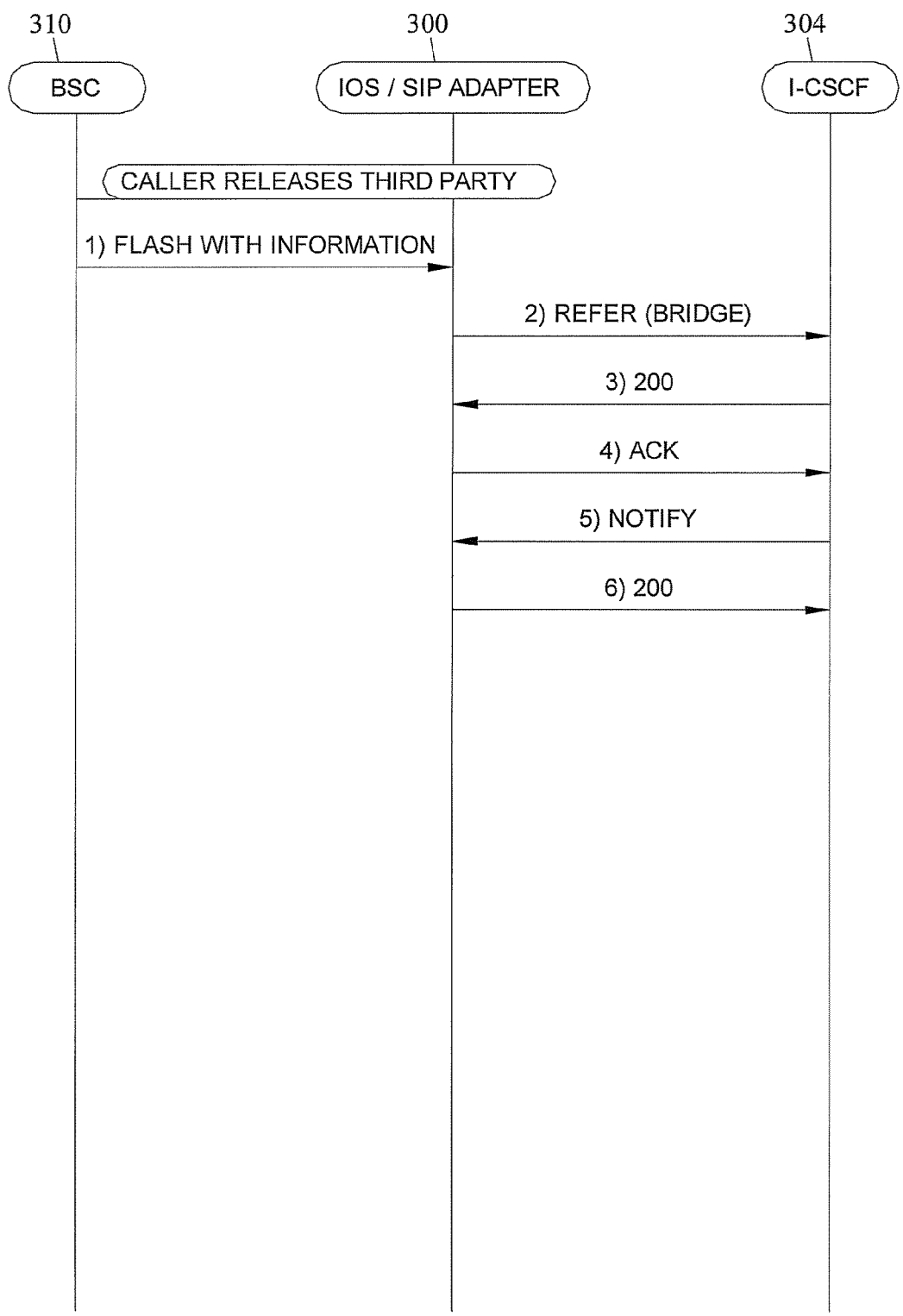

FIG. 11C illustrates an additional three-way calling scenario similar to the scenario illustrated to FIG. 11A except in FIG. 11C, two flash messages are used instead of one to place the original call on hold and initiate the second call. Since the messaging in FIG. 11C is the same as that in FIG. 11A, a description thereof will not be repeated. FIG. 11E illustrates exemplary messaging involving IOS/SIP adapter 300 in releasing a three-way call. Referring to 11B, in line 1 of the message flow diagram, BSC 310 sends a clear request message to IOS/SIP adapter 300. The clear request message is initiated in response to the mobile terminating the three-way call. In line 2 of the message flow diagram, IOS/SIP adapter 300 sends a clear command message to BSC 310 instructing BSC 310 to release radio resources associated with the call. In line 3 of the message flow diagram, BSC 310 sends a clear complete message to IOS/SIP adapter 300 indicating that the resources have been released.

In line 4 of the message flow diagram, IOS/SIP adapter 300 sends a refer message to I-CSCF 304 indicating that the leg of the call between the bridge and call 1 should be released. In line 5 of the message flow diagram, I-CSCF 304 acknowledges the refer message by sending a 200 OK message. In line 6 of the message flow diagram, IOS/SIP adapter 300 sends a refer message for releasing the leg of the call between the bridge and call 2. In line 7 of the message flow diagram, I-CSCF 304 sends a 200 OK message to IOS/SIP adapter 300.

In line 8 of the message flow diagram, I-CSCF 304 sends a notify message to IOS/SIP adapter 300 indicating that the leg of the call corresponding to call 1 has been released. In line 9 of the message flow diagram, IOS/SIP adapter 300 sends a 200 OK message to I-CSCF 304. In line 10 of the message flow diagram, I-CSCF 304 sends a notify message for notifying IOS/SIP adapter 300 that the leg of the call between the bridge and call 2 has been released. In line 11 of the message flow diagram, IOS/SIP adapter 300 sends a 200 OK message to I-CSCF 304. In line 12 of the message flow diagram, IOS/SIP adapter 300 sends a BYE message to I-CSCF 304. In line 13 of the message flow diagram, I-CSCF 304 sends a 200 OK message to IOS/SIP adapter 300.

In another three-way calling scenario, a mobile that originated a three-way call may request release of one of the parties to the call. FIG. 11E illustrates exemplary messaging associated with this scenario. In FIG. 11E it is assumed that a three-way call is in progress and the caller releases a third party from the call. Referring to FIG. 11E, in line 1, BSC 310 sends a flash with information message indicating that the mobile has requested release of one of the parties to the call. In line 2, IOS/SIP adapter 300 sends a refer message to I-CSCF 304 indicating that one of the legs between the bridge and the called party should be released. In line 3 of the message flow diagram, I-CSCF 304 sends a 200 OK message to IOS/SIP adapter 300. In line 4 of the message flow diagram, IOS/SIP adapter 300 acknowledges the release message. In line 5 of the message flow diagram, I-CSCF 304 sends a notify message IOS/SIP adapter 300 notifying IOS/SIP adapter 300 that the leg of the call has been released. In line 6 of the message flow diagram, IOS/SIP adapter 300 sends a 200 OK message to I-CSCF 304.

Figure 11F:
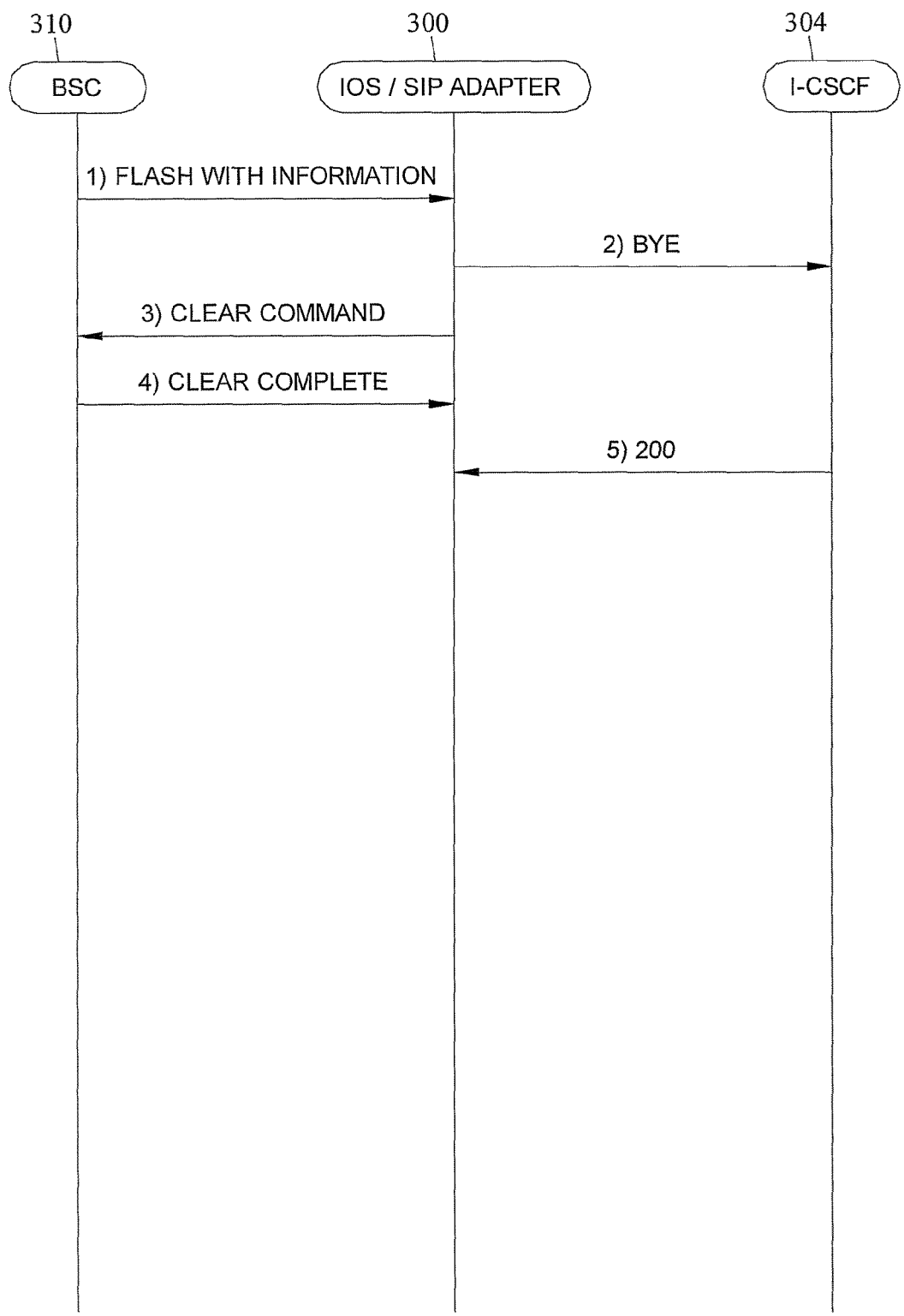

Yet another three-way calling scenario may be implemented using IOS/SIP adapter 300 is call transfer from a three-way call. For example, when a three-way call is in progress, the caller may wish to transfer the call. FIG. 11F illustrates this scenario. In FIG. 11F, in line 1, BSC 310 sends a flash with information to IOS/SIP adapter 300 indicating that call transfer has been requested. In line 2 of the message flow diagram, IOS/SIP adapter 300 sends a BYE message to I-CSCF 304. In line 3 of the message flow diagram, IOS/SIP adapter 300 sends a clear command to BSC 310. In line 4 of the message flow diagram, BSC 310 sends a clear complete message to IOS/SIP adapter 300. In line 5 of the message flow diagram, I-CSCF 304 sends a 200 OK message to IOS/SIP adapter 300.

Figure 12A:
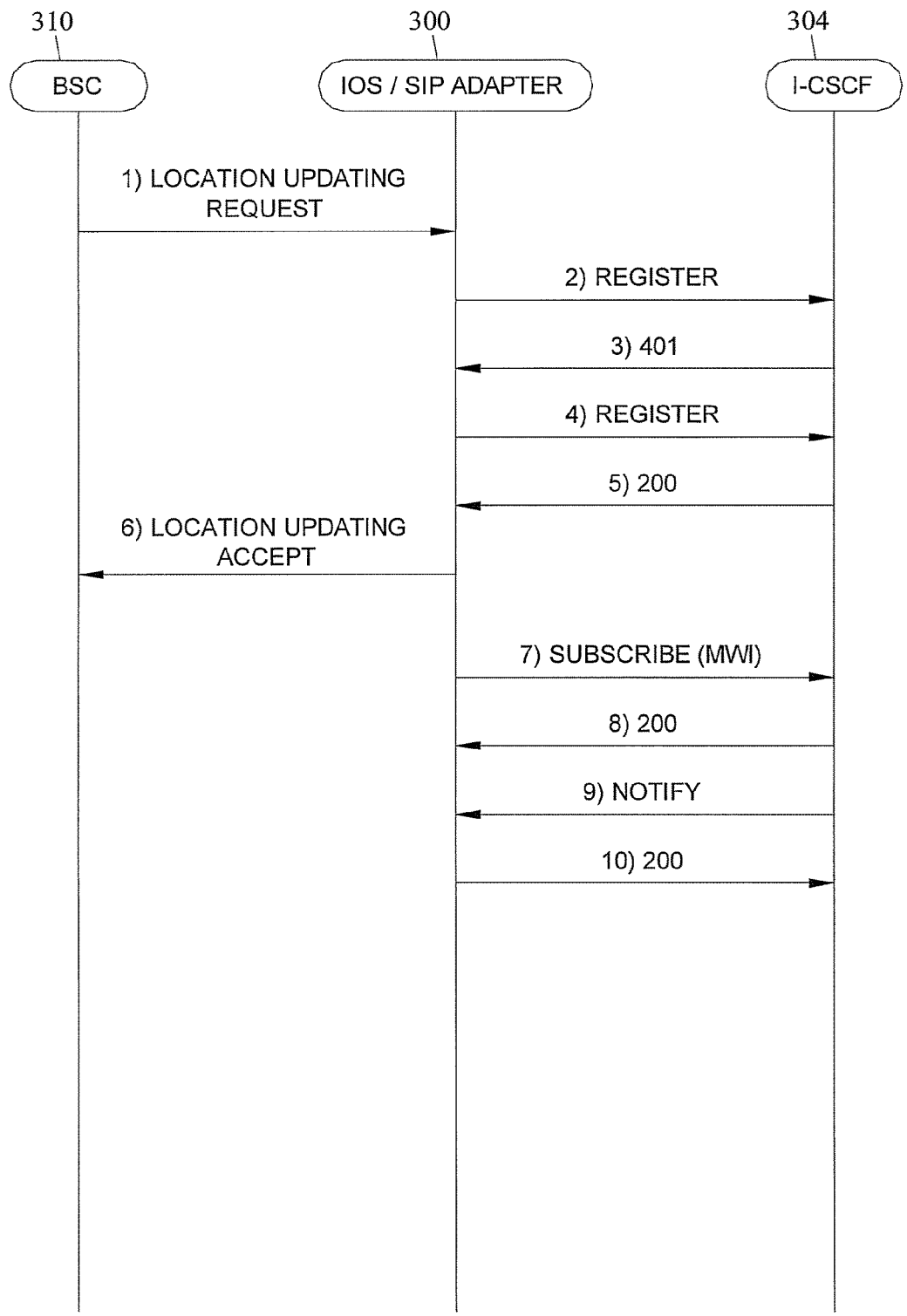
FIGS. 12A-12C illustrate exemplary message flows associated with message waiting notification service using an IOS/SIP adapter according to an embodiment of the subject matter described herein.
Figure 12B:
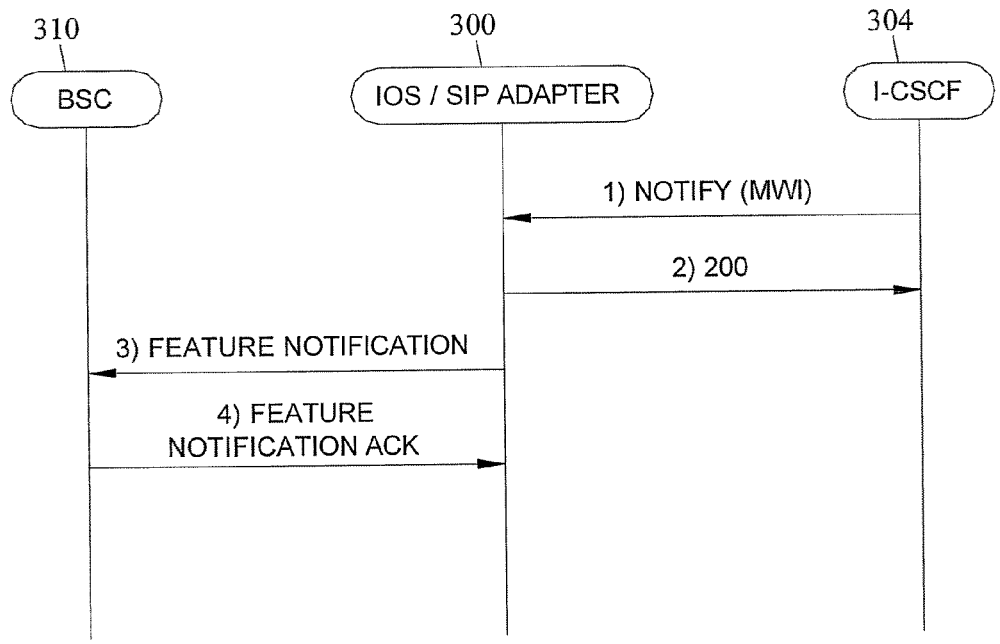
Figure 12C:
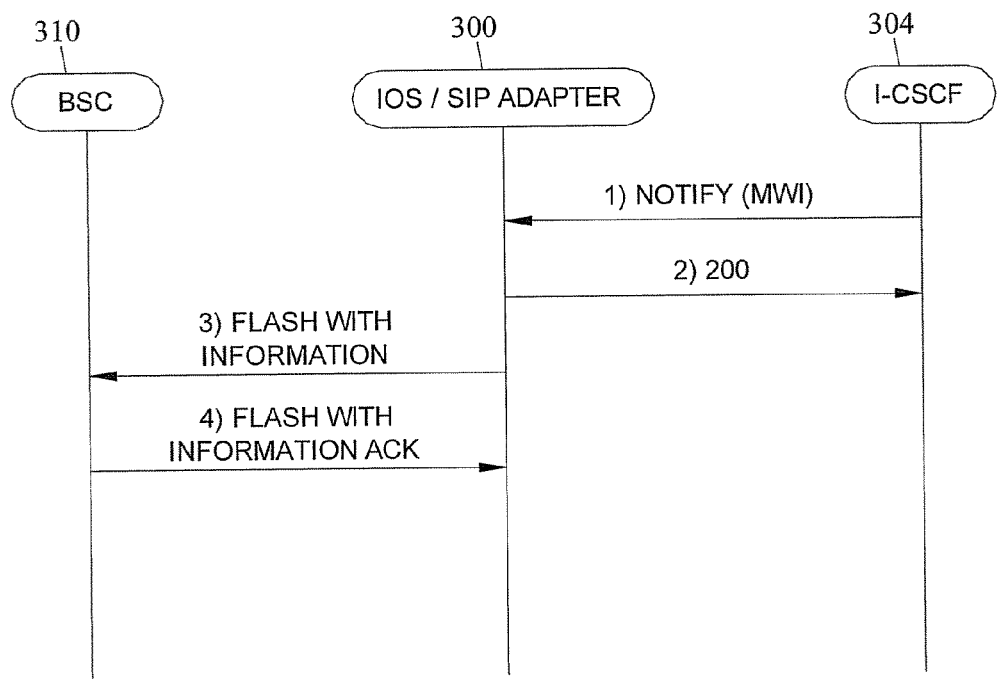

Yet another supplementary service that may be provided using IOS/SIP adapter 300 is voicemail notification service. FIGS. 12A-12C illustrate various message flows associated with providing message-waiting or voicemail notification using IOS/SIP adapter 300. Referring to FIG. 12A, in line 1 of the message flow diagram, BSC 310 sends a location updating request message to IOS/SIP adapter 300 to initiate registration of a terminal that has roamed into the service area BSC 310. In line 2 of the message flow diagram, IOS/SIP adapter 300 sends a SIP register message to I-CSCF 304. In line 3 of the message flow diagram, I-CSCF 304 sends a SIP 401 message in response to the register message.

In line 4 of the message flow diagram, IOS/SIP adapter 300 sends a SIP register message to I-CSCF 304. In line 5 of the message flow diagram, I-CSCF 304 sends a SIP 200 OK message to IOS/SIP adapter 300. In line 6 of the message flow diagram, IOS/SIP adapter 300 sends a location updating accept message to BSC 310.

In line 7 of the message flow diagram, IOS/SIP adapter 300 sends a SIP subscribe message to I-CSCF 304 subscribing to message waiting indication service. In line 8 of the message flow diagram, I-CSCF 304 sends a 200 OK message to IOS/SIP adapter 300. In line 9 of the message flow diagram, I-CSCF 304 sends a SIP modify message to IOS/SIP adapter 300 to notify IOS/SIP adapter 300. In line 10 of the message flow diagram, IOS/SIP adapter 300 sends a 200 OK message to I-CSCF 304.

Once the procedures in FIG. 12A for subscribing to message waiting notification service have been completed, a subscriber terminal may be notified of waiting messages, such as voicemail messages. FIG. 12B illustrates exemplary messaging exchanged using IOS/SIP adapter 300 for message waiting notification when the terminal is idle. Referring to FIG. 12B, in line 1 of the message flow diagram, I-CSCF 304 sends a notify message to IOS/SIP adapter 300 to notify the terminal that a message is waiting. In line 2 of the message flow diagram, IOS/SIP adapter 300 sends a SIP 200 OK message to I-CSCF 304. In line 3 of the message flow diagram, IOS/SIP adapter 300 sends a feature notification message to BSC 310. The feature notification message is sent by an MSC to initiate the feature indication information to a mobile station. Once the MSC (in this case IOS/SIP adapter 300) receives the feature notification acknowledge message (line 4 of the message flow diagram), the MSC will send an order or feature notification message to the mobile station on a paging channel. In this case, the feature notification message would be the message indicating that a message is waiting.

FIG. 12C illustrates an exemplary message flow using IOS/SIP adapter 300 to notify terminal of a waiting message when the terminal is active. Referring to FIG. 12B, in line 1 of the message flow diagram, I-CSCF 304 sends a notify message to IOS/SIP adapter 300 to indicate that a message is waiting. In line 2 of the message flow diagram, IOS/SIP adapter 300 sends a 200 OK message in response to the notify message. In line 3 of the message flow diagram, IOS/SIP adapter 300 sends a flash with information message to BSC 310. The flash with information message is sent from the MSC to the base station to convey supplementary services information to be sent to the mobile station. In this case, the supplementary service information would indicate that a message is waiting. In line 4 of the message flow diagram, BSC 310 responds to the flash with information message with a flash with information acknowledge.

Yet another supplementary service that may be provided using IOS/SIP adapter 300 is calling number ID restriction where the calling party number is concealed. For a mobile call origination, if call party digits (call party BCD number) are preceded by the appropriate feature code, then IOS/SIP adapter 300 will, depending on configuration, either:

include a privacy header field in the SIP request containing the value of "user, critical" (cf. RFC 4023), or replace the user's identity in the "from" header field with the value "SIP: anonymous@anonymous.invalid".

For network call origination, in order to implement calling number ID restriction, IOS/SIP adapter 300 may change population of fields in the corresponding assignment request or the flash with information request.

Yet another supplementary service that may be provided to non-IMS devices using IOS/SIP adapter 300 is distinctive ringing. IOS/SIP adapter 300 may convey distinctive ringing to a terminal using the signal parameter in the MSC information record field of an alert with information message sent during call set-up. Because IOS uses a finite number of values for distinctive ringing service, its mapping to the mechanism by standard SIP terminals is less than ideal. To accommodate the insertion of distinctive ringing information by the IMS network, a new URN scheme for conveying this information to be conveyed in the alert with information messages may be used. This URN is replaced by the IMS core into an "alert-info" header, and converted by the IOS/SIP adapter 300 to an appropriate signal parameter. Valid values for this URN and the resultant signal and codings are shown below in Table 2.

TABLE 2

Alert Info Header Parameter Values for Corresponding Signal Values

| Alert-Info Value | Signal Value | Alert Pitch Value |
|---|---|---|
| urn:cdma2000-signal:normal-medium | 0x40 (Normal) | 0 (Medium) |
| urn:cdma2000-signal:intergroup-medium | 0x41 (Intergroup) | 0 (Medium) |
| urn:cdma2000-signal:priority-medium | 0x42 (Priority) | 0 (Medium) |
| urn:cdma2000-signal:ping-medium | 0x44 (Ping) | 0 (Medium) |
| urn:cdma2000-signal:normal-high | 0x40 (Normal) | 1 (High) |
| urn:cdma2000-signal:intergroup-high | 0x41 (Intergroup) | 1 (High) |
| urn:cdma2000-signal:priority-high | 0x42 (Priority) | 1 (High) |
| urn:cdma2000-signal:ping-high | 0x44 (Ping) | 1 (High) |
| urn:cdma2000-signal:normal-low | 0x40 (Normal) | 2 (Low) |
| urn:cdma2000-signal:intergroup-low | 0x41 (Intergroup) | 2 (Low) |
| urn:cdma2000-signal:priority-low | 0x42 (Priority) | 2 (Low) |
| urn:cdma2000-signal:ping-low | 0x44 (Ping) | 2 (Low) |
| urn:cdma2000-signal:silent | 0x4F (Alerting Off) | 0 |

Figure 13A:
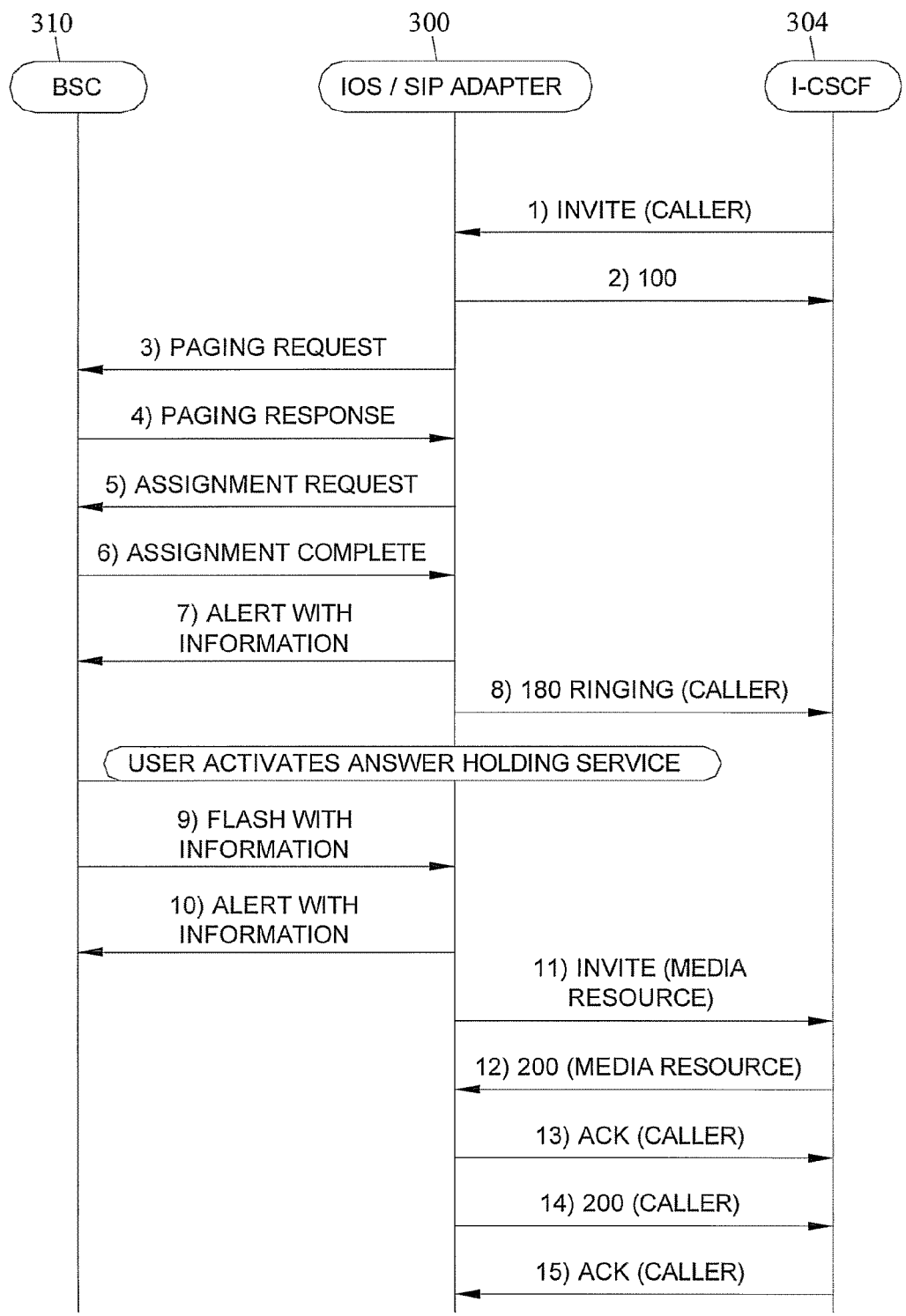
FIGS. 13A-13C illustrate exemplary message flows associated with held call retrieval according to an embodiment of the subject matter described herein.
Figure 13B:
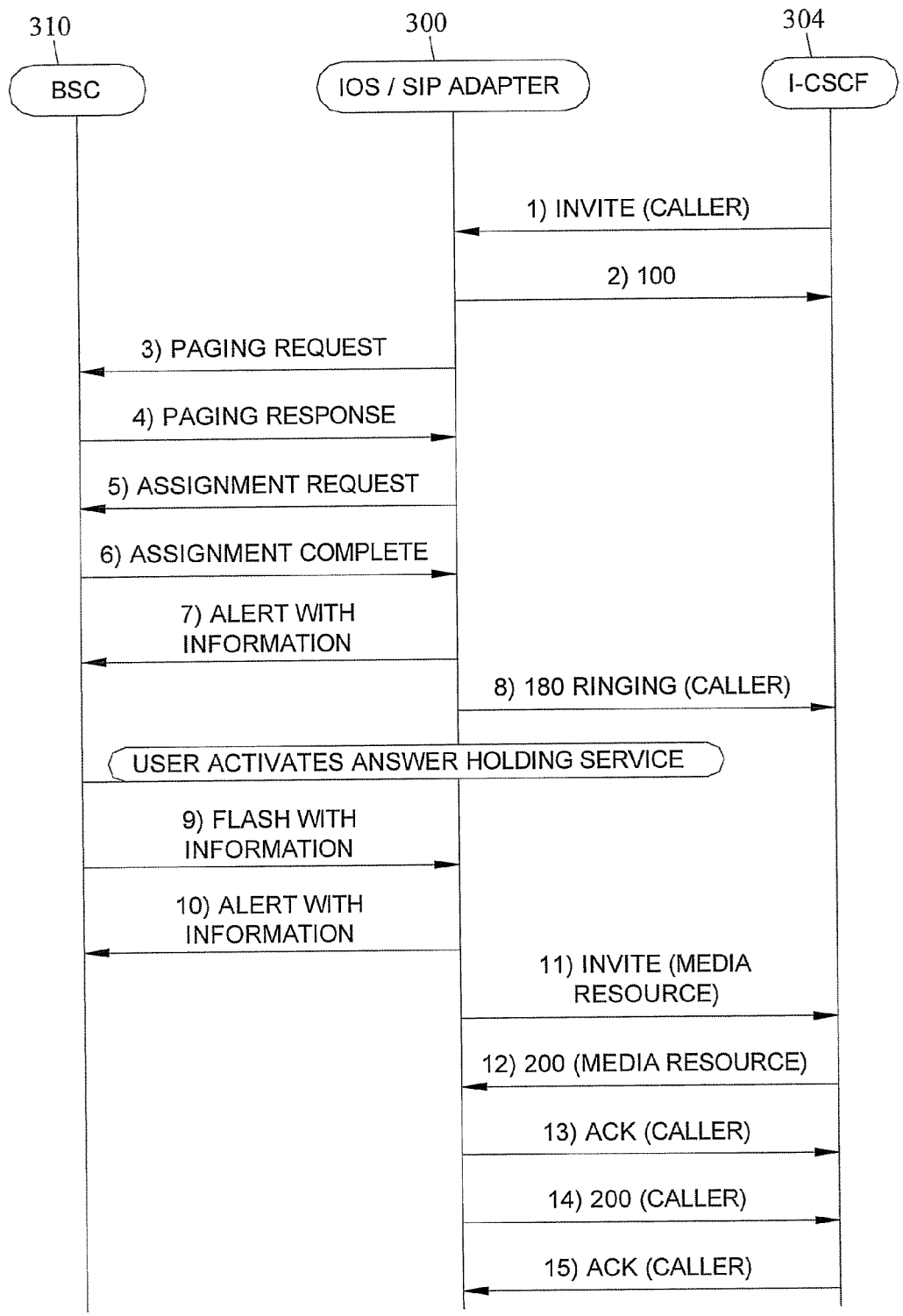
Figure 13C:
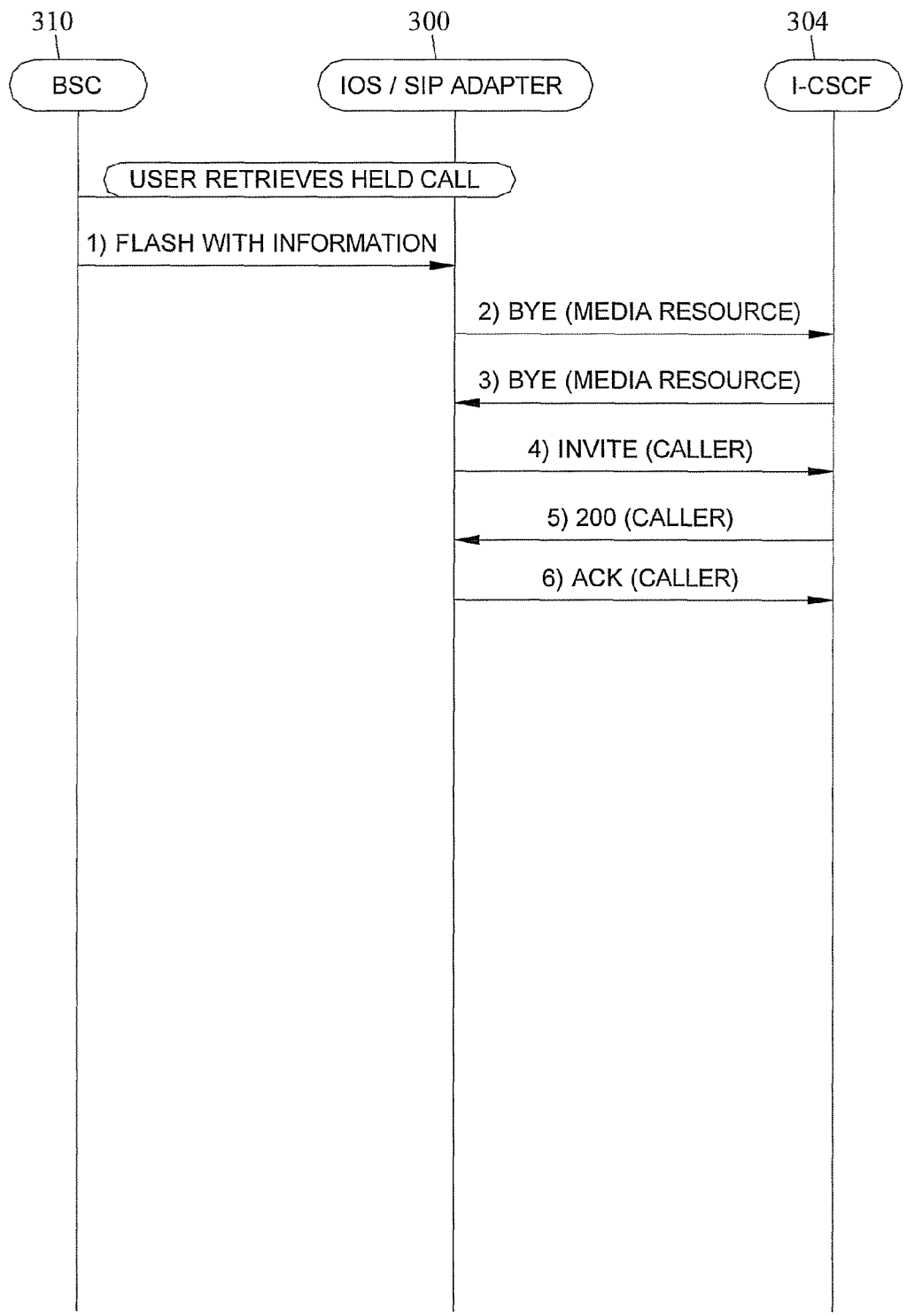

Yet another supplementary service that may be provided using IOS/SIP adapter 300 is answer holding, call waiting, and held call retrieval service. FIGS. 13A-13C illustrate exemplary message flow associated with these services. More particularly, FIG. 13A illustrates a message flow for answer holding service when the terminal is idle. Referring to FIG. 13A, in line 1 of the message flow diagram, IOS/SIP adapter 300 receives an INVITE message from I-CSCF 304. In line 2 of the message flow diagram, IOS/SIP adapter 300 responds with a SIP 100 message. In line 3 of the message flow diagram, IOS/SIP adapter 300 sends a paging request message to BSC 310. In line 4 of the message flow diagram, BSC 310 responds with a paging response message.

In line 5 of the message flow diagram, IOS/SIP adapter 300 sends an assignment request message to BSC 310. In line 6 of the message flow diagram, BSC 310 responds with an assignment complete message. In line 7 of the message flow diagram, IOS/SIP adapter 300 sends an alert with information message to BSC 310. In line 8 of the message flow diagram, IOS/SIP adapter 300 sends a 180 ringing message to I-CSCF 304.

After line 8, it is assumed that the user activates answer holding service. Accordingly, in line 9 of the message flow diagram, BSC 310 sends a flash with information message to IOS/SIP adapter 300, indicating that the answer holding service has been activated. In line 10 of the message flow diagram, IOS/SIP adapter 300 sends an alert with information message to BSC 310. In line 11 of the message flow diagram, IOS/SIP adapter 300 sends an INVITE message to I-CSCF 304. In line 12 of the message flow diagram, I-CSCF 304 sends a SIP 200 message to IOS/SIP adapter 300. In line 13 of the message flow diagram, IOS/SIP adapter 300 sends an acknowledgement message to I-CSCF 304. In line 14 of the message flow diagram, IOS/SIP adapter 300 sends a SIP 200 message to I-CSCF 304. In line 15 of the message flow diagram, I-CSCF 304 sends an acknowledge message to IOS/SIP adapter 300.

FIG. 13B illustrates exemplary messaging using IOS/SIP adapter 300 for call waiting service. The messages illustrated in 13B are the same as those in 13A. Hence, a description thereof will not be repeated herein.

FIG. 13C illustrates exemplary messaging that may be exchanged using IOS/SIP adapter 300 in retrieving a held call. Referring to FIG. 13C, in line 1 of the message flow diagram, the mobile terminal retrieves the held call in BSC 310 and sends a flash with information message to IOS/SIP adapter 300. In response to the flash with information message, IOS/SIP adapter 300 sends a BYE message to I-CSCF 304. The BYE message terminates the connection between the held call the media resource. In line 308 in the message flow diagram, I-CSCF 304 sends a BYE message to IOS/SIP adapter 300. In line 4 of the message flow diagram, IOS/SIP adapter 300 sends an INVITE message to I-CSCF 304 to invite the held call to a session. In line 5 of the message flow diagram, I-CSCF 304 sends a 200 OK message indicating that the held call has been retrieved. In line 6 of the message flow diagram, IOS/SIP adapter 300 sends an acknowledge message, acknowledging retrieval of the held call.

Figure 14:
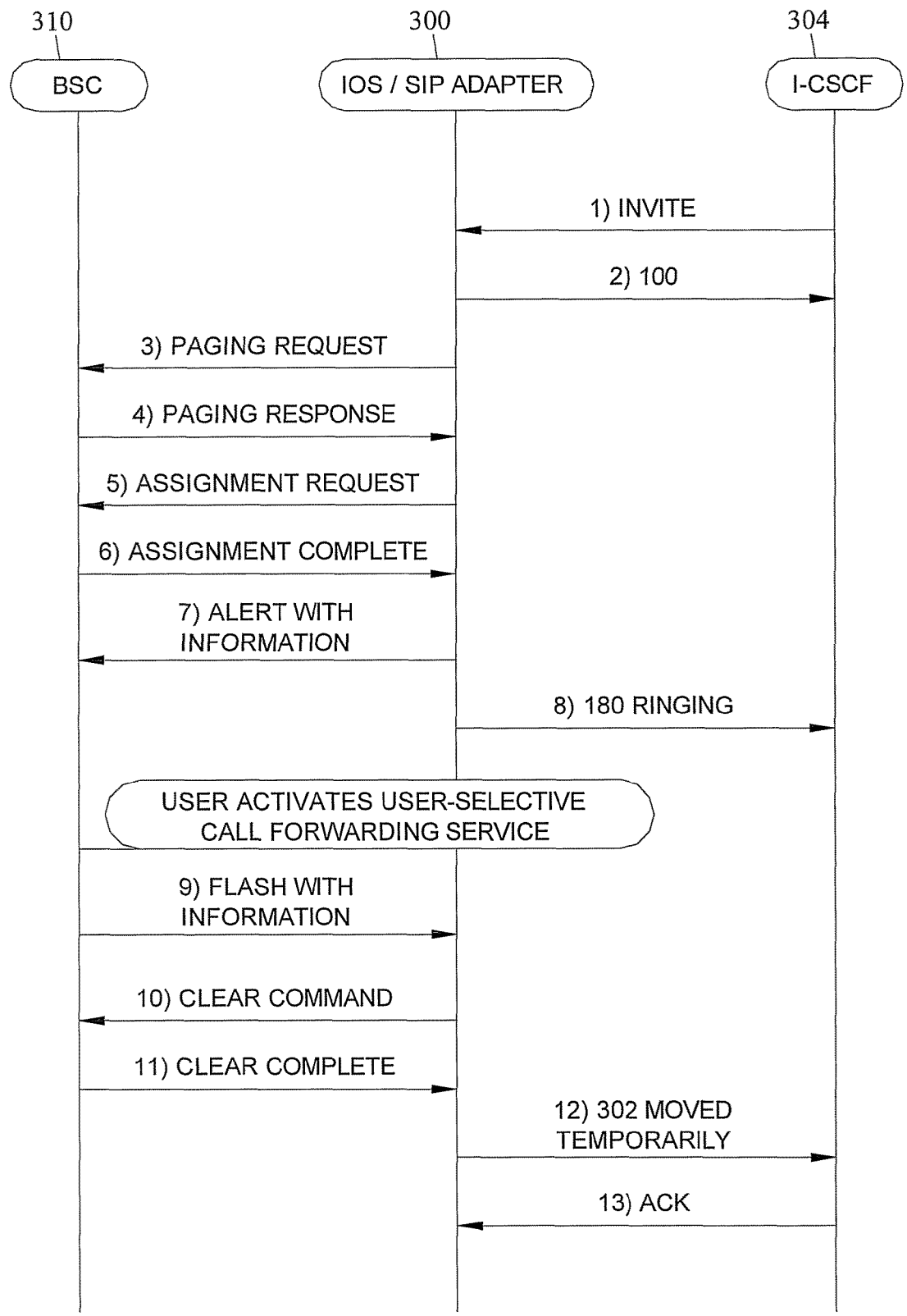
FIG. 14 illustrates an exemplary message flow associated with call redirection to a mobile provided number according to an embodiment of the subject matter described herein

Yet another example of the supplementary service that may be provided using IOS/SIP adapter 300 is user selective call forwarding. FIG. 14 illustrates exemplary messaging associated with redirection to a mobile provided number according to an embodiment of the subject matter described herein. Referring to FIG. 14, in line 1 of the message flow diagram, I-CSCF 304 sends an INVITE message to IOS/SIP adapter 300. In line 2 of the message flow diagram, IOS/SIP adapter 300 sends a 100 message to I-CSCF 304. In line 3 of the message flow diagram, IOS/SIP adapter 300 sends a paging request message to BSC 310. In line 4 of the message flow diagram, BSC 310 responds with a paging response message. In line 5 of the message flow diagram, IOS/SIP adapter 300 sends an assignment request message to BSC 310. In line 6 of the message flow diagram, BSC 310 responds with an assignment complete message. In line 7 of the message flow diagram, IOS/SIP adapter 300 sends an alert with information message to BSC 310. In line 8 of the message flow diagram, IOS/SIP adapter 300 sends a 180 ringing message to I-CSCF 304.

After line 8, it is assumed that the mobile terminal activates user selective call forwarding service. Accordingly, in line 9 of the message flow diagram, IOS/SIP adapter 300 receives a flash with information message indicating that the call is to be forwarded. In line 10 of the message flow diagram, IOS/SIP adapter 300 sends a clear command message to BSC 310 to clear radio and resources for the original call. In line 11 of the message flow diagram, BSC 310 responds with a clear complete message.

In line 12 of the message flow diagram, IOS/SIP adapter sends a SIP 302 moved temporarily message to I-CSCF 304. In line 13 of the message flow diagram, I-CSCF 304 responds with an acknowledge message.

In addition to a mobile provided directory number, IOS/SIP adapter 300 may also be used to redirect calls to a network provided director number. The message flow for redirecting a call to a network registered directory number is the same as that illustrated in FIG. 14.

Figure 15A:
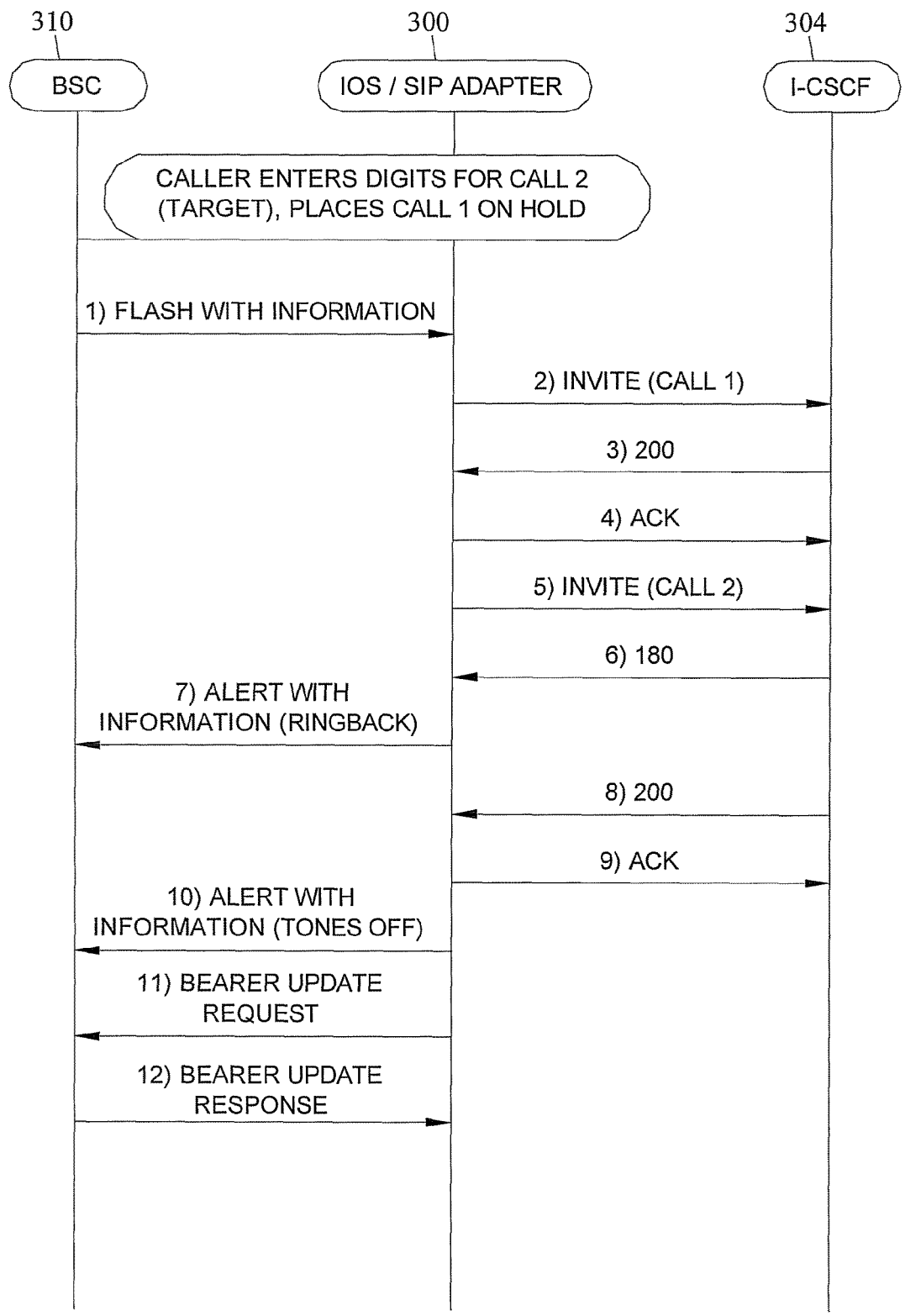
FIGS. 15A-15D illustrate exemplary message flows associated with call-forwarding using an IOS/SIP adapter according to an embodiment of the subject matter described herein.

Yet another type of supplementary service that may be provided using IOS/SIP adapter 300 is call transfer service. FIG. 15A illustrates exemplary messaging that may be exchanged for call transfer service initiation where no digits are provided at hold time. Referring to message flow diagram, in line 1, BSC 310 sends a flash with information message to IOS/SIP adapter 300. The flash with information message contains the caller entered digits for the target call and an indication to place the first call on hold. In line 2 of the message flow diagram, IOS/SIP adapter 300 sends an INVITE message to invite I-CSCF 304 to place the first call on hold. In line 3 of the message flow diagram, I-CSCF 304 responds with a SIP 200 message. In line 4 of the message flow diagram, IOS/SIP adapter 300 acknowledges the SIP 200 message.

In line 5 of the message flow diagram, IOS/SIP adapter 300 sends an INVITE message to I-CSCF 304 to initiate the session for call 2. In line 6 of the message flow diagram, I-CSCF 304 responds with the SIP 180 message. In line 7 of the message flow diagram, IOS/SIP adapter 300 sends an alert with information message to BSC 310 instructing BSC 310 to play a ring-back tone. When the called party answers, in line 8 of the message flow diagram, I-CSCF 304 sends a SIP 200 message to IOS/SIP adapter 300. In line 9 of the message flow diagram, IOS/SIP adapter 300 acknowledges the SIP 200 message.

Figure 15B:
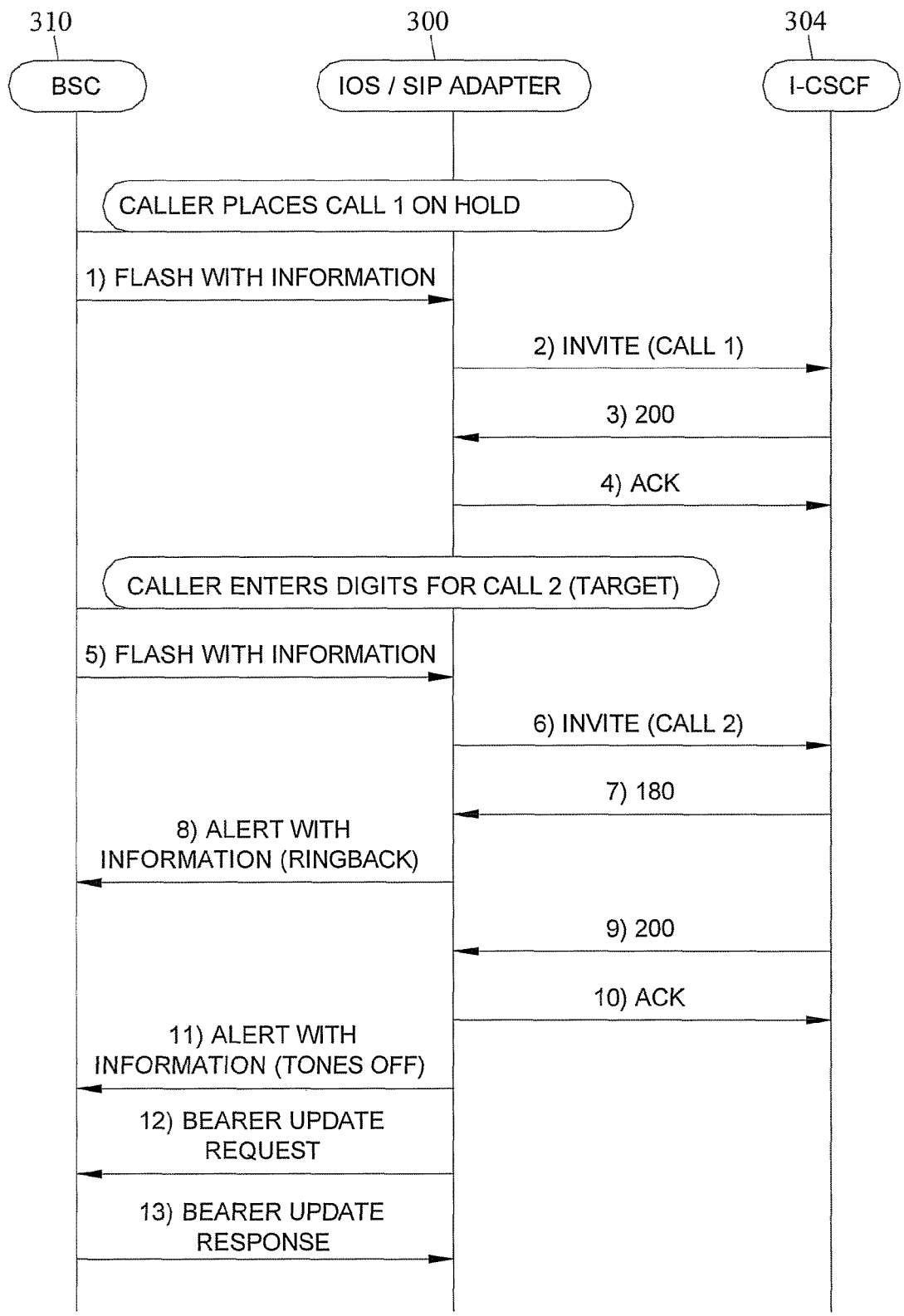

In line 10 of the message flow diagram, IOS/SIP adapter 300 sends an alert with information message to BSC 310. The alert with information message instructs BSC 310 to disable tones. In line 11 of the message flow diagram, IOS/SIP adapter 300 sends a bearer update request message to update the bearer channel for the new media session. In line 12 of the message flow diagram, BSC 310 responds with a bearer update response message. FIG. 15B illustrates exemplary messaging that may be exchanged for call transfer service where digits are provided at hold time. Referring to the message flow diagram, in line 1, BSC 310 sends a flash with information message to IOS/SIP adapter 300 indicating that the caller has placed call 1 on hold. In line 2 of the message flow diagram, IOS/SIP adapter 300 sends an INVITE message to I-CSCF 304 indicating that call 1 is placed on hold. In line 3 of the message flow diagram, I-CSCF 304 responds with a SIP 200 message. In line 4 of the message flow diagram, IOS/SIP adapter 300 acknowledges the SIP 200 message.

The message flow diagram, the user enters the digits for call 2 or the target call and BSC 310 sends a flash with information message including the digits for the target to IOS/SIP adapter 300. In line 6 of the message flow diagram, IOS/SIP adapter 300 sends an INVITE message to initiate the session for call 2. In line 7 of the message flow diagram, I-CSCF 304 sends a SIP 180 message to IOS/SIP adapter 300. In line 8 of the message flow diagram, IOS/SIP adapter 300 sends an alert with information message to BSC 310 instructing BSC 310 to play a ring-back tone to the mobile terminal.

When the target answers the second call, in line 9 of the message flow diagram, I-CSCF 304 sends a 200 OK message to IOS/SIP adapter 300. In line 10 of the message flow diagram, IOS/SIP adapter 300 acknowledges the SIP 200 message.

In line 11 of the message flow diagram, IOS/SIP adapter 300 sends an alert with information message to BSC 310 indicating that BSC 310 should disable tones. In line 12 of the message flow diagram, IOS/SIP adapter 300 sends a bearer update request message to BSC 310. In line 13 of the message flow diagram, BSC 310 responds with a bearer update response message.

Figure 15C:
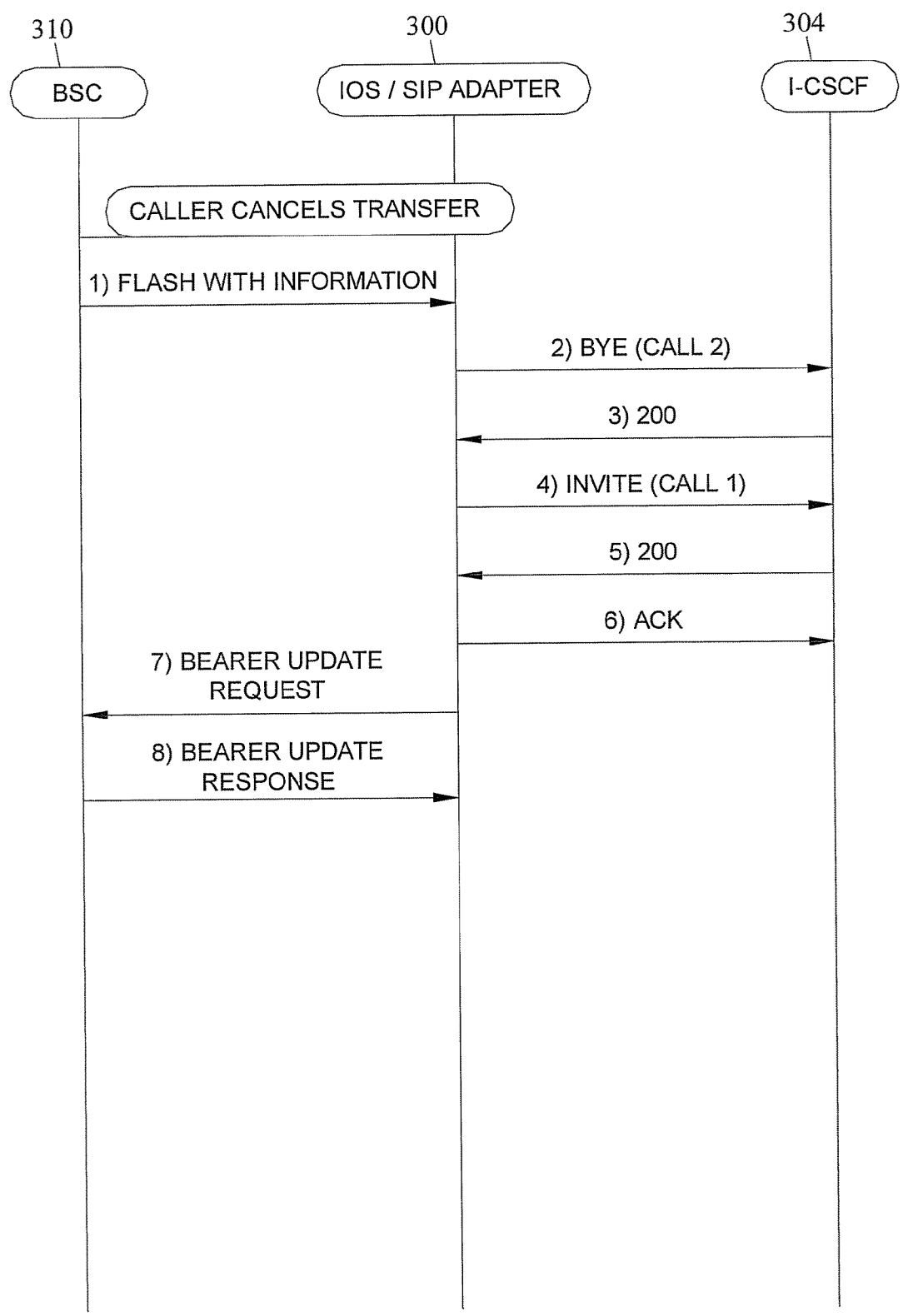

FIG. 15C illustrates exemplary messaging associated with cancellation of a call transfer. Referring to the message flow diagram, in line 1, once the initiating mobile cancels a call transfer, BSC 310 sends a flash with information message IOS/SIP adapter 300 indicating the transfer to call 2 is cancelled. In response, IOS/SIP adapter 300 sends a SIP BYE message indicating that the transfer of call 2 should be cancelled to I-CSCF 304. In line 3 of the message flow diagram, I-CSCF 304 responds with a SIP 200 message.

In line 4 of the message flow diagram, IOS/SIP adapter 300 sends an INVITE message to reconnect with the held call (call 1). In line 5 of the message flow diagram, I-CSCF 304 sends a SIP 200 message. In line 6 of the message flow diagram, IOS/SIP adapter 300 acknowledges the SIP 200 message. In line 7 of the message flow diagram, IOS/SIP adapter 300 sends a bearer update request message to BSC 310 to reconnect call 1. In line 8 of the message flow diagram, BSC 310 responds with a bearer update response message.

Figure 15D:
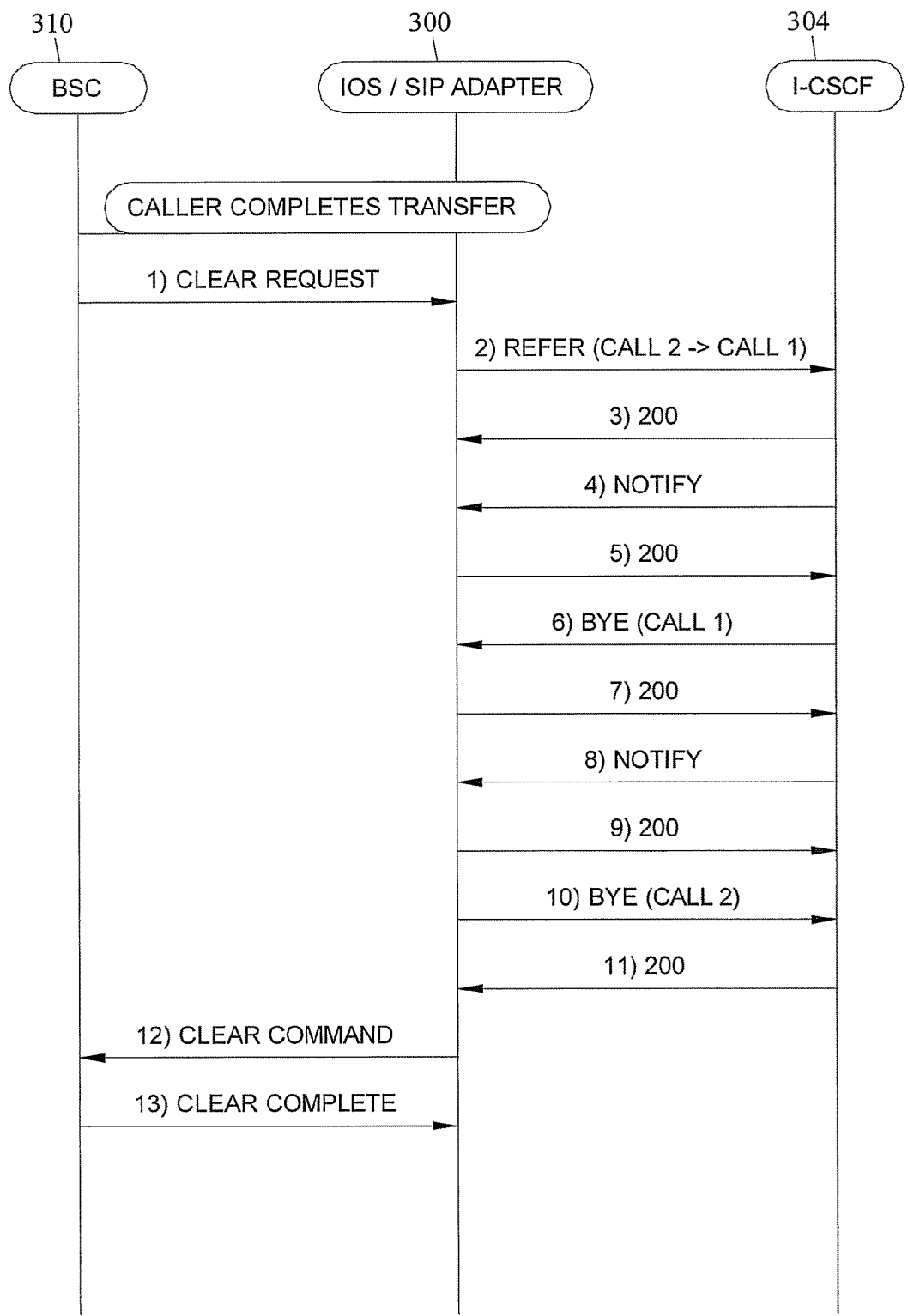

FIG. 15D illustrates exemplary messaging associated with call transfer completion. Referring to FIG. 15D, in line 1, it is assumed that the caller completes the transfer and BSC 310 sends a clear request message to IOS/SIP adapter 300. In line 2 of the message flow diagram, IOS/SIP adapter 300 sends a REFER message to I-CSCF 304. In line 3 of the message flow diagram, I-CSCF 304 responds with a SIP 200 message.

In line 4 of the message flow diagram, I-CSCF 304 sends a notify message to IOS/SIP adapter 300. In line 5 of the message flow diagram, IOS/SIP adapter 300 responds with a SIP notification message.

In line 6 of the message flow diagram, I-CSCF 304 sends a BYE message terminating the first call. In line 7 of the message flow diagram, IOS/SIP adapter 300 responds with a SIP 200 message. In line 8 of the message flow diagram, I-CSCF 304 sends a notify message to terminate the second call. In line 9 of the message flow diagram, IOS/SIP adapter 300 responds with a SIP 200 message. In line 10 of the message flow diagram, IOS/SIP adapter 300 sends a BYE message to terminate the second call to I-CSCF 304. In line 11 of the message flow diagram, I-CSCF 304 responds with a SIP 200 message.

In line 12 of the message flow diagram, IOS/SIP adapter 300 sends a clear command to BSC 310 to clear radio resources associated with both calls. After clearing the radio resources, in line 13 of the message flow diagram, BSC 310 sends a clear complete message to IOS/SIP adapter 300.

Advice of Charge

Advice of Charge is performed exclusively by the IMS core. In the current version of the product, we assume that the IMS core will send Advice of Charge notices as text messages, making use of the SIP MESSAGE method. When and if the IETF, 3GPP, and/or 3GPP2 standardize a SIP-based mechanism for Advice of Charge, additional support will be added to IOS/SIP adapter 300.

Packet Data Call

IOS/SIP adapter 300 needs to need to authenticate the caller and then send an IOS response. Successful authentication authorizes use of the data bearer. The IMS core is preferably not contacted for this situation. Inbound calls while data is ongoing will be 486ed.

Enhanced 911 Emergency Calls

Emergency calls, such as E911 service calls, are serviced by leveraging the NENA i2 architecture. This solution routes call to the PSAP through a normal Selective Router, just like all other emergency calls (both wireless and wire-line); provides location information in the same way as other wireless calls and provides a call-back number to the PSAP, like normal emergency calls.

Figure 15E:
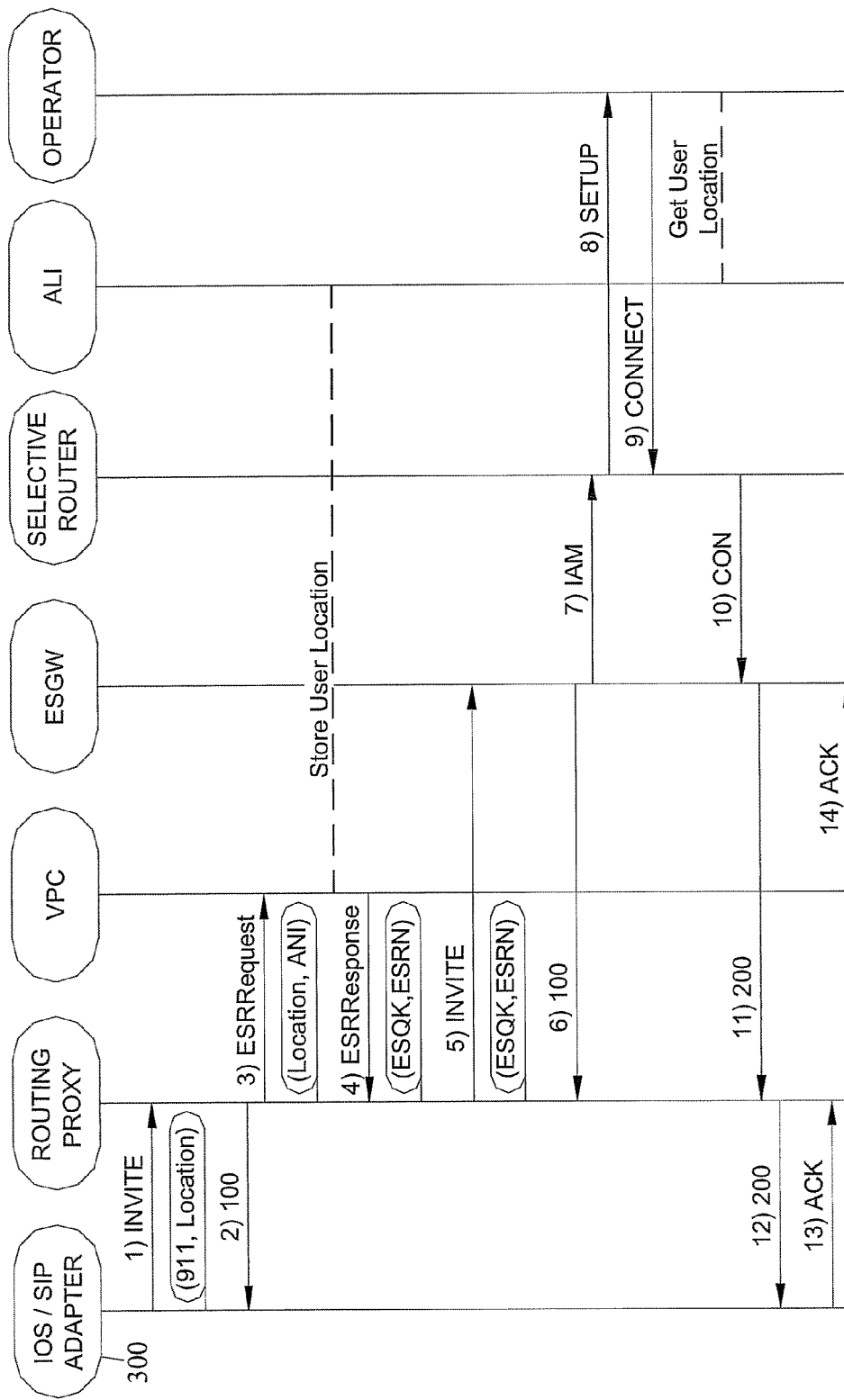
FIG. 15E is a message flow diagram illustrating exemplary processing of an emergency call using an IOS/SIP adapter according to an embodiment of the subject matter described herein.

To ensure proper priority handling of emergency calls, they are not routed through the IMS core (which may not be equipped to handle emergency priority calls). Instead, IOS/SIP adapter 300 uses the presence of the GECI flag in the IOS call setup messages to determine that the call is an emergency call. Additionally, IOS/SIP adapter 300 may employ its own digit analysis to detect well-known emergency digit strings, such as "911", "112", "999", and similar. Upon detecting an emergency call, IOS/SIP adapter 300 will directly contact its provisioned Routing Proxy (as that term is defined in the NENA i2 architecture). The protocol mapping for the SIP messages sent to the Routing Proxy will be the same as to the SIP messages sent to the IMS core for a voice call. FIG. 15E is a message flow diagram illustrating exemplary messages that would be exchanged in processing an E911 call using IOS/SIP adapter 300.

Lawfully Authorized Electronic Surveillance

Lawfully Authorized Electronic Surveillance will be performed according to ANSI STD-J-0025. The BTS/BSC will act as a CIAP, as that term is defined in the standard. Either the BTS/BSC or the IOS/SIP adapter will act as an IDIAP, as that term is defined in the standard. The IMS core—more specifically, the S-CSCF—will act as an SSIAP and an IDIAP, as those terms are defined in the standard.

Parameter Mapping

In the message flow diagrams above, rather than tunneling IOS messages to a convergence server, IOS/SIP adapter 300 maps between IOS and SIP message parameters. The following tables illustrate exemplary parameter mappings that may be performed by IOS/SIP adapter 300.

IOS Messages Sent by the Adapter

ADDS Page

The ADDS Page message is used to send SMS messages to the terminal when the terminal is not in a call.

TABLE 3

ADDS Page Parameter Mapping

| IOS Parameter | Value Used |
|---|---|
| Message Type | 0x65 |
| IMSI | IMSI associated with Request-URI during registration procedures |
| ADDS User Part | See "Bearer Parameter Mapping" section. |
| Tag | Set to adapter-selected opaque identifier used to correlate ADDS Page Ack to this message. |
| Cell Identifier List | Do not include |
| Slot Cycle Index | Do not include |
| IS-2000 Mobile Capabilities | Do not include |
| Protocol Revision | Set to value from "Protocol Revision" in most recent "Location Updating Request" message. Omitted if "Protocol Revision" was not present in "Location Updating Request". |

Alert with Information

This message is used to cause the terminal to generate tones alerting tones when the terminal is receiving an incoming call.

Note that we may optionally include the Signal information in the Assignment Request message instead.

TABLE 4

Alert with Information Parameter Mapping

| IOS Parameter | Value Used |
|---|---|
| Message Type | 0x26 |
| MS Information Records | Signal: set to value from Alert-Info header, if appropriate; otherwise, Normal Alert/Medium Pitch. See "Distinctive Ringing" section |
| Service Option Connection Identifier (SOCI) | Set to SOCI of this call (taken from Paging Response) |

See "Distinctive Ringing" section.

Assignment Request

TABLE 5

Assignment Request Parameter Mapping

| IOS Parameter | Value Used |
|---|---|
| Message Type | Set to 0x01 |
| Channel Type | Always set as follows, regardless of actual channel type in use: Speech/Data = 0x01 (speech), Channel Rate = 0x08 (full rate), Encoding = 0x05 (13 kb/s vocoder) or other configurable value |
| Circuit Identity Code | Do not include |
| Encryption Information | Do not include. |
| Service Option | Copy from Service Option that was sent in CM Service Request. |
| Signal | Do not include. |
| Calling Party ASCII Number | Do not include. |
| MS Information Records | Value TBD |
| Priority | Included only if "Include Priority" is set in CM Service Request or E911 procedures are ongoing. |
| PACA Timestamp | Do not include (PACA queuing not in scope) |
| Quality of Service Parameters | Do not include. |
| Service Option Connection Identifier (SOCI) | Set to SOCI of this call (taken from CM Service Request) |
| A2p Bearer Session-Level Parameters | See "Bearer Parameter Handling" section below |
| A2p Bearer Format-Specific Parameters | See "Bearer Parameter Handling" section below. |

Bearer Update Request

TABLE 6

Bearer Update Request Parameter Mapping

| IOS Parameter | Value Used |
|---|---|
| Message Type | 0x58 |
| A2p Bearer Session-Level Parameters | See "Bearer Parameter Handling" section below. |
| A2p Bearer Format-Specific Parameters | See "Bearer Parameter Handling" section below.. |

Clear Command

TABLE 7

Clear Command Parameter Mapping

| IOS Parameter | Value Used |
|---|---|
| Message Type | 0x20 |
| Cause | If administratively cleared, 0x07 |
| | If cleared by remote party, 0x09 and set "Cause Layer 3" |
| | If cleared due to hard handoff, 0x0B |
| | If cleared due to authentication, 0x1A |
| | If cleared due to unrecoverable state, 0x60 |
| Cause Layer 3 | Included only is "Cause" is set to 0x09 (call processing). |
| | If Clear Command is triggered by receipt of a BYE, set to 0x10 (normal clearing). |
| | If Clear Command is triggered by a 486 (or similar condition), set to 0x11 (user busy) |
| | If Clear Command is triggered by a timeout condition, set to 0x13 (user alerting - no answer) |
| | If Clear Command is triggered by any other user-layer call-processing condition, set to 0x1F (normal unspecified). |
| | Other Q.931 values may be appropriate, as negotiated with the BSC/BTS provider. |

Feature Notification

The Feature Notification message is used exclusively for message waiting indication.

TABLE 8

Feature Notification Parameter Mapping

| IOS Parameter | Value Used |
|---|---|
| Message Type | 0x60 |
| IMSI | IMSI associated with Request-URI during registration procedures |
| Tag | Set to adapter-selected opaque identifier used to correlate Feature Notification Ack to this message. |
| Cell Identifier List | Do Not Include |
| Slot Cycle Index | Do not include |
| Signal | Included only if audible alerting is desired; if so, set to 0x44 (ping ring). |
| Message Waiting Indication | Do not include (deprecated) |
| Calling Party ASCII Number | Do not include (deprecated) |
| MS Information Records | Include "Message Waiting Indication" field indicating number of messages are waiting |
| IS-2000 Mobile Capabilities | Do not include |
| Protocol Revision | Set to value from "Protocol Revision" in most recent "Location Updating Request" message. Omitted if "Protocol Revision" was not present in "Location Updating Request". |

Location Updating Accept

TABLE 9

Location Updating Accept Parameter Mapping

| IOS Parameter | Value Used |
|---|---|
| Protocol Discriminator | Set to 0x05 (Mobility Management) |
| Message Type | Set to 0x02 |
| Cause | If "Registration Type" in "Location Updating Request" was "Power-Down", this value is "power down from dormant state" (0x19); otherwise, the field is not included. |
| Protocol Revision | Set to value from "Protocol Revision" in "Location Updating Request" message. Omitted if "Protocol Revision" was not present in "Location Updating Request". |

Paging Request

TABLE 10

Paging Request Parameter Mapping

| IOS Parameter | Value Used |
|---|---|
| Message Type | 0x52 |
| IMSI | IMSI associated with Request-URI during registration procedures |
| Tag | Set to adapter-selected opaque identifier used to correlate Paging Response to this message. |
| Cell Identifier List | Do Not Include |
| Slot Cycle Index | Do not include |
| Service Option | Do not include |
| IS-2000 Mobile Capabilities | Do not include |
| Protocol Revision | Set to value from "Protocol Revision" in "Location Updating Request" message. Omitted if "Protocol Revision" was not present in "Location Updating Request". |

IOS Messages Received by the Adapter

ADDS Deliver Ack

TABLE 11

ADDS Deliver Ack Parameter Mapping

| IOS Parameter | Use |
|---|---|
| Message Type | 0x54 |
| Tag | Used to correlate ADDS Deliver to this message. |
| Cause | If present, will be set to 0x34 - this will cause sending of 480 response to MESSAGE request. |

ADDS Page Ack

TABLE 12

ADDS Page Ack Parameter Mapping

| IOS Parameter | Use |
|---|---|
| Message Type | 0x66 |
| IMSI | Identifies terminal sending message |
| Tag | Used to correlate to ADDS Page message. |
| ESN | Ignored |
| Cause | |
| Cell Identifier | Ignored |

ADDS Transfer

TABLE 13

ADDS Transfer Parameter Mapping

| IOS Parameter | Use |
|---|---|
| Message Type | 0x67 |
| IMSI | Identifies terminal sending message |
| ADDS User Part | See "Compound Parameter Mapping" section |
| ESN | Ignored |
| Authentication Response Parameter (AUTHR) | Ignored |
| Authentication Confirmation Parameter (RANDC) | Ignored |
| Authentication Parameter Count | Ignored |
| Authentication Challenge Parameter (RAND) | Ignored |
| Authentication Event | Ignored |
| Cell Identifier | Ignored |
| CDMA Serving One Way Delay | Ignored |
| Authentication Data | Ignored |
| Tag | Used for correlation |

Assignment Complete

TABLE 14

Assignment Complete Parameter Mapping

| IOS Parameter | Use |
|---|---|
| Message Type | Should be 0x02 |
| Channel Number | Ignored |
| Encryption Information | Ignored |
| Service Option | Should match Service Option from CM Service Request. |
| Service Option Connection Identifier (SOCI) | Correlates message to proper call. |

Bearer Update Response

TABLE 15

Bearer Update Response Parameter Mapping

| IOS Parameter | Use |
|---|---|
| Message Type | Should be 0x59 |
| Cause | If present, indicates failure. Either reject re-INVITE, or tear down call. |
| A2p Bearer Session-Level Parameters | If present, used to generate SDP towards remote party - see "Bearer Parameter Handling" section. |
| A2p Bearer Format-Specific Parameters | If present, used to generate SDP towards remote party - see "Bearer Parameter Handling" section |

CM Service Request

TABLE 16

CM Service Request Parameter Mapping

| IOS Parameter | Use |
|---|---|
| Protocol Discriminator | Should always be 0x03 (Call Processing) |
| Message Type | Should always be 0x24 |
| CM Service Type | Should be 0x91 (Mobile Originating Call) |
| Classmark Information Type 2 | Ignored |
| IMSI | Used to correlate this call to the terminal's registration, primarily for the purpose of retrieving the user's public identity. |
| Called Party BCD Number | If present, used to populate the "To" header field in the SIP INVITE request. (Exactly one of Called Party BCD Number or Called Party ASCII Number must be present, except for E911 calls). |
| ESN | Ignored |
| Slot Cycle Index | Ignored |
| Authentication Response Parameter (AUTHR) | Ignored |
| Authentication Confirmation Parameter (RANDC) | Ignored |
| Authentication Parameter Count | Ignored |
| Authentication Challenge Parameter (RAND) | Ignored |
| Service Option | Must be one of 0x8000, 0x0011, or 0x0003. |
| Voice Privacy Request | Ignored |
| Radio Environment and Resources | If "Forward" or "Reverse" are poor, or resources are neither allocated nor available, the Adapter should fail the call attempt (unless the call is otherwise identifiable as an E911 call). |
| Called Party ASCII Number | If present, used to populate the "To" header field in the SIP INVITE request. (Exactly one of Called Party BCD Number or Called Party ASCII Number must be present, except for E911 calls). |
| Circuit Identity Code | Should not be present; if present, ignored. |
| Authentication Event | Ignored |
| Authentication Data | Ignored |
| PACA Reorigination Indicator | If PACA re-origination is indicated, E911 procedures are initiated for the purposes of circuit allocation; see "Enhanced E911" section. |
| User Zone ID | Unknown - may be used for hard handoff |
| IS-2000 Mobile Capabilities | Ignored (n.b. we may cache geoloc mechanism for later coding into E911 calls - use TBD) |
| CDMA Serving One Way Delay | Ignored |
| Special Service Call Indicator | If an emergency call is indicated, E911 procedures are initiated; see "Enhanced E911" section. |
| Service Option Connection Identifier (SOCI) | Used to identify the virtual "connection" established by this Service Request (similar to SIP "Call-ID", except scoped per-terminal). |
| Protocol Revision | Ignored |
| A2p Bearer Session-Level Parameters | If present, stored for later use in generation of SDP - see "Bearer Parameter Handling" section. |
| A2p Bearer Format-Specific Parameters | If present, stored for later use in generation of SDP - see "Bearer Parameter Handling" section. |

Clear Complete

TABLE 17

| \<Clear Complete Parameter Mapping\> | |
|---|---|
| IOS Parameter | Use |
| Message Type | 0x21 |
| Power Down Indicator | If set, initiate IMS deregistration procedures. |

Clear Request

TABLE 18

| \<Clear Request Parameter Mapping\> | |
|---|---|
| IOS Parameter | Use |
| Message Type | 0x22 |
| Cause | |
| Cause Layer 3 | |

Connect

TABLE 19

| \<Connect Parameter Mapping\> | |
|---|---|
| IOS Parameter | Use |
| Message Type | 0x07 |
| Service Option Connection Identifier (SOCI) | |

Feature Notification Ack

TABLE 20

| \<Feature Notification Ack Parameter Mapping\> | |
|---|---|
| IOS Parameter | Use |
| Message Type | 0x61 |
| IMSI | |
| Tag | |

Flash with Information Ack

TABLE 21

| \<Flash with Information Ack Parameter Mapping\> | |
|---|---|
| IOS Parameter | Use |
| Message Type | 0x50 |
| Tag | |
| Service Option Connection Identifier (SOCI) | |

Location Updating Request

TABLE 22

| \<Location Updating Request Parameter Mapping\> | |
|---|---|
| IOS Parameter | Use |
| Protocol Discriminator | Should be 0x05 (Mobility Management) |
| Message Type | Should always be 0x08 |
| IMSI | Used to generate user ID for "To" and "From" header fields, per 3GPP 23.003 procedures. |
| Classmark Information Type 2 | If "mobile term" bit is 0, suppress SIP registration. |
| Registration Type | If "Zone-Based" or "Distance Based," force SIP re-registration. If "Power-Down," tear down SIP registration. All other types correspond to normal registration - start new registration if none present; refresh IOS-side timers otherwise. |
| ESN | Used to calculate user credentials, if ESN-based credential generation is configured; otherwise, discarded. |
| Slot Cycle Index | Ignored |
| Authentication Response Parameter (AUTHR) | Ignored |
| Authentication Confirmation Parameter (RANDC) | Ignored |
| Authentication Parameter Count | Ignored |
| Authentication Challenge Parameter (RAND) | Ignored |
| Authentication Event | Ignored |
| User Zone ID | Ignored |
| IS-2000 Mobile Capabilities | Cache geoloc mechanism for later coding into E911 calls |
| Protocol Revision | If present, stored for use in corresponding "Location Updating Accept" or "Location Updating Reject" message. |

Paging Response

TABLE 23

Paging Response Parameter Mapping

| IOS Parameter | Use |
|---|---|
| Message Type | 0x57 |
| Classmark Information Type 2 | |
| IMSI | |
| Tag | |
| ESN | |
| Slot Cycle Index | |
| Authentication Response Parameter (AUTHR) | Ignored |
| Authentication Confirmation Parameter (RANDC) | Ignored |
| Authentication Parameter Count | Ignored |
| Authentication Challenge Parameter (RAND) | Ignored |
| Service Option | |
| Voice Privacy Request | |
| Circuit Identity Code | |
| Authentication Event | |
| Radio Environment and Resources | |
| User Zone ID | |
| IS-2000 Mobile Capabilities | |
| CDMA Serving One Way Delay | |
| Service Option Connection Identifier (SOCI) | |
| Protocol Revision | |
| A2p Bearer Session-Level Parameters | Used for generation of SDP - see "Bearer Parameter Handling" section. |
| A2p Bearer Format-Specific Parameters | Used for generation of SDP - "Bearer Parameter Handling Section". |

Bidirectional Messages

ADDS Deliver

The ADDS Page message is used to send SMS messages to and from the terminal when the terminal is in a call.

TABLE 24

ADDS Deliver Parameter Mapping

| IOS Parameter | Use/Value Used |
|---|---|
| Message Type | 0x53 |
| ADDS User Part | See "Compound Parameter Handling" section. |
| Tag | Set to adapter-selected opaque identifier used to correlate ADDS Deliver Ack to this message. |
| CDMA Serving One Way Delay | Do Not Include |

Flash with Information

TABLE 25

Flash with Information Parameter Mapping

| IOS Parameter | Use/Value Used |
|---|---|
| Message Type | 0x10 |
| Called Party BCD Number | |
| Signal | |
| Message Waiting Indication | Ignored/Do Not Send |
| Calling Party ASCII Number | |
| Tag | |
| MS Information Records | |
| Special Service Call Indicator | If received with emergency call indicated, initiate emergency call procedures/Do Not Send |
| Service Option Connection Identifier (SOCI) | |

Compound Parameter Handling

Many IOS parameters have a number of sub-parameters that require more detail than is provided in the preceding sections. Those parameters are detailed in the following sections. IOS/SIP adapter 300 may perform the compound parameter handling, i.e., the mapping of compound parameters in IOS messages to SIP message parameters and vice versa.

ADDS User Part

The ADDS User Part parameter can appear in BS Service Request, ADDS Deliver, ADDS Page, and ADDS Transfer messages. While these can be associated with a number of services, for the purposes of this document, only the following uses of ADDS User Part are considered.

The format of the application-specific portion of the ADDS User Part for SMS-related messaging is defined in section 3.4 of 3GPP document number C.S0015; the Bearer Data Sub-parameters are defined in section 4.5 of 3GPP document number C.S0015. Teleservice identifiers are defined by Table 175 of 3GPP document number N.S0005. The disclosures of these 3GPP document numbers are hereby incorporated herein by reference in their entireties.

Short Messaging Service (SMS)

TABLE 26

ADDS User Part Parameter Mapping, SMS

| Parameter | Use/Value Used |
|---|---|
| Data Burst Type | 0x03 (SMS) |
| SMS_MSG_TYPE | 0x00 (Point-to-Point) |
| Teleservice Identitifer | Decimal 4097 (Wireless Paging Teleservice) Decimal 4098 (Wireless Messaging Teleservice) |
| Service Category | Do not include; ignore if present |
| Originating Address | On Send: Populate with identity of sender from (in order of preference) Identity, P-Asserted-Identity, or From header field. On Receipt: Ignore if present |
| Originating Subaddress | Do not include; ignore if present |
| Destination Address | On Send: Do not include On receipt: used to populate To: header field and Request-URI. |
| Destination Subaddress | Do not include; ignore if present |
| Bearer Reply Option | On Send: Include only if return receipt is requested; populate "REPLY_SEQ" with unique (per terminal), monotonically increasing value that wraps after 64 messages. On Receipt: Request return receipt for message, and store "REPLY_SEQ" for transmission of receipt. |
| Bearer Data | Encode per C.S0015 |

SMS Return Receipt

TABLE 27

ADDS User Part Parameter Mapping, SMS Return Receipt

| Parameter | Use/Value Used |
|---|---|
| Data Burst Type | 0x03 (SMS) |
| SMS_MSG_TYPE | 0x02 (Acknowledge) |
| Destination Address | On Send: Do not include |
|  | On receipt: used to populate To: header field and Request-URI. |
| Destination Subaddress | Do not include; ignore if present |
| Cause Codes | REPLY_SEQ: See "Bearer Reply Option" in Table 26. |
|  | ERROR_CLASS: Set to 00b (success) or 10b (failure). Treat 00b as success, anything else as failure. |
|  | CAUSE_CODE: See Tables 28-30. |

Voice Mail Waiting Notification
(Sent in SMS Deliver Message)

TABLE 28

ADDS User Part Parameter Mapping, Message Waiting Indication

| Parameter | Value Used |
|---|---|
| Data Burst Type | 0x03 (SMS) |
| SMS_MSG_TYPE | 0x00 (Point-to-Point) |
| Teleservice Identifier | Decimal 4099 (Voice Mail Notification) |
| Service Category | Do not include |
| Originating Address | Populate with provisioned value |
| Originating Subaddress | Do not include |
| Destination Address | Do not include |
| Destination Subaddress | Do not include |
| Bearer Reply Option | Do not include |
| Bearer Data: Message Identifier | |
| Bearer Data: User Data | |
| Bearer Data: Message Center Time Stamp | |
| Bearer Data: Priority Indicator | |
| Bearer Data: Privacy Indicator | |
| Bearer Data: Number of Messages | |
| Bearer Data: Alert on Message Delivery | |
| Bearer Data: Call-Back Number | |
| Bearer Data: Multiple Encoding User Data | |

Bearer Parameter Handling

In SIP signaling, bearer parameters are conveyed using SDP, which can be present in INVITE requests, provisional and successful responses to INVITE requests, and ACK requests.

In IOS signaling, bearer parameters are conveyed using the A2p Bearer Session-Level Parameters and A2p Bearer Format-Specific Parameters; these parameters can appear in Additional Service Notification, Additional Service Request, Assignment Complete, Assignment Request, Bearer Update Request, Bearer Update Required, Bearer Update Response, CM Service Request, Handoff Request, Handoff Request Acknowledge, Paging Request, and Paging Response messages.

IOS/SIP adapter 300 may perform mapping between IOS and SIP bearer parameters using the mappings specified in the following tables.

TABLE 29

A2p Bearer Session-Specific Parameter Mapping

| A2p Bearer Session-Specific Parameter | SDP Parameter |
|---|---|
| Max Frames | a = maxptime: (see RFC 4788, note below) |
| Session IP Address Type | Session-level c = line, <address type> parameter |
| Session Addr Flag | Always set to 1 |
| Session IP Address | Session-level c = line, <connection address> parameter |
| Session UDP Port | m = line, <port> parameter |

Conversion between Max Frames and maxptime is performed according to the following formula:

$$\text{maxptime} = (\text{Max Frames}) + 1 * 20$$

$$\text{Max Frames} = (\text{maxptime}/20) - 1$$

TABLE 30

A2p Bearer Format-Specific Parameter Mapping

| A2p Bearer Format-Specific Parameter | SDP Parameter |
|---|---|
| Number of Bearer Formats | Number of m = lines |
| Bearer IP Address Type | Media-level c = line, <address type> parameter (if present) |
| Ext | N/A; used to indicate presence of extension records |
| Bearer Format Tag Type | Set to 1 for telephone-event, 2 for EVRC, 4 for all others |
| Bearer Format ID | a = rtpmap: lines |
| RTP Payload Type | m = line <fmt list> parameter |
| Bearer Addr Flag | If present, indicates presence of media-level c = line |
| Bearer IP Address | Media-level c = line, <connection address> parameter |
| Bearer UDP Port | m = line, <port> parameter (overrides session-specific value, if present) |
| Extension Length | Number of octets in extension; present only if Ext is set to 1 |
| Extension ID | "0" indicates Voice Frame Interleaving; other values never generated by adapter, ignored if received |
| Extension Parameters | If Voice Frame Interleaving, then the "Max Interleave" parameter will correlate to the "a = maxinterleave:" parameter (RFC 4788) |

Note that all formats on the same port will be aggregated in the SDP into a single m=line.

Identity Synthesis

One challenge in interworking 2G phones with 3G networks involves the fact that the information used to identify users varies widely between the networks. In IMS networks, there is an assumption that identifying information (both private and public user identities) are provisioned in the terminal. Legacy terminals will not contain this information, and will therefore lack identifying information that is compatible with the IMS core.

In legacy CDMA terminals, the only identifying information available at registration time is the IMSI and the ESN of the terminal. Producing an identity that can be used in an IMS network from this information can be done one of two ways.

The first mechanism that can be used is the use of the IMSI and/or the ESN as a key into a table of provisioned information that contains associated private and public IDs. This may be feasible (and even desirable) under certain circumstances; however, the additional provisioning overhead may prove to be a challenge in larger systems.

A second mechanism that can be used is the synthesis of public and private IDs from the IMSI and/or the ESN of the phone. Such synthesis avoids the need to provision this information in a way that IOS/SIP adapter 300 has access to it.

While 3GPP2 does not provide such mechanisms, we can take advantage of the fact that most (if not all) IMS cores that will be deployed in CDMA networks will support the procedures defined for GSM identity synthesis from USIM applications, as defined in 3GPP TS 23.003. It should be noted that alternate, non-standard procedures could also be used, as long as the IMS core has the ability to support such procedures.

Consequently, IOS/SIP adapter 300 will initially form private user identities and temporary public user identities using the mechanism defined in 3GPP TS 23.003. The ability to provision IMSI and/or ESN mapping to such identities may also be provided by IOS/SIP adapter 300.

Thus, when IOS/SIP adapter 300 receives an IOS registration message containing a non-IMS identifier for a non-IMS terminal, IOS/SIP adapter 300 may either formulate, i.e., compute, an IMS identifier for the non-IMS identifier or assign an IMS identifier from a table of stored IMS identifiers. The IMS identifier that is assigned to the non-IMS device may be in the form of a URI that is temporarily assigned to the non-IMS terminal for the duration of its registration with the IMS network. IOS/SIP adapter 300 may maintain the mapping between the non-IMS identifier and the temporary IMS identifier and use this mapping for transactions involving the non-IMS terminal. For example, for the registration transaction, IOS/SIP adapter 300 may generate a SIP REGISTER message containing the temporary IMS identifier assigned to the non-IMS terminal.

Credential Synthesis

An additional challenge in interworking 2G phones with 3G networks involves the fact that they employ very different mechanisms for authentication. In both cases, as illustrated in FIGS. 16A and 16B, exchange of credentials involves passing certain information end-to-end between the end terminal and the credential repository (the HLR or HSS, according to the network in use).

Figure 16C:
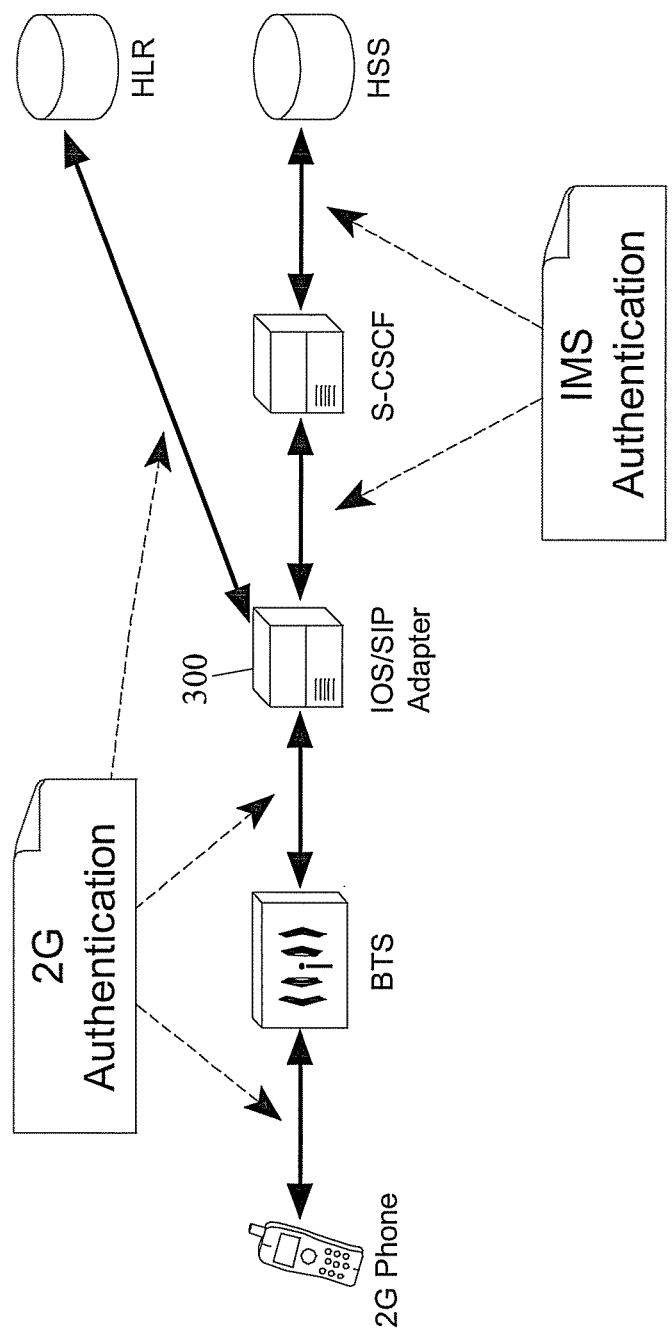

Unfortunately, the information exchanged for authentication procedures is different in a 2G systems than it is in an IMS system. This poses a handful of interesting problems for a function that adapts IOS (or functionally similar 2G protocols, such as IS-95) to SIP, as shown in FIG. 16C. Two problems must be solved: authentication of the terminal to the IOS/SIP Adapter, and authentication of the IOS/SIP adapter (on behalf of the user) to the IMS (or other SIP) network.

Authentication of the terminal to IOS/SIP adapter 300 can occur either using an access control list of allowed IMSI, MEID, and/or ESN information. Although not cryptographically secure, this provides the save level of protection as many consumer-grade wireless access points do with MAC-address filtering (and, arguably more, since changing the ESN of equipment after manufacturing is specifically designed to be very difficult). Alternately, IOS/SIP adapter 300 can communicate with the credential store (either the HLR or a AAA system the HLR uses for credential storage), and perform normal end-to-end 2G authentication procedures as if it were an MSC or an HLR itself.

For authentication on behalf of the terminal, IOS/SIP adapter 300 must be able to securely obtain—either by provisioning or by synthesis—credentials for a terminal that will be accepted by the IMS network. The approach for using provisioning to provide per-user credentials to IOS/SIP adapter 300 is similar to that described in the "Identity Synthesis" section and suffers from the same drawbacks. Consequently, we will have a configuration option that allows the synthesis of credentials at IOS/SIP adapter 300.

As mentioned above, electronic serial numbers (ESNs) are burned into the phone at time of manufacture, and are designed to be resistant to being changed in the field. We will leverage the relative difficulty in reprogramming ESMS to create credentials that allow the IOS/SIP adaptation function to authenticate with the IMS network on behalf of a registering user. Although not strictly necessary to achieve a reasonable level of security, we will strengthen this scheme by including the phone's IMSI as a component in these credentials as well.

Specifically, we make use of a system-wide random key, chosen by the operator. This key is provisioned in the system in such a way that the IOS/SIP adaptation function can access the key. This may involve the operator provisioning the key locally on the box performing IOS/SIP adaptation, or placing it in a network location that the IOS/SIP adaptation function can retrieve it.

During normal IS-95/IS-2000 terminal registration procedures, the IOS/SIP adaptation function will learn the IMSI and ESN of the terminal. It creates set of identities for the user, as described in the "Identity Synthesis" section, and then formulates a password for the user as follows:

User Credentials=H(IMSI ":" ESN ":" KEY)

Where the IMSI and ESN are encoded as their numeric representation in ASCII, and the key is the raw value provisioned for the key. The function "H" is a cryptographic hash function, such as MD5 or SHA-1 (our application will use SHA-1 for such hashing, but should be designed in such a way as to allow easy replacement and/or configuration of this hash algorithm) For interworking with terminals that support MEIDs, the approach is nearly identical, with the MEID serving the same purpose as the ESN:

User Credentials=H(IMSI ":" MEID ":" KEY)

The resultant user credentials can then be used as a password in SIP Digest authentication or other similar SIP-based approaches.

In the IMS network, validation of such credentials can be performed one of two ways. Each user can be provisioned with pre-computed credentials based on the user's terminal information and the system-wide key; alternately, the S-CSCF, HSS, or backing AAA store can be upgraded to compute the credentials as described in this section on the fly.

Subscription Aggregation

Figure 17A:
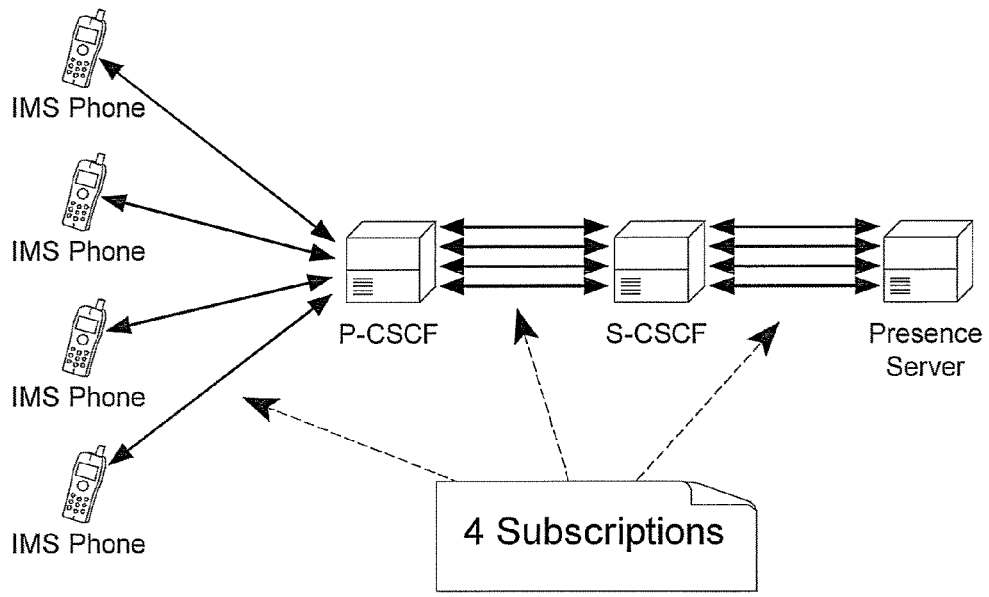
FIGS. 17A and 17B are network diagrams illustrating an exemplary node associated with subscription aggregation using an IOS/SIP adapter according to an embodiment of the subject matter described herein.
Figure 17B:
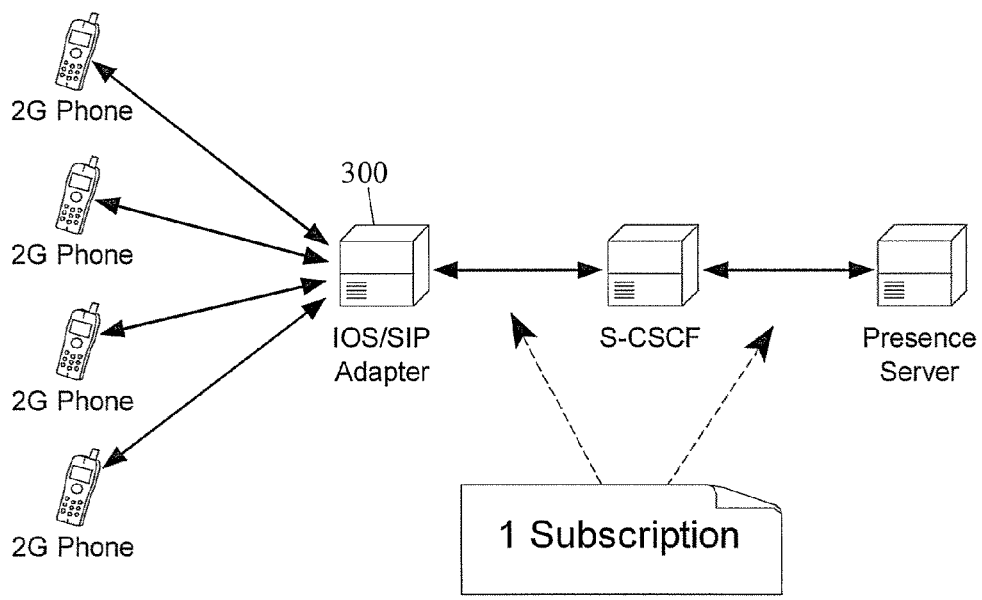

In 3GPP IMS networks as specified, terminals are expected to maintain subscriptions to a number of RFC 3265 event packages; examples include user registration state and buddy-list registration state. FIG. 17A illustrates conventional IMS registration and subscription management where each terminal registering and subscribing to its own registration status, requiring the IMS network (more specifically, the P-CSCF) to maintain a separate registration for each terminal. Instead of maintaining registration state for each terminal as part of a separate registration, IOS/SIP adapter 300 is configurable to have the ability to maintain a single subscription for all the users currently attached to it. Doing so reduces the processing load on the network and reduces the amount of state that must be stored by IOS/SIP adapter 300 and the servers it communicates with. FIG. 17B illustrates subscription aggregation using IOS/SIP adapter 300 according to an embodiment of the subject matter described herein.

Such aggregation may be performed using the mechanism described in RFC 4662, which describes procedures for subscribing to multiple resources identified by a single resource identifier, and the mechanism described in draft-ietf-sip-uri-list-subscribe (and its successor documents), which extends the RFC 4662 mechanism to allow specification of multiple resource identifiers in a subscription. For example, IOS/SIP adapter 300 may utilize the identity synthesis procedure described herein to identify non-IMS devices to the IMS network. After registering with the IMS network, the non-IMS terminals may individually subscribe to their respective registration statuses by sending IOS messages to IOS/SIP adapter 300. Rather than formulating individual SIP SUBSCRIBE messages for each IOS message, IOS/SIP adapter 300 may formulate a resource list, referred to in RFC 4662 as a resource list meta identifier (RLMI) containing the temporary URIs of non-IMS devices for which IOS subscription requests have been received. Upon receipt of a predetermined number of subscription requests that is configurable by the network operator, IOS/SIP adapter 300 may send a SIP SUBSCRIBE message containing the resource list or RLMI to a node in the IMS network, such as a presence server. The resource list may contain virtual subscriptions identified by the individual non-IMS terminal identifiers with the list. The presence server may respond to the SIP SUBSCRIBE message with a single SIP NOTIFY message containing registration state information for each temporary IMS identifier assigned to the non-IMS devices for which the presence server has registration state information. The presence server may delay sending the NOTIFY message for a configurable time period to allow collection of registration state information for individual non-IMS terminals within the subscription specified by the resource list. Similarly, IOS/SIP adapter 300 may delay sending the initial subscribe message or subsequent subscribe messages to allow collection of a sufficient number of IOS registration subscription requests to justify sending a new SUBSCRIBE message. Thus, by grouping multiple non-IMS device subscriptions within a single group subscription, IOS/SIP adapter 300 greatly reduces registration subscription message traffic in the IMS network.

Feature Codes

Features in CDMA networks are activated by sending feature codes in the same strings used to carry phone numbers. These codes must be configurable to match the network environment into which the IOS/SIP Adapter is installed.

Feature codes are generally of the form "*FC", "*FC#address", or "*FC0", where "FC" represents the two- or three-digit feature code, and "address" represents an address to which the feature is to be applied.

Many carriers follow the Vertical Service Code definitions specified by the NANPA; these values will be used as default feature activation codes:

TABLE 31

Default Feature Codes

| Feature Code | Feature |
| --- | --- |
| *67 | Calling Number ID Restriction |
| *71 | Three-Way Calling |
| *72 | Activate Call Forwarding |
| *73 | Deactivate Call Forwarding |

Any feature codes that are not recognized by IOS/SIP adapter 300 are sent to the IMS core transparently.

Figure 18:
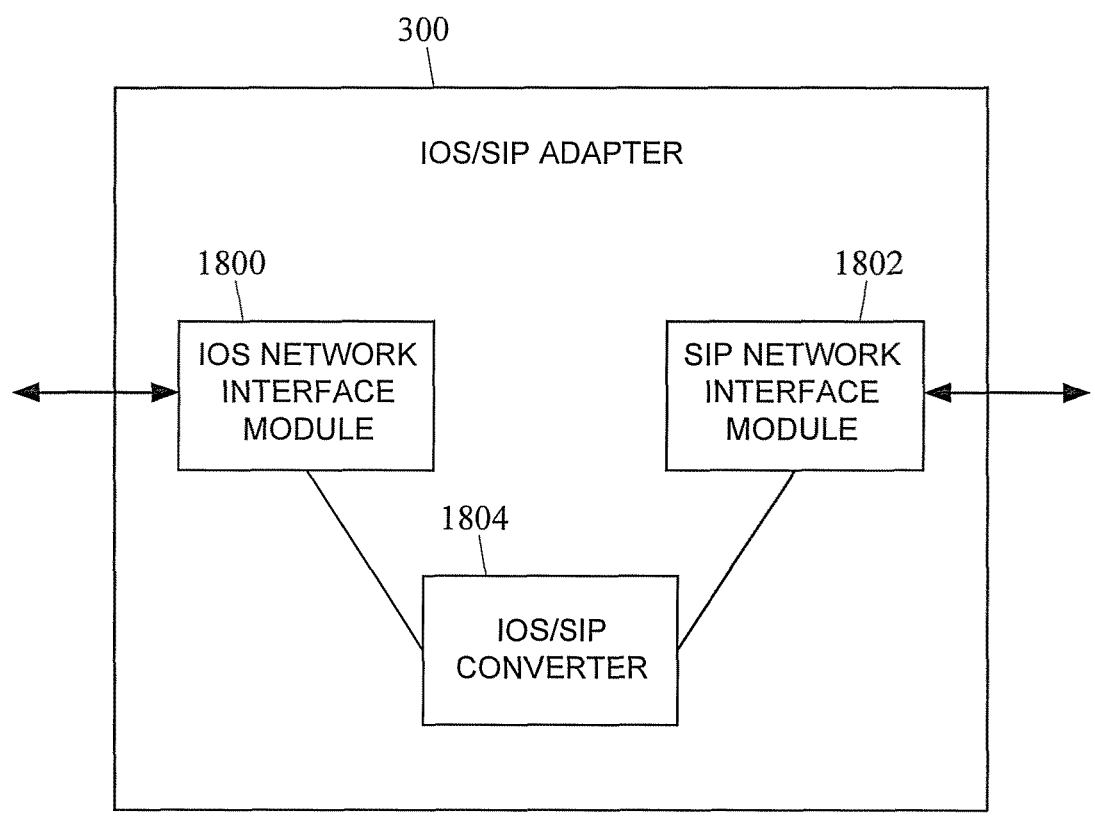
FIG. 18 is a block diagram of exemplary components of an IOS/SIP adapter according to an embodiment of the subject matter described herein.

FIG. 18 is a block diagram illustrating exemplary components of an IOS/SIP adapter 300 according to an embodiment of the subject matter described herein. Referring to FIG. 18, IOS/SIP adapter 300 includes and IOS network interface module for communicating with IOS network components, such as a base station subsystem, a SIP module 1802 for communicating with SIP network components, and an IOS/SIP converter 1804 for converting between IOS and SIP protocols. For example, when IOS module 1800 receives a message from a base station subsystem in communication with a non-IMS device, IOS network interface module 1800 may provide that message to IOS/SIP converter 1804. IOS/SIP converter 1804 may receive the IOS message, and may, in response, formulate the corresponding SIP message, and forward the SIP message to SIP network interface module 1802. SIP network interface module 1802 may forward the SIP message to an IMS node, such as a CSCF. IOS/SIP converter 1804 may implement any of the message flows and parameter mappings described herein for providing supplementary services to non-IMS devices without tunneling IOS messages to a convergence gateway. IOS/SIP converter 1804 may also implement the message flows and parameter mappings described herein for providing voice call and SMS services to non-IMS devices. IOS/SIP converter 1804 may also implement the methods described above for subscription aggregation and identity synthesis. IOS/SIP converter 1804 may also implement the procedures described above for routing emergency calls and providing for lawful intercept of communications.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method for providing supplementary services to IP multimedia subsystem (IMS) devices and non-IMS devices using common IMS network components, the method comprising:
providing an interoperability standard/session initiation protocol (IOS/SIP) adapter configured to communicate with a base station subsystem and an IMS network; and
at the IOS/SIP adapter, receiving, from the base station subsystem, a request for providing a supplementary service to a non-IMS device in communication with the base station subsystem, and in response to the request, sending a message to a call session control function (CSCF) in the IMS network that provides the supplementary service to the non-IMS device and to IMS devices, wherein the message sent to the CSCF is a session initiation protocol (SIP) INVITE message that includes IOS mapped SIP bearer parameters and is sent after radio resources are assigned by the base station subsystem, wherein the request from the base station subsystem comprises an IOS message.

2. The method of claim 1 wherein the supplementary service comprises one of a call waiting service, a call forwarding service, and a caller ID service.

3. The method of claim 1 wherein the SIP message comprises a SIP message that furthers providing of the supplementary service.

4. The method of claim 1 wherein sending the message to the CSCF in the IMS network includes mapping parameters in the IOS message to corresponding parameters in the SIP message.

5. The method of claim 3 wherein the SIP message that furthers the providing of the supplementary service comprises an INVITE message.

6. The method of claim 4 wherein mapping parameters in the IOS message to corresponding parameters in the SIP message includes mapping IOS bearer parameters to SIP bearer parameters.

7. The method of claim 4 wherein mapping parameters in the IOS message to corresponding parameters in the SIP message includes mapping combinations of parameters and Sub-parameters in the IOS message to combinations of parameters and sub-parameters in the SIP message.

8. The method of claim 1 comprising registering the non-IMS device with the IMS network via the IOS/SIP adapter.

9. The method of claim 1 wherein the base station subsystem comprises one of a femto cell base station subsystem, a pico cell base station subsystem, a micro cell base station subsystem and a macro cell base station subsystem.

10. The method of claim 1 wherein the sending a message to the CSCF in the IMS network includes mapping parameters from the request from the base station subsystem to corresponding parameters in the message sent to the CSCF in the IMS network.

11. The method of claim 1 further comprising, at the IOS/SIP adapter, receiving a message from the IMS network regarding the supplementary service, formulating a corresponding IOS message, and sending the corresponding IOS message to the base station subsystem.

12. A method for call setup using an interoperability specification/session initiation protocol (IOS/SIP) adapter, the method comprising:
at the IOS/SIP adapter, receiving an IOS call setup request in response to a call originating from a non IP multimedia subsystem (non-IMS) device; at the IOS/SIP adapter, in response to the IOS call setup request, formulating an IMS message for setting up the call in an IMS network, wherein the IMS message is a session initiation protocol (SIP) INVITE message that includes IOS mapped SIP bearer parameters mapped to IOS bearer parameters and is sent after radio resources are assigned by the base station subsystem, where the IMS message includes information for setting up the call, the information including at least the calling party identifier; and
sending the IMS message to a call session control function (CSCF) in the IMS network that provides call setup services for IMS and non-IMS devices.

13. The method of claim 12 wherein receiving an IOS call setup request includes receiving the IOS call setup request from one of a femto cell base station subsystem, a pico cell base station subsystem, a micro cell base station subsystem, and a macro cell base station subsystem.

14. The method of claim 12 wherein the IMS message includes information required for setting up the call.

15. The method of claim 12 wherein formulating the IMS message includes mapping parameters in the IOS call setup request to corresponding parameters in the SIP message.

16. The method of claim 12 comprising, at the IOS/SIP adapter, receiving a SIP message from the IMS network regarding the call, and, in response, formulating a corresponding IOS message and sending the corresponding IOS message to a base station subsystem.

17. A method for invoking a supplementary service provided by an IP multimedia subsystem (IMS) network from an interoperability standard (IOS) network, the method comprising:
an interoperability standard/session initiation protocol (IOS/SIP) adapter configured to communicate with a base station subsystem and the IMS network;
at the IOS/SIP adapter receiving, from the base station subsystem, an IOS message associated with a request for a supplementary service;
translating the IOS message into a session initiation protocol (SIP) message for furthering providing of the supplementary service, wherein the SIP message is a SIP INVITE message that includes IOS mapped SIP bearer parameters, and
the SIP INVITE message is sent after radio resources are assigned by the base station subsystem; and
transmitting the SIP message to a call session control function (CSCF) in the IMS network that provides the supplementary service to IMS and non-IMS devices.

18. The method of claim 17 comprising, at the IOS/SIP adapter, receiving a SIP message associated with the supplementary service, formulating a corresponding IOS message, and sending the IOS message to the base station subsystem.

19. An interoperability standard/session initiation protocol (IOS/SIP) adapter comprising:
an IOS network interface module configured to communicate with a base station subsystem in communication with a non IP multimedia subsystem (non-IMS) device;
a SIP network interface module configured to communicate with an IMS network;
an IOS/SIP converter configured to convert between SIP and IOS, wherein, when the IOS network interface module receives a request from the base station subsystem in communication with the non-IMS device for a supplementary service, the IOS/SIP adapter formulates a message for invoking the supplementary service, and the SIP network interface module sends the message to a call session control function (CSCF) in the IMS network that provides the supplementary service to the non-IMS device and to IMS devices, wherein the message is a SIP INVITE message that includes SIP bearer parameters mapped to IOS bearer parameters and is sent after radio resources are assigned by the base station subsystem.

20. The IOS/SIP adapter of claim 19 wherein the IOS module is configured to communicate with the non-IMS device via one of a femto cell base station subsystem, a pico cell base station subsystem, a micro cell base station subsystem, and a macro cell base station subsystem.

21. The IOS/SIP adapter of claim 19 wherein the supplementary service comprises one of a call waiting service, a call forwarding service, and a caller ID service.

22. The IOS/SIP adapter of claim 19 wherein the IOS/SIP converter is configured to translate an IOS message associated with short message service message delivery to a SIP message associated with short message service message delivery.

23. The IOS/SIP adapter of claim 19 wherein the IOS/SIP converter is configured to translate an IOS message associated with call setup for a call involving an non-IMS device to a SIP message associated with the call setup.

24. The IOS/SIP adapter of claim 19 wherein the IOS/SIP converter is configured to map IOS message parameters to corresponding SIP message parameters and vice versa.

25. The IOS/SIP adapter of claim 19 wherein the IOS/SIP converter is configured to route IOS originating emergency services calls to an emergency services routing node.

26. The IOS/SIP adapter of claim 19 wherein the IOS/SIP converter is configured to provide for lawful intercept of IOS and SIP originated communications for surveillance purposes.

27. A non-transitory computer readable medium having stored thereon computer executable instructions that when executed by the processor of a computer perform steps comprising:

receiving from a base station subsystem, an interoperability standard (IOS) message associated with one of: call setup, short message service (SMS) message transactions, and providing of a supplementary service;

translating the IOS message to a session initiation protocol (SIP) message associated with the one of: call setup, SMS transactions and the providing of the supplementary service; and forwarding the SIP message to a call session control function (CSCF) in an IP multimedia subsystem (IMS) network that facilitates the one of: call setup and the providing of the supplementary service for non-IMS devices and IMS devices, wherein the SIP message is a SIP INVITE message that includes IOS mapped SIP bearer parameters and is sent after radio resources are assigned by the base station subsystem.

* * * * *